(12) United States Patent
Murakami et al.

(10) Patent No.: US 10,873,492 B2
(45) Date of Patent: Dec. 22, 2020

(54) TRANSMISSION METHOD, TRANSMISSION DEVICE, RECEPTION METHOD, AND RECEPTION DEVICE

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/573,458

(22) Filed: Sep. 17, 2019

(65) Prior Publication Data
US 2020/0014577 A1    Jan. 9, 2020

Related U.S. Application Data

(63) Continuation of application No. 16/245,546, filed on Jan. 11, 2019, now Pat. No. 10,461,984, which is a
(Continued)

(51) Int. Cl.
*H04L 27/34* (2006.01)
*H04L 27/36* (2006.01)
(Continued)

(52) U.S. Cl.
CPC ....... *H04L 27/3433* (2013.01); *H04B 7/0456* (2013.01); *H04L 1/0003* (2013.01);
(Continued)

(58) Field of Classification Search
CPC ...... H04B 7/0456; H04L 27/36; G11C 11/406
(Continued)

(56) References Cited

U.S. PATENT DOCUMENTS

| 2011/0255870 A1* | 10/2011 | Grigoryan | H04B 10/548 |
| | | | 398/65 |
| 2014/0269861 A1* | 9/2014 | Eliaz | H04L 27/38 |
| | | | 375/219 |
| 2018/0316399 A1* | 11/2018 | Murakami | H04L 5/0048 |

FOREIGN PATENT DOCUMENTS

EP    2 930 871    10/2015

OTHER PUBLICATIONS

International Search Report (ISR) dated Sep. 19, 2017 in International (PCT) Application No. PCT/JP2017/025349.
(Continued)

*Primary Examiner* — Fabricio R Murillo Garcia
(74) *Attorney, Agent, or Firm* — Wenderoth, Lind & Ponack, L.L.P.

(57) ABSTRACT

Provided is a transmission method that improves data reception quality in radio transmission using a single-carrier scheme and/or a multi-carrier scheme. The transmission method includes: generating a plurality of first modulated signals and a plurality of second modulated signals from transmission data, the plurality of first modulated signals being signals generated using a 16 QAM modulation scheme, and the plurality of second modulated signals being signals generated using uniform constellation 64 QAM modulation; generating, from the plurality of first modulated signals and the plurality of second modulated signals, a plurality of first signal-processed signals and a plurality of second signal-processed signals which satisfy a predetermined equation; and changing the predetermined equation when a 64 QAM modulation used to generate the plurality of second modulated signals is switched from the uniform constellation 64 QAM modulation to a non-uniform constellation 64 QAM modulation.

8 Claims, 26 Drawing Sheets

Related U.S. Application Data continuation of application No. PCT/JP2017/025349, filed on Jul. 12, 2017.

(60) Provisional application No. 62/523,036, filed on Jun. 21, 2017, provisional application No. 62/362,368, filed on Jul. 14, 2016.

(51) Int. Cl.
*H04B 7/0456* (2017.01)
*H04L 27/26* (2006.01)
*H04L 1/00* (2006.01)

(52) U.S. Cl.
CPC .......... *H04L 27/26* (2013.01); *H04L 27/3472* (2013.01); *H04L 27/36* (2013.01)

(58) Field of Classification Search
USPC ....................................................... 375/261
See application file for complete search history.

(56) References Cited

OTHER PUBLICATIONS

John A. C. Bingham, "Multicarrier Modulation for Data Transmission: An Idea Whose Time Has Come", IEEE Communications Magazine, pp. 5-8, 11-14, May 1990.
Communication under Rule 71(3) EPC dated Apr. 14, 2020 for the corresponding EP Patent Application No. 17 827 647.3.

\* cited by examiner

FIG. 26
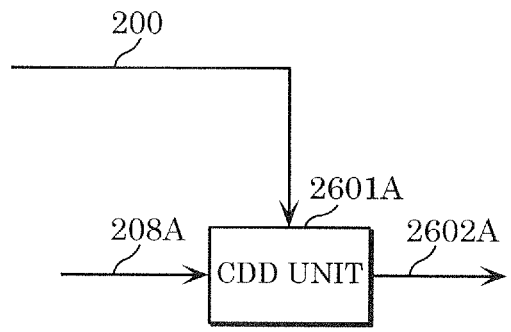
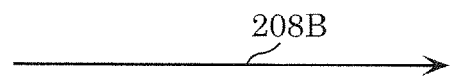
FIG. 27
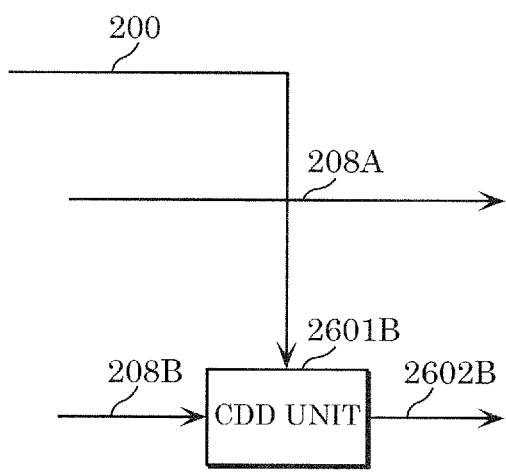
FIG. 28
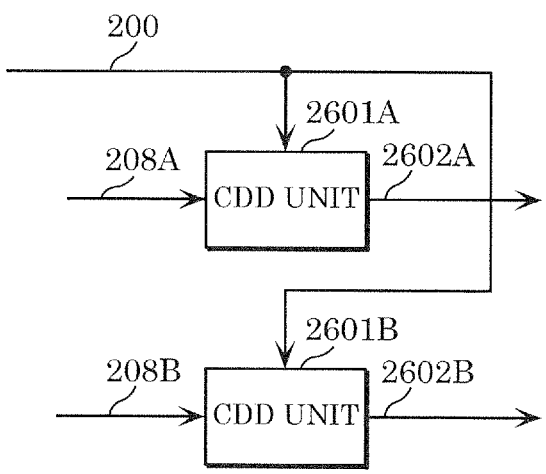

FIG. 29
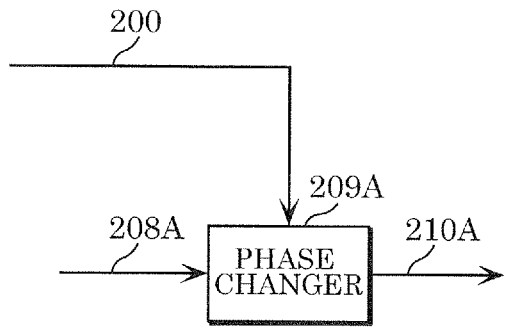
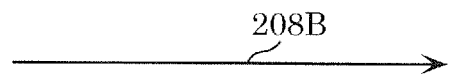
FIG. 30
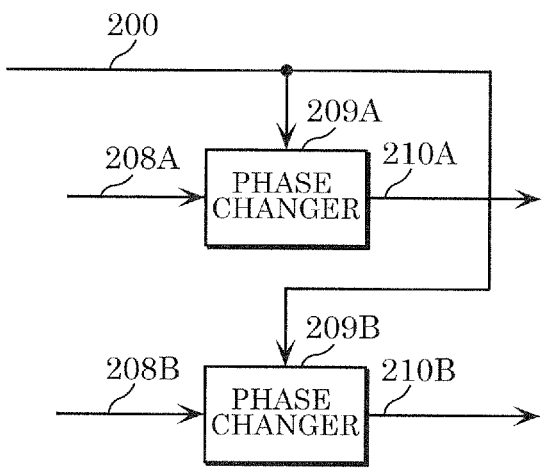
FIG. 31
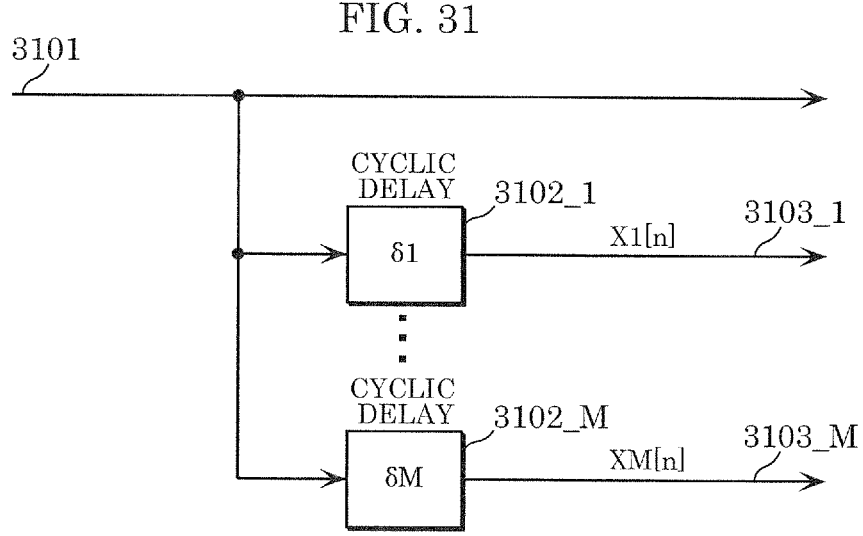

TRANSMISSION METHOD, TRANSMISSION DEVICE, RECEPTION METHOD, AND RECEPTION DEVICE

CROSS REFERENCE TO RELATED APPLICATIONS

This application is a U.S. continuation application of PCT International Patent Application Number PCT/JP2017/025349 filed on Jul. 12, 2017, claiming the benefit of priority of U.S. Provisional Application No. 62/362,368 filed on Jul. 14, 2016, and U.S. Provisional Application No. 62/523,036 filed on Jun. 21, 2017, the entire contents of which are hereby incorporated by reference.

BACKGROUND

1. Technical Field

The present disclosure relates to a transmission method, a transmission device, a reception method, and a reception device.

2. Description of the Related Art

As radio communications schemes, single-carrier schemes and multi-carrier schemes such as OFDM (orthogonal frequency division multiplexing) (for example, see J. A. C. Bingham, "Multicarrier Modulation for Data Transmission: An Idea Whose Time Has Come", IEEE Communications Magazine, May 1990) have been proposed. Multi-carrier schemes are advantageous in that they provide a high frequency-usage efficiency and are suitable for large-capacity transmission. Single-carrier schemes are advantageous in that they do not require signal processing such as FFT (fast Fourier transform) or IFFT (inverse FFT), and are thus suitable for realizing a low power consumption implementation.

SUMMARY

In radio communication using a single-carrier scheme and/or multi-carrier scheme, a technique for improving data reception quality is desired.

A transmission method according to one aspect of the present disclosure includes a mapping step, a signal processing step, and a transmission step. In the mapping step, a plurality of first modulated signals $s1(i)$ and a plurality of second modulated signals $s2(i)$ are generated from transmission data, where i is a symbol number that is an integer greater than or equal to 0, the plurality of first modulated signals $s1(i)$ are signals generated using a 16 QAM modulation scheme, and the plurality of second modulated signals $s2(i)$ are signals generated using uniform constellation 64 QAM modulation. In the signal processing step, a plurality of first signal-processed signals $z1(i)$ and a plurality of second signal-processed signals $z2(i)$ that satisfy a predetermined equation are generated from the plurality of first modulated signals $s1(i)$ and the plurality of second modulated signals $s2(i)$. In the transmission step, the plurality of first signal-processed signals $z1(i)$ and the plurality of second signal-processed signals $z2(i)$ are transmitted using a plurality of antennas. Among the plurality of first signal-processed signals $z1(i)$ and the plurality of second signal-processed signals $z2(i)$, a first signal-processed signal and a second signal-processed signal that have identical symbol numbers are simultaneously transmitted at the same frequency. Here, when the 64 QAM modulation used to generate the plurality of second modulated signals $s2(i)$ is switched from the uniform constellation 64 QAM modulation to a non-uniform constellation 64 QAM modulation, the predetermined equation is changed.

A transmission device according to one aspect of the present disclosure includes a mapper, a signal processor, and a transmitter. The mapper generates a plurality of first modulated signals $s1(i)$ and a plurality of second modulated signals $s2(i)$ from transmission data, where i is a symbol number that is an integer greater than or equal to 0, the plurality of first modulated signals $s1(i)$ are signals generated using a 16 QAM modulation scheme, and the plurality of second modulated signals $s2(i)$ are signals generated using uniform constellation 64 QAM modulation. The signal processor generates a plurality of first signal-processed signals $z1(i)$ and a plurality of second signal-processed signals $z2(i)$ that satisfy a predetermined equation from the plurality of first modulated signals $s1(i)$ and the plurality of second modulated signals $s2(i)$. The transmitter transmits the plurality of first signal-processed signals $z1(i)$ and the plurality of second signal-processed signals $z2(i)$ using a plurality of antennas. Among the plurality of first signal-processed signals $z1(i)$ and the plurality of second signal-processed signals $z2(i)$, a first signal-processed signal and a second signal-processed signal that have identical symbol numbers are simultaneously transmitted at the same frequency. Here, when the 64 QAM modulation used to generate the plurality of second modulated signals $s2(i)$ is switched from the uniform constellation 64 QAM modulation to a non-uniform constellation 64 QAM modulation, the signal processor changes the predetermined equation.

A reception method according to one aspect of the present disclosure includes a reception step and a demodulation step. In the reception step, reception signals are obtained by receiving a first transmission signal and a second transmission signal transmitted from different antennas. The first transmission signal and the second transmission signal are signals resulting from transmitting a plurality of first signal-processed signals $z1(i)$ and a plurality of second signal-processed signals $z2(i)$ using a plurality of antennas, where i is a symbol number that is an integer greater than or equal to 0, and among the plurality of first signal-processed signals $z1(i)$ and the plurality of second signal-processed signals $z2(i)$, a first signal-processed signal and a second signal-processed signal that have identical symbol numbers are simultaneously transmitted at the same frequency. The plurality of first signal-processed signals $z1(i)$ and the plurality of second signal-processed signals $z2(i)$ are signals generated by performing first signal processing and second signal processing on a plurality of first modulated signals $s1(i)$ generated using a 16 QAM modulation scheme and a plurality of second modulated signals $s2(i)$ generated using uniform constellation 64 QAM modulation. The plurality of first signal-processed signals $z1(i)$ and the plurality of second signal-processed signals $z2(i)$ satisfy a predetermined equation in regard to the plurality of first modulated signals $s1(i)$ and the plurality of second modulated signals $s2(i)$. In the demodulation step, the reception signals are demodulated by performing signal processing corresponding to the first signal processing and the second signal processing. Here, when the 64 QAM modulation used to generate the plurality of second modulated signals $s2(i)$ is switched from the uniform constellation 64 QAM modulation to a non-uniform constellation 64 QAM modulation, the predetermined equation is changed.

A reception device according to one aspect of the present disclosure includes a receiver and a demodulator. The receiver obtains reception signals by receiving a first transmission signal and a second transmission signal transmitted from different antennas. The first transmission signal and the second transmission signal are signals resulting from transmitting a plurality of first signal-processed signals z1(i) and a plurality of second signal-processed signals z2(i) using a plurality of antennas, where i is a symbol number that is an integer greater than or equal to 0, and among the plurality of first signal-processed signals z1(i) and the plurality of second signal-processed signals z2(i), a first signal-processed signal and a second signal-processed signal that have identical symbol numbers are simultaneously transmitted at the same frequency. The plurality of first signal-processed signals z1(i) and the plurality of second signal-processed signals z2(i) are signals generated by performing first signal processing and second signal processing on a plurality of first modulated signals s1(i) generated using a 16 QAM modulation scheme and a plurality of second modulated signals s2(i) generated using uniform constellation 64 QAM modulation. The plurality of first signal-processed signals z1(i) and the plurality of second signal-processed signals z2(i) satisfy a predetermined equation in regard to the plurality of first modulated signals s1(i) and the plurality of second modulated signals s2(i). The demodulator demodulates the reception signals by performing signal processing corresponding to the first signal processing and the second signal processing. Here, when the 64 QAM modulation used to generate the plurality of second modulated signals s2(i) is switched from the uniform constellation 64 QAM modulation to a non-uniform constellation 64 QAM modulation, the predetermined equation is changed.

According to the present disclosure, it is possible to improve data reception quality is desired in radio communication using a single-carrier scheme and/or multi-carrier scheme.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 26 illustrates one example of part of a configuration in a signal processor in a transmission device;

FIG. 27 illustrates one example of part of a configuration in a signal processor in a transmission device;

FIG. 28 illustrates one example of part of a configuration in a signal processor in a transmission device;

FIG. 29 illustrates one example of part of a configuration in a signal processor in a transmission device;

FIG. 30 illustrates one example of part of a configuration in a signal processor in a transmission device;

FIG. 31 illustrates a configuration when CDD is used; and

DESCRIPTION OF THE EMBODIMENTS

Embodiment 1

A transmission method, transmission device, reception method, and reception device according to this embodiment will be described in detail.

Figure 1:
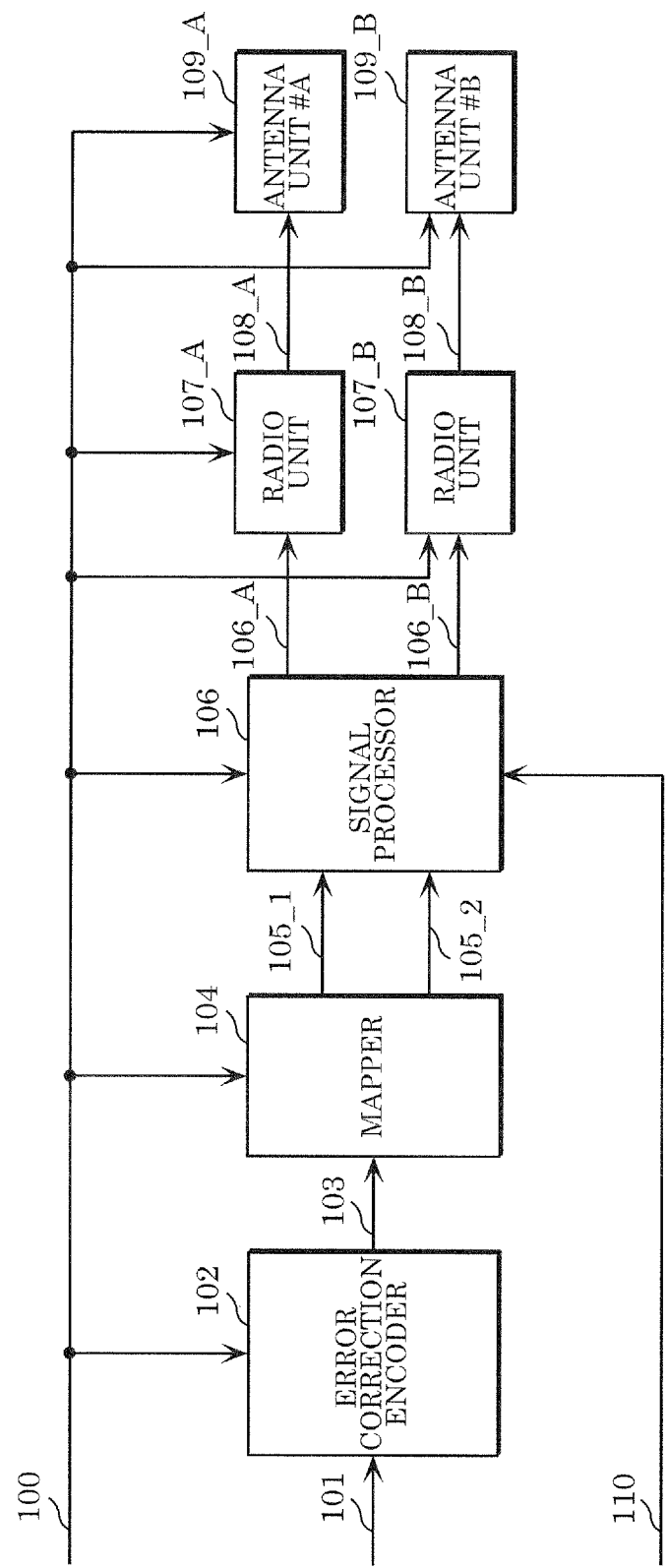
FIG. 1 illustrates one example of a configuration of a transmission device.

FIG. 1 illustrates one example of a configuration of a transmission device according to this embodiment, such as a base station, access point, or broadcast station. Error correction encoder 102 receives inputs of data 101 and control signal 100, and based on information related to the error correction code included in control signal 100 (e.g., error correction code information, code length (block length), encode rate), performs error correction encoding, and outputs encoded data 103. Note that error correction encoder 102 may include an interleaver. In such a case, error correction encoder 102 may rearrange the encoded data before outputting encoded data 103.

Mapper 104 receives inputs of encoded data 103 and control signal 100, and based on information on the modulated signal included in control signal 100, performs mapping in accordance with the modulation scheme, and outputs mapped signal (baseband signal) 105_1 and mapped signal (baseband signal) 105_2. Note that mapper 104 generates mapped signal 105_1 using a first sequence and generates mapped signal 105_2 using a second sequence. Here, the first sequence and second sequence are different.

Signal processor 106 receives inputs of mapped signals 105_1 and 105_2, signal group 110, and control signal 100, performs signal processing based on control signal 100, and outputs signal-processed signals 106_A and 106_B. Here, signal-processed signal 106_A is expressed as u1(i), and signal-processed signal 106_B is expressed as u2(i) (i is a symbol number; for example, i is an integer that is greater than or equal to 0). Note that details regarding the signal processing will be described with reference to FIG. 2 later.

Radio unit 107_A receives inputs of signal-processed signal 106_A and control signal 100, and based on control signal 100, processes signal-processed signal 106_A and outputs transmission signal 108_A. Transmission signal 108_A is then output as radio waves from antenna unit #A (109_A).

Similarly, radio unit 107_B receives inputs of signal-processed signal 106_B and control signal 100, and based on control signal 100, processes signal-processed signal 106_B and outputs transmission signal 108_B. Transmission signal 108_B is then output as radio waves from antenna unit #B (109_B).

Antenna unit #A (109_A) receives an input of control signal 100. Here, based on control signal 100, antenna unit #A (108_A) processes transmission signal 108_A and outputs the result as radio waves. However, antenna unit #A (109_A) may not receive an input of control signal 100.

Similarly, antenna unit #B (109_B) receives an input of control signal 100. Here, based on control signal 100, antenna unit #B (108_B) processes transmission signal 108_B and outputs the result as radio waves. However, antenna unit #B (109_B) may not receive an input of control signal 100.

Note that control signal 100 may be generated based on information transmitted by a device that is the communication partner in FIG. 1, and, alternatively, the device in FIG. 1 may include an input unit, and control signal 100 may be generated based on information input from the input unit.

Figure 2:
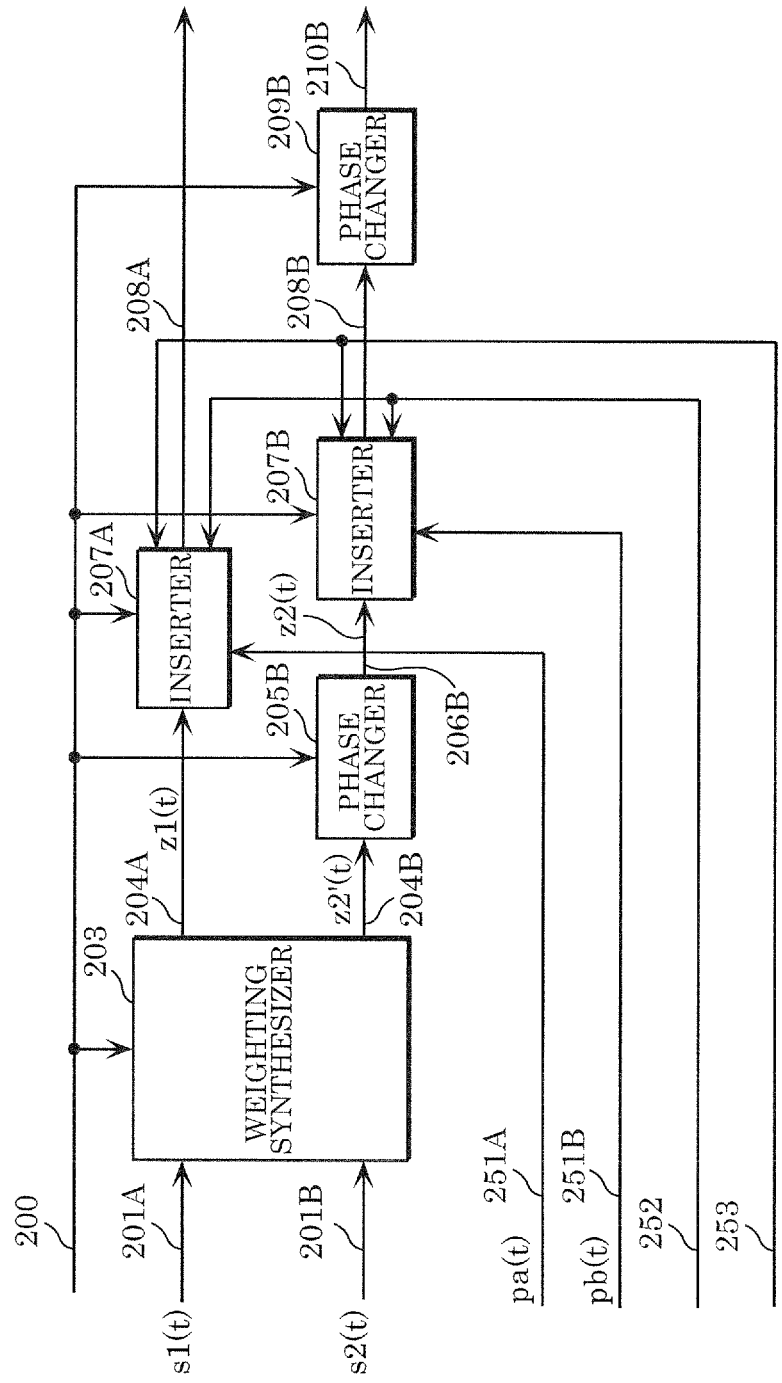
FIG. 2 illustrates one example of a configuration of a signal processor in a transmission device.

FIG. 2 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1(t), and weighted signal 204B is expressed as z2'(t). Note that one example of t is time (s1(t), s2(t), z1(t), and z2'(t) are defined as complex numbers (accordingly, they may be real numbers)).

Weighting synthesizer (precoder) 203 performs the following calculation.

[MATH. 1]

$$\begin{pmatrix} z1(i) \\ z2'(i) \end{pmatrix} = \begin{pmatrix} a & b \\ c & d \end{pmatrix} \begin{pmatrix} s1(i) \\ s2(i) \end{pmatrix} \quad \text{Equation (1)}$$

In Equation (1), a, b, c, and d can be defined as complex numbers. Accordingly, a, b, c, and d are complex numbers (and may be real numbers). Note that i is a symbol number.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number (and may be a real number).

Next, specific operations performed by phase changer 205B will be described. In phase changer 205B, for example, a phase change of y(i) is applied to z2'(i). Accordingly, z2(i) can be expressed as z2(i)=y(i)×z2'(i) (i is a symbol number (i is an integer that is greater than or equal to 0)).

For example, the phase change value is set as shown below (N is an integer that is greater than or equal to 2, N is a phase change cycle)(when N is set to an odd number greater than or equal to 3, data reception quality may be improved).

[MATH. 2]

$$y(i) = e^{j\frac{2 \times \pi \times i}{N}} \quad \text{Equation (2)}$$

(j is an imaginary number unit). However, Equation (2) is merely a non-limiting example. Here, phase change value y(i)=ej×δ(i).

Here, z1(i) and z2(i) can be expressed with the following equation.

[MATH. 3]

$$\begin{pmatrix} z1(i) \\ z2(i) \end{pmatrix} = \begin{pmatrix} 1 & 0 \\ 0 & y(i) \end{pmatrix} \begin{pmatrix} a & b \\ c & d \end{pmatrix} \begin{pmatrix} s1(i) \\ s2(i) \end{pmatrix} \quad \text{Equation (3)}$$

$$= \begin{pmatrix} 1 & 0 \\ 0 & e^{j \times \delta(i)} \end{pmatrix} \begin{pmatrix} a & b \\ c & d \end{pmatrix} \begin{pmatrix} s1(i) \\ s2(i) \end{pmatrix}$$

Note that δ(i) is a real number. z1(i) and z2(i) are transmitted from the transmission device at the same time and using the same frequency (same frequency band).

In Equation (3), the phase change value is not limited to the value used in Equation (2); for example, a method in which the phase is changed cyclically or regularly is conceivable.

The matrix (precoding matrix) in Equation (1) and Equation (3) is as follows.

[MATH. 4]

$$\begin{pmatrix} a & b \\ c & d \end{pmatrix} = F \quad \text{Equation (4)}$$

For example, using the following matrix for matrix F is conceivable.

[MATH. 5]
$$F = \begin{pmatrix} \beta \times e^{j0} & \beta \times \alpha \times e^{j0} \\ \beta \times \alpha \times e^{j0} & \beta \times e^{j\pi} \end{pmatrix} \text{ or} \quad \text{Equation (5)}$$

[MATH. 6]
$$F = \frac{1}{\sqrt{\alpha^2+1}} \begin{pmatrix} e^{j0} & \alpha \times e^{j0} \\ \alpha \times e^{j0} & e^{j\pi} \end{pmatrix} \text{ or} \quad \text{Equation (6)}$$

[MATH. 7]
$$F = \begin{pmatrix} \beta \times e^{j0} & \beta \times \alpha \times e^{j\pi} \\ \beta \times \alpha \times e^{j0} & \beta \times e^{j0} \end{pmatrix} \text{ or} \quad \text{Equation (7)}$$

[MATH. 8]
$$F = \frac{1}{\sqrt{\alpha^2+1}} \begin{pmatrix} e^{j0} & \alpha \times e^{j\pi} \\ \alpha \times e^{j0} & e^{j0} \end{pmatrix} \text{ or} \quad \text{Equation (8)}$$

[MATH. 9]
$$F = \begin{pmatrix} \beta \times \alpha \times e^{j0} & \beta \times e^{j\pi} \\ \beta \times e^{j0} & \beta \times \alpha \times e^{j0} \end{pmatrix} \text{ or} \quad \text{Equation (9)}$$

[MATH. 10]
$$F = \frac{1}{\sqrt{\alpha^2+1}} \begin{pmatrix} \alpha \times e^{j0} & e^{j\pi} \\ e^{j0} & \alpha \times e^{j0} \end{pmatrix} \text{ or} \quad \text{Equation (10)}$$

[MATH. 11]
$$F = \begin{pmatrix} \beta \times \alpha \times e^{j0} & \beta \times e^{j0} \\ \beta \times e^{j0} & \beta \times \alpha \times e^{j\pi} \end{pmatrix} \text{ or} \quad \text{Equation (11)}$$

[MATH. 12]
$$F = \frac{1}{\sqrt{\alpha^2+1}} \begin{pmatrix} \alpha \times e^{j0} & e^{j0} \\ e^{j0} & \alpha \times e^{j\pi} \end{pmatrix} \quad \text{Equation (12)}$$

Note that in Equation (5), Equation (6), Equation (7), Equation (8), Equation (9), Equation (10), Equation (11), and Equation (12), a may be a real number and may be an imaginary number, and β may be a real number and may be an imaginary number. However, α is not 0 (zero). β is also not 0 (zero).

or

[MATH. 13]
$$F = \begin{pmatrix} \beta \times \cos\theta & \beta \times \sin\theta \\ \beta \times \sin\theta & -\beta \times \cos\theta \end{pmatrix} \text{ or} \quad \text{Equation (13)}$$

[MATH. 14]
$$F = \begin{pmatrix} \cos\theta & \sin\theta \\ \sin\theta & -\cos\theta \end{pmatrix} \text{ or} \quad \text{Equation (14)}$$

[MATH. 15]
$$F = \begin{pmatrix} \beta \times \cos\theta & -\beta \times \sin\theta \\ \beta \times \sin\theta & \beta \times \cos\theta \end{pmatrix} \text{ or} \quad \text{Equation (15)}$$

[MATH. 16]
$$F = \begin{pmatrix} \cos\theta & -\sin\theta \\ \sin\theta & \cos\theta \end{pmatrix} \text{ or} \quad \text{Equation (16)}$$

[MATH. 17]
$$F = \begin{pmatrix} \beta \times \sin\theta & -\beta \times \cos\theta \\ \beta \times \cos\theta & \beta \times \sin\theta \end{pmatrix} \text{ or} \quad \text{Equation (17)}$$

[MATH. 18]
$$F = \begin{pmatrix} \sin\theta & -\cos\theta \\ \cos\theta & \sin\theta \end{pmatrix} \text{ or} \quad \text{Equation (18)}$$

[MATH. 19]
$$F = \begin{pmatrix} \beta \times \sin\theta & \beta \times \cos\theta \\ \beta \times \cos\theta & -\beta \times \sin\theta \end{pmatrix} \text{ or} \quad \text{Equation (19)}$$

[MATH. 20]
$$F = \begin{pmatrix} \sin\theta & \cos\theta \\ \cos\theta & -\sin\theta \end{pmatrix} \text{ or} \quad \text{Equation (20)}$$

[MATH. 21]
$$F(i) = \begin{pmatrix} \beta \times e^{j\theta_{11}(i)} & \beta \times \alpha \times e^{j\theta_{11}(i)+\lambda} \\ \beta \times \alpha \times e^{j\theta_{21}(i)} & \beta \times e^{j(\theta_{21}(i)+\lambda+\pi)} \end{pmatrix} \text{ or} \quad \text{Equation (21)}$$

[MATH. 22]
$$F(i) = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \text{ or} \quad \text{Equation (22)}$$

[MATH. 23]
$$F(i) = \begin{pmatrix} \beta \times \alpha \times e^{j\theta_{21}(i)} & \beta \times e^{j(\theta_{21}(i)+\lambda+\pi)} \\ \beta \times e^{j\theta_{11}(i)} & \beta \times \alpha \times e^{j(\theta_{11}(i)+\lambda)} \end{pmatrix} \text{ or} \quad \text{Equation (23)}$$

[MATH. 24]
$$F(i) = \frac{1}{\sqrt{\alpha^2+1}} \begin{pmatrix} \alpha \times e^{j\theta_{21}(i)} & e^{j(\theta_{21}(i)+\lambda+\pi)} \\ e^{j\theta_{11}(i)} & \alpha \times e^{j(\theta_{11}(i)+\lambda)} \end{pmatrix} \text{ or} \quad \text{Equation (24)}$$

[MATH. 25]
$$F(i) = \begin{pmatrix} \beta \times e^{j\theta_{11}} & \beta \times \alpha \times e^{j(\theta_{11}+\lambda(i))} \\ \beta \times \alpha \times e^{j\theta_{21}} & \beta \times e^{j(\theta_{21}+\lambda(i)+\pi)} \end{pmatrix} \text{ or} \quad \text{Equation (25)}$$

[MATH. 26]
$$F(i) = \frac{1}{\sqrt{\alpha^2+1}} \begin{pmatrix} e^{j\theta_{11}} & \alpha \times e^{j(\theta_{11}+\lambda(i))} \\ \alpha \times e^{j\theta_{21}} & e^{j(\theta_{21}+\lambda(i)+\pi)} \end{pmatrix} \text{ or} \quad \text{Equation (26)}$$

[MATH. 27]
$$F(i) = \begin{pmatrix} \beta \times \alpha \times e^{j\theta_{21}} & \beta \times e^{j(\theta_{21}+\lambda(i)+\pi)} \\ \beta \times e^{j\theta_{11}} & \beta \times \alpha \times e^{j(\theta_{11}+\lambda(i))} \end{pmatrix} \text{ or} \quad \text{Equation (27)}$$

[MATH. 28]
$$F(i) = \frac{1}{\sqrt{\alpha^2+1}} \begin{pmatrix} \alpha \times e^{j\theta_{21}} & e^{j(\theta_{21}+\lambda(i)+\pi)} \\ e^{j\theta_{11}} & \alpha \times e^{j(\theta_{11}+\lambda(i))} \end{pmatrix} \text{ or} \quad \text{Equation (28)}$$

[MATH. 29]
$$F = \begin{pmatrix} \beta \times e^{j\theta_{11}} & \beta \times \alpha \times e^{j(\theta_{11}+\lambda)} \\ \beta \times \alpha \times e^{j\theta_{21}} & \beta \times e^{j(\theta_{21}+\lambda+\pi)} \end{pmatrix} \text{ or} \quad \text{Equation (29)}$$

[MATH. 30]
$$F(i) = \frac{1}{\sqrt{\alpha^2+1}} \begin{pmatrix} e^{j\theta_{11}} & \alpha \times e^{j(\theta_{11}+\lambda)} \\ \alpha \times e^{j\theta_{21}} & e^{j(\theta_{21}+\lambda+\pi)} \end{pmatrix} \text{ or} \quad \text{Equation (30)}$$

-continued

[MATH. 31]

$$F(i) = \begin{pmatrix} \beta \times \alpha \times e^{j\theta_{21}} & \beta \times e^{j(\theta_{21}+\lambda+\pi)} \\ \beta \times e^{j\theta_{11}} & \beta \times \alpha \times e^{j(\theta_{11}+\lambda)} \end{pmatrix} \text{ or } \quad \text{Equation (31)}$$

[MATH. 32]

$$F(i) = \frac{1}{\sqrt{\alpha^2+1}} \begin{pmatrix} \alpha \times e^{j\theta_{21}} & e^{j(\theta_{21}+\lambda+\pi)} \\ e^{j\theta_{11}} & \alpha \times e^{j(\theta_{11}+\lambda)} \end{pmatrix} \quad \text{Equation (32)}$$

However, $\theta_{11}(i)$, $\theta_{21}(i)$, and $\lambda(i)$ are functions (real numbers) of i (symbol number). $\lambda$ is, for example, a fixed value (real number) (however, $\lambda$ need not be a fixed value). $\alpha$ may be a real number, and, alternatively, may be an imaginary number. $\beta$ may be a real number, and, alternatively, may be an imaginary number. However, $\alpha$ is not 0 (zero). $\beta$ is also not 0 (zero).

Moreover, $\theta_{11}$ and $\theta_{21}$ are real numbers.

Moreover, each exemplary embodiment herein can also be carried out by using a precoding matrix other than these matrices.

or

[MATH. 33]

$$F(i) = \begin{pmatrix} 1 & 0 \\ 0 & 1 \end{pmatrix} \quad \text{Equation (33)}$$

[MATH. 34]

$$F(i) = \begin{pmatrix} \beta & 0 \\ 0 & \beta \end{pmatrix} \quad \text{Equation (34)}$$

[MATH. 35]

$$F(i) = \begin{pmatrix} 1 & 0 \\ 0 & -1 \end{pmatrix} \quad \text{Equation (35)}$$

[MATH. 36]

$$F(i) = \begin{pmatrix} \beta & 0 \\ 0 & -\beta \end{pmatrix} \quad \text{Equation (36)}$$

Note that in Equation (34) and Equation (36), $\beta$ may be a real number and, alternatively, may be an imaginary number. However, $\beta$ is not 0 (zero). When the precoding matrix is expressed as in Equation (33) and Equation (34), weighting synthesizer 203 in FIG. 2 outputs mapped signal 201A as weighting synthesized signal 204A and mapped signal 201B as weighting synthesized signal 204B without performing signal processing on mapped signals 201A, 201B. Stated differently, weighting synthesizer 203 may be omitted. Alternately, when weighting synthesizer 203 is provided, control for whether to perform weighting synthesis or not may be determined according to control signal 200.

Inserter 207A receives inputs of weighting synthesized signal 204A, pilot symbol signal (pa(t))(t is time)(251A), preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal (pb(t)) (t: time) (251B), preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as x(i) =ej×ε(i)×x'(i) (j is an imaginary number unit).

Note that the operation performed by phase changer 209B may be CDD (cyclic delay diversity) or CSD (cycle shift diversity) disclosed in NPTL 2 and 3. One characteristic of phase changer 209B is that it applies a phase change to a symbol present along the frequency axis (i.e., applies a phase change to, for example, a data symbol, a pilot symbol, and/or a control information symbol).

In FIG. 2, phase changer 209B is included in the configuration, but phase changer 209B may be omitted from the configuration. In such cases, baseband signals 208A, 208B are the output in FIG. 2 (phase changer 209B need not operate).

Figure 3:
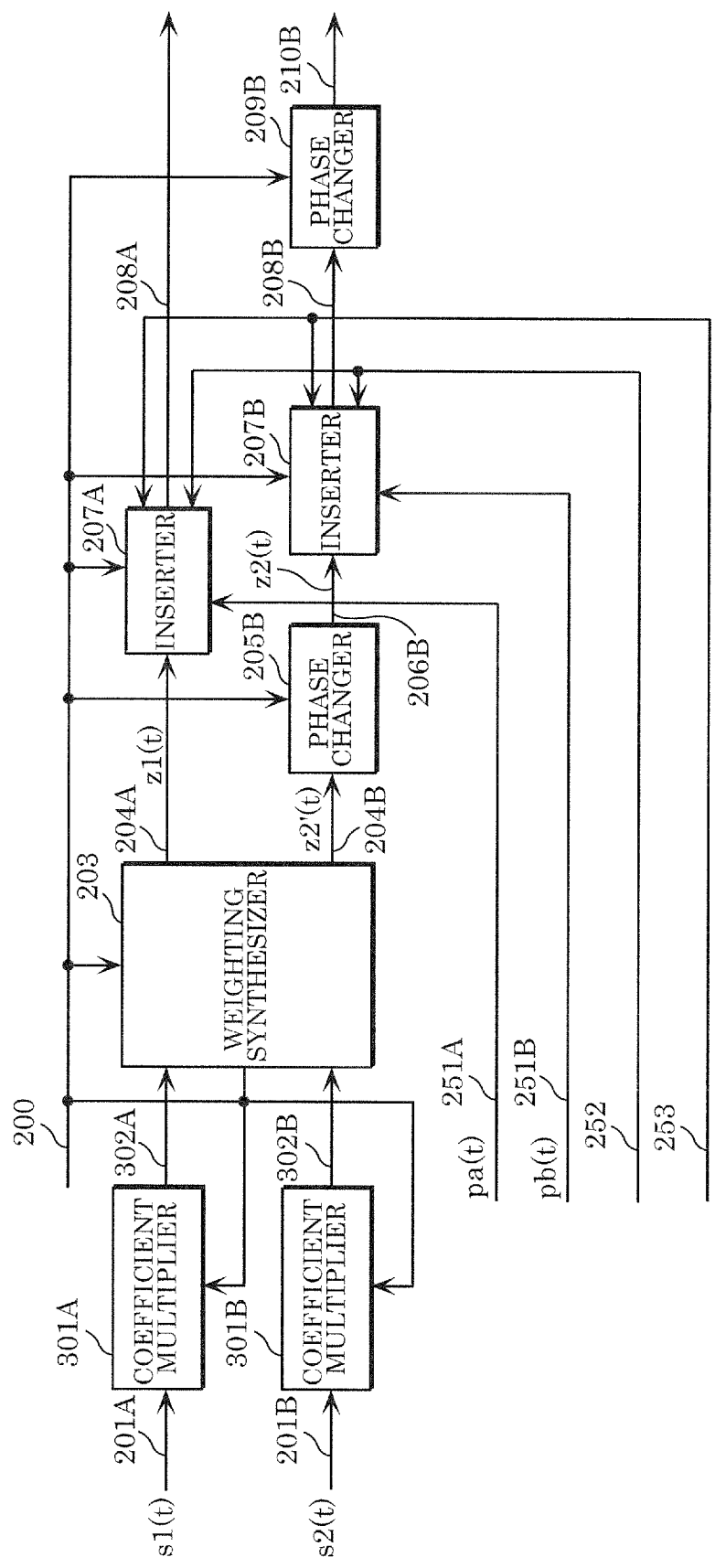
FIG. 3 illustrates one example of a configuration of a signal processor in a transmission device.

FIG. 3 illustrates an example of a configuration of signal processor 106 illustrated in FIG. 1 that differs from the configuration illustrated in FIG. 2. In FIG. 3, components that operate the same as in FIG. 2 share like reference marks. Note that duplicate description of components that perform the same operations as in FIG. 2 will be omitted.

Coefficient multiplier 301A receives inputs of mapped signal 201A (s1(i)) and control signal 200, and based on control signal 200, multiplies mapped signal 201A (s1(i)) by a coefficient, and outputs coefficient multiplied signal 302A. Note that when the coefficient is expressed as u, coefficient multiplied signal 302A is expressed as u×s1(i) (u may be a real number and, alternatively, may be a complex number). However, when u=1, coefficient multiplier 301A outputs mapped signal 201A (s1(i)) as coefficient multiplied signal 302A without multiplying mapped signal 201A (s1(i)) by the coefficient.

Similarly, coefficient multiplier 301B receives inputs of mapped signal 201B (s2(i)) and control signal 200, and based on control signal 200, multiplies mapped signal 201B (s2(i)) by a coefficient, and outputs coefficient multiplied signal 302B. Note that when the coefficient is expressed as v, coefficient multiplied signal 302B is expressed as v×s2(i) (v may be a real number and, alternatively, may be a complex number). However, when v=1, coefficient multiplier 301B outputs mapped signal 201B (s2(i)) as coefficient multiplied signal 302B without multiplying mapped signal 201B (s2(i)) by the coefficient.

Accordingly, weighting synthesized signal 204A (z1(i)) and phase-changed signal 206B (z2(i)) can be expressed with the following equation.

[MATH. 37]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix} \quad \text{Equation (37)}$$

$$= \begin{pmatrix} 1 & 0 \\ 0 & y(i) \end{pmatrix} \begin{pmatrix} a & b \\ c & d \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} a & b \\ c & d \end{pmatrix} \begin{pmatrix} u & 0 \\ 0 & v \end{pmatrix} \begin{pmatrix} s1(i) \\ s2(i) \end{pmatrix}$$

Note that the example of the (precoding) matrix F is as previously described (for example, see Equation (5) through Equation (36)), and the example of phase change value y(i) is as indicated in Equation (2), but the (precoding) matrix F and phase change value y(i) are not limited to these examples.

Next, "the (precoding) matrix F and phase change value y(i) when the modulation scheme for mapped signal 201A (s1(i)) is QPSK (quadrature phase shift keying) and the modulation scheme used for mapped signal 201B (s2(i)) is 16 QAM (QAM: quadrature amplitude modulation)" used in the description of the present invention will be described.

Note that here, the average (transmission) power of mapped signal 201A and the average (transmission) power of mapped signal 201B are the same.

In such cases, by obtaining weighting synthesized signal 204A (z1(i)) and phase-changed signal 206B (z2(i)) as illustrated in Equation (38) through Equation (45), in the reception device that receives the modulated signal transmitted by the transmission device illustrated in FIG. 1, an advantageous effect that data reception quality is improved can be achieved.

[MATH. 38]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix} \begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

Equation (38)

[MATH. 39]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix} \begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (39)

[MATH. 40]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix} \begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

Equation (40)

[MATH. 41]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix} \begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (41)

[MATH. 42]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta \times \cos\theta & \beta \times \sin\theta \\ \beta \times \sin\theta & -\beta \times \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix} \begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

Equation (42)

[MATH. 43]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta \times \cos\theta & \beta \times \sin\theta \\ \beta \times \sin\theta & -\beta \times \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix} \begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (43)

-continued

[MATH. 44]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix} \quad \text{Equation (44)}$$

$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

[MATH. 45]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix} \quad \text{Equation (45)}$$

$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Note that in Equation (38) through Equation (45), $\alpha$ and $\beta$ may be real numbers and, alternatively, may be imaginary numbers.

Next, the characteristic points of Equation (38) through Equation (45) will be described.

In Equation (38) through Equation (45), $\theta$ is set to $\pi/4$ radians (45 degrees). The average (transmission) power of coefficient multiplied signal 302A and the average (transmission) power of coefficient multiplied signal 302B are different, but by setting $\theta$ to $\pi/4$ radians (45 degrees), the average (transmission) power of weighting synthesized signal 204A(z1(i)) and the average (transmission) power of phase-changed signal 206B (z2(i)) can be made to be the same, so when the transmission rules stipulate a condition that the average transmission power of each modulated signal transmitted from the antennas be the same, it is necessary to set $\theta$ to $\pi/4$ radians (45 degrees). Note that, here, $\theta$ is set to $\pi/4$ radians (45 degrees), but $\theta$ may be set to any one of: $\pi/4$ radians (45 degrees); $(3\times\pi)/4$ radians (135 degrees); $(5\times\pi)/4$ radians (225 degrees); and $(7\times\pi)/4$ radians (315 degrees).

Moreover, the coefficients u, v are set as illustrated in Equation (38) through Equation (45).

Note that symbols (for example, z1(i), z2(i)) are described as being generated using the methods exemplified in FIG. 1, FIG. 2, FIG. 3, and Equation (1) through Equation (45). In such cases, the generated symbols may be arranged along the time axis. When a multi-carrier scheme such as OFDM (orthogonal frequency division multiplexing) is used, the generated symbols may be arranged along the frequency axis and may be arranged along the time and frequency axes. Moreover, the generated symbols may be interleaved (i.e., rearranged) and arranged along the time axis, along the frequency axis, and along the time and frequency axes.

However, z1(i) and z2(i), which are both symbol number i, are transmitted from the transmission device at the same time and using the same frequency (same frequency band).

Figure 4:
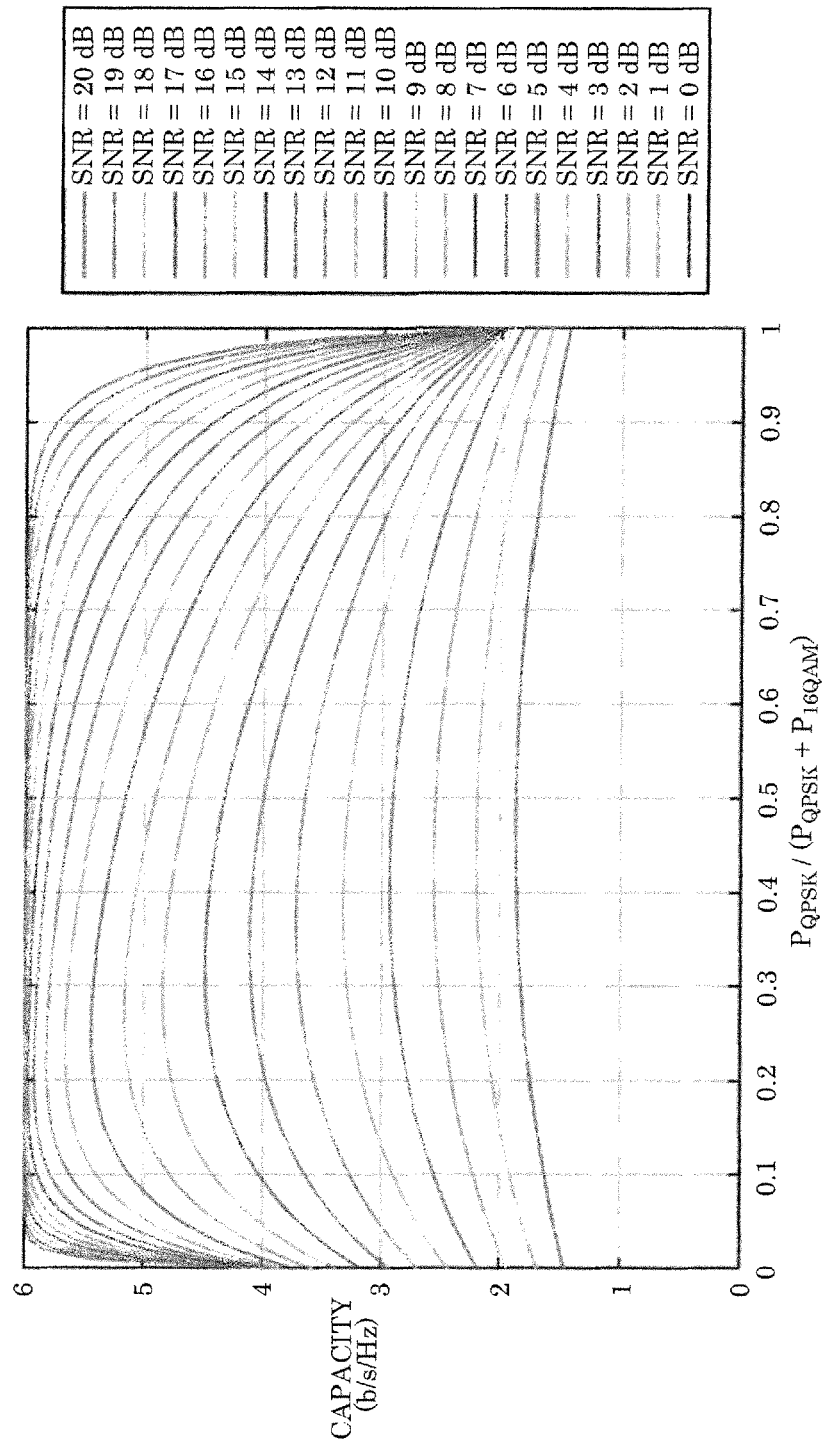
FIG. 4 illustrates the capacity for each SNR in an AWGN environment.

FIG. 4 shows the capacity for each SNR (signal-to-noise power ratio). In FIG. 4, $P_{QPSK}/(P_{QPSK}+P_{16\ QAM})$ is represented on the horizontal axis, and capacity is represented on the vertical axis. $P_{QPSK}$ is the average (transmission) power of QPSK, and $P_{16\ QAM}$ is the average (transmission) power of 16 QAM (note that the channel model in the graph is an AWGN (additive white Gaussian noise) environment). As can be seen from the results, by using the settings illustrated in Equation (38) through Equation (45), the reception device can achieve an advantageous effect of good data reception quality. Note that in FIG. 4, the 21 line graphs indicating relationships between power ratio and capacity correspond to, in ascending order of capacity, SNR=0 dB, 1 dB, 2 dB . . . 20 dB The transmission device illustrated in FIG. 1 switches the transmission method of the modulated signal based on information on the transmission method included in control signal 100. The transmission device illustrated in FIG. 1 can select the following transmission methods.

Transmission Method #1:

A single stream is transmitted (s1(i) is transmitted). The modulation scheme (of s1(i)) is BPSK (binary phase shift keying) (or $\pi/2$ shift BPSK) (however, the single stream modulated signal may be transmitted using a single antenna and, alternatively, transmitted using a plurality of antennas).

Transmission Method #2:

A single stream is transmitted (s1(i) is transmitted). The modulation scheme (of s1(i)) is QPSK (quadrature phase shift keying) (or $\pi/2$ shift QPSK) (however, the single stream modulated signal may be transmitted using a single antenna and, alternatively, transmitted using a plurality of antennas).

Transmission Method #3:

A single stream is transmitted (s1(i) is transmitted). The modulation scheme (of s1(i)) is 16 QAM (or $\pi/2$ shift 16 QAM) (or a modulation scheme in which 16 signal points are in the in-phase I-quadrature Q plane, such as 16APSK (APSK: amplitude phase shift keying) (a shift may be performed)) (however, the single stream modulated signal may be transmitted using a single antenna and, alternatively, transmitted using a plurality of antennas).

Transmission Method #4:

A single stream is transmitted (s1(i) is transmitted). The modulation scheme (of s1(i)) is 64 QAM (or $\pi/2$ shift 64 QAM) (or a modulation scheme in which 64 signal points are in the in-phase I-quadrature Q plane, such as 64APSK (APSK: amplitude phase shift keying) (a shift may be performed)) (however, the single stream modulated signal may be transmitted using a single antenna and, alternatively, transmitted using a plurality of antennas).

Transmission Method #5:

Two streams are transmitted (s1(i) and s2(i) are transmitted). The modulation scheme of s1(i) is BPSK (or $\pi/2$ shift BPSK), and the modulation scheme of s2(i) is BPSK (or $\pi/2$ shift BPSK). Here, two modulated signals are transmitted. The first modulated signal is transmitted using one or more antennas, and the second modulated signal is transmitted using one or more antennas.

Transmission Method #6:

Two streams are transmitted (s1(i) and s2(i) are transmitted). The modulation scheme of s1(i) is QPSK (or $\pi/2$ shift QPSK), and the modulation scheme of s2(i) is QPSK (or $\pi/2$ shift QPSK). Here, two modulated signals are transmitted.

The first modulated signal is transmitted using one or more antennas, and the second modulated signal is transmitted using one or more antennas.

Transmission Method #7:

Two streams are transmitted (s1(i) and s2(i) are transmitted). The modulation scheme of s1(i) is QPSK (or π/2 shift QPSK), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas.

Transmission Method #8:

Two streams are transmitted (s1(i) and s2(i) are transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas.

Transmission Method #9:

Two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas.

Here, based on FIG. 2 and FIG. 3, precoding (weighted synthesis) and a phase change are performed (phase changer 205B need not perform a phase change), and any one of the (precoding) matrices in Equation (13) through Equation (20) is used as the precoding matrix. However, θ in Equation (13) through Equation (20) is greater than or equal to 0 radians and less than 2π radians (0 radians≤θ<2π radians).

With this, the following is satisfied.

Transmission Method #1:

The number of signal points in the in-phase I-quadrature Q plane of the transmission signal is 2.

Transmission Method #2:

The number of signal points in the in-phase I-quadrature Q plane of the transmission signal is 4.

Transmission Method #3:

The number of signal points in the in-phase I-quadrature Q plane of the transmission signal is 16.

Transmission Method #4:

The number of signal points in the in-phase I-quadrature Q plane of the transmission signal is 64.

Transmission Method #5:

The number of signal points in the in-phase I-quadrature Q plane of the transmission signal is greater than or equal to 2 and less than or equal to 4. However, when θ=0 radians in Equation (13) through Equation (20), the number of signal points in the in-phase I-quadrature Q plane of the transmission signal is 2.

Transmission Method #6:

The number of signal points in the in-phase I-quadrature Q plane of the transmission signal is greater than or equal to 4 and less than or equal to 16. However, when θ=0 radians in Equation (13) through Equation (20), the number of signal points in the in-phase I-quadrature Q plane of the transmission signal is 4.

Transmission Method #7:

The number of signal points in the in-phase I-quadrature Q plane of the transmission signal is greater than or equal to 4 and less than or equal to 64. However, when θ=0 radians in Equation (13) through Equation (20), the number of signal points in the in-phase I-quadrature Q plane of the first transmission signal is 4, and the number of signal points in the in-phase I-quadrature Q plane of the second transmission signal is 16.

Transmission Method #8:

The number of signal points in the in-phase I-quadrature Q plane of the transmission signal is greater than or equal to 16 and less than or equal to 256. However, when θ=0 radians in Equation (13) through Equation (20), the number of signal points in the in-phase I-quadrature Q plane of the transmission signal is 16.

Transmission Method #9:

The number of signal points in the in-phase I-quadrature Q plane of the transmission signal is greater than or equal to 64 and less than or equal to 4096. However, when θ=0 radians in Equation (13) through Equation (20), the number of signal points in the in-phase I-quadrature Q plane of the transmission signal is 64.

As described above, the maximum number of signal points when the transmission device illustrated in FIG. 1 transmits the single stream modulated signal is 64.

When the influence of phase noise in RF (radio frequency) unit included in radio units 107_A, 107_B in the transmission device illustrated in FIG. 1 and the influence of non-linear distortion in the transmission power amplifier included in radio units 107_A, 107_B are taken into consideration, a modulation scheme in which the PAPR (peak-to-average power ratio) is low and a modulation scheme having a signal point arrangement that yields little phase noise influence are preferably used. Taking these into consideration, it is preferable that the number of signal points in the in-phase I-quadrature Q plane of the transmission signal (modulated signal) be reduced. As described above, when the transmission device can select from a plurality of transmission methods, since, by minimizing the number of signal points in the in-phase I-quadrature Q plane in the transmission method having the largest number of signal points in the in-phase I-quadrature Q plane, influence of phase noise in the RF unit can be inhibited and influence of non-linear distortion in the transmission power amplifier can be inhibited in the transmission device, in the reception device that receives the modulated signal transmitted by the transmission device illustrated in FIG. 1, it is possible to achieve an advantageous effect that the data reception quality is improved. Moreover, when the transmission device illustrated in FIG. 1 transmits a modulated signal characterized by low phase noise influence in the RF unit and low non-linear distortion in the transmission power amplifier, an advantageous effect that the scale of the circuits for the RF unit and transmission power amplifier in the transmission device can be reduced can be achieved (when the PAPR greatly varies from modulation scheme to modulation scheme, for example, an RF unit and transmission power amplification unit need to be provided for each modulation scheme, thereby increasing the scale of circuitry).

As described above, the maximum number of signal points when the transmission device illustrated in FIG. 1 transmits the single stream modulated signal is 64. Accordingly, if the maximum number of signal points when the transmission device illustrated in FIG. 1 transmits two streams of modulated signals can be kept to 64, the above-described advantageous effects can be achieved.

On the other hand, when the transmission device illustrated in FIG. 1 transmits two streams of modulated signals, and the s1(i) signal is transmitted from a plurality of antennas and the s2(i) signal is transmitted from a plurality of antennas, the advantageous effects of transmit diversity are achieved, so the reception device that receives the modulated signal transmitted by the transmission device illustrated in FIG. 1 can achieve the advantageous effect that data reception quality is improved. However, in order to achieve this advantageous effect, it is important that the modulated signal transmitted by the transmission device illustrated in FIG. 1 exhibit a small phase noise influence in the RF unit and a small non-linear distortion influence in the transmission power amplifier.

In view of this, consider a first or second selection method.

First Selection Method:

The transmission device illustrated in FIG. 1 switches the transmission method of the modulated signal based on information on the transmission method included in control signal 100. Here, the transmission device illustrated in FIG. 1 can select the following transmission methods.

Transmission Method #1-1:

A single stream is transmitted (s1(i) is transmitted). The modulation scheme (of s1(i)) is BPSK (or $\pi/2$ shift BPSK) (however, the single stream modulated signal may be transmitted using a single antenna and, alternatively, transmitted using a plurality of antennas).

Transmission Method #1-2:

A single stream is transmitted (s1(i) is transmitted). The modulation scheme (of s1(i)) is QPSK (or $\pi/2$ shift QPSK) (however, the single stream modulated signal may be transmitted using a single antenna and, alternatively, transmitted using a plurality of antennas).

Transmission Method #1-3:

A single stream is transmitted (s1(i) is transmitted). The modulation scheme of s1(i) is 16 QAM (or $\pi/2$ shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #1-4:

A single stream is transmitted (s1(i) is transmitted). The modulation scheme of s1(i) is 64 QAM (or $\pi/2$ shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #1-5:

Two streams are transmitted (s1(i) and s2(i) are transmitted). The modulation scheme of s1(i) is BPSK (or $\pi/2$ shift BPSK), and the modulation scheme of s2(i) is BPSK (or $\pi/2$ shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians$\leq \theta < 2\pi$ radians)).

Transmission Method #1-6:

Two streams are transmitted (s1(i) and s2(i) are transmitted). The modulation scheme of s1(i) is QPSK (or $\pi/2$ shift QPSK), and the modulation scheme of s2(i) is QPSK (or $\pi/2$ shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians$\leq \theta < 2\pi$ radians)).

Transmission Method #1-7:

Two streams are transmitted (s1(i) and s2(i) are transmitted). The modulation scheme of s1(i) is QPSK (or $\pi/2$ shift QPSK), and the modulation scheme of s2(i) is 16 QAM (or $\pi/2$ shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians$\leq \theta < 2\pi$ radians)) (when $\theta = \pi/4$ radians (45 degrees), the average transmission power of the modulated signals transmitted from the antennas is equal).

Transmission Method #1-8:

Two streams are transmitted (s1(i) and s2(i) are transmitted). The modulation scheme of s1(i) is 16 QAM (or $\pi/2$ shift 16 QAM) (or a modulation scheme in which 16 signal points are in the in-phase I-quadrature Q plane, such as 16APSK (a shift may be performed)), and the modulation scheme of s2(i) is 16 QAM (or $\pi/2$ shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Transmission Method #1-9:

Two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Note that in the first selection method, the transmission method need not correspond to all transmission methods from transmission method #1-1 to transmission method #1-9. For example, in the first selection method, the transmission method may correspond to one or more transmission method from among the following three transmission methods: transmission method #1-5, transmission method #1-6, and transmission method #1-7. In the first transmission method, the transmission method may correspond to one or more transmission method from among the following two transmission methods: transmission method #1-8 and transmission method #1-9.

In the first selection method, the transmission method need not correspond to transmission method #1-1 (in the first selection method, the transmission method need not include transmission method #1-1 in the transmission method selection candidates in the transmission device illustrated in FIG. 1).

The first selection method may include a transmission method other than those from transmission method #1-1 to transmission method #1-9. Here, the following is satisfied.

Transmission Method #1-1:

The number of signal points in the in-phase I-quadrature Q plane of the transmission signal is 2.

Transmission Method #1-2:

The number of signal points in the in-phase I-quadrature Q plane of the transmission signal is 4.

Transmission Method #1-3:

The number of signal points in the in-phase I-quadrature Q plane of the transmission signal is 16.

Transmission Method #1-4:

The number of signal points in the in-phase I-quadrature Q plane of the transmission signal is 64.

Transmission Method #1-5:

The number of signal points in the in-phase I-quadrature Q plane of the transmission signal is greater than 2 and less than or equal to 4. The advantageous effect of transmit diversity is achievable.

Transmission Method #1-6:

The number of signal points in the in-phase I-quadrature Q plane of the transmission signal is greater than 4 and less than or equal to 16. The advantageous effect of transmit diversity is achievable.

Transmission Method #1-7:

The number of signal points in the in-phase I-quadrature Q plane of the transmission signal is greater than 4 and less than or equal to 64. The advantageous effect of transmit diversity is achievable.

Transmission Method #1-8:

The number of signal points in the in-phase I-quadrature Q plane of the transmission signal is 16.

Transmission Method #1-9:

The number of signal points in the in-phase I-quadrature Q plane of the transmission signal is 64.

Since the above-described characteristics are achieved, by using the first selection method, in the transmission device illustrated in FIG. 1, influence of phase noise in RF unit and influence of non-linear distortion in transmission power amplifier can be reduced, and advantageous effect of transmit diversity is achievable in transmission method #1-5 through transmission method #1-7. Accordingly, in the reception device that receives the modulated signal transmitted by the transmission device illustrated in FIG. 1, it is possible to achieve an advantageous effect of improvement in data reception quality.

Second Selection Method:

Transmission Method #2-1:

A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).

Transmission Method #2-2:

A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).

Transmission Method #2-3:

A single stream is transmitted (s1(i) is transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #2-4:

A single stream is transmitted (s1(i) is transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #2-5:

Two streams are transmitted (s1(i) and s2(i) are transmitted). The modulation scheme of s1(i) is BPSK (or π/2 shift BPSK), and the modulation scheme of s2(i) is BPSK (or π/2 shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Transmission Method #2-6:

Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Transmission Method #2-7:

Two streams are transmitted (s1(i) and s2(i) are transmitted). The modulation scheme of s1(i) is QPSK (or π/2 shift QPSK), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)) (when θ=π/4 radians (45 degrees), the average transmission power of the modulated signals transmitted from the antennas is equal).

Transmission Method #2-8:

Two streams are transmitted (s1(i) and s2(i) are transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Transmission Method #2-9:

Two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Note that in the second selection method, the transmission method need not correspond to all transmission methods from transmission method #2-1 to transmission method #2-9. For example, in the second selection method, the transmission method may correspond to one or more transmission method from among the following three transmission methods: transmission method #2-5, transmission method #2-6, and transmission method #2-7. In the second transmission method, the transmission method may correspond to one or more transmission method from among the following two transmission methods: transmission method #2-8 and transmission method #2-9.

In the second selection method, the transmission method need not correspond to transmission method #2-1 (in the second selection method, the transmission method need not include transmission method #2-1 in the transmission method selection candidates in the transmission device illustrated in FIG. 1).

The second selection method may include a transmission method other than those from transmission method #2-1 to transmission method #2-9.

Here, the following is satisfied.
Transmission Method #2-1:
The number of signal points in the in-phase I-quadrature Q plane of the transmission signal is 2.
Transmission Method #2-2:
The number of signal points in the in-phase I-quadrature Q plane of the transmission signal is 4.
Transmission Method #2-3:
The number of signal points in the in-phase I-quadrature Q plane of the transmission signal is 16.
Transmission Method #2-4:
The number of signal points in the in-phase I-quadrature Q plane of the transmission signal is 64.
Transmission Method #2-5:
The number of signal points in the in-phase I-quadrature Q plane of the transmission signal is greater than or equal to 2 and less than or equal to 4. There are cases in which the advantageous effect of transmit diversity is achievable.
Transmission Method #2-6:
The number of signal points in the in-phase I-quadrature Q plane of the transmission signal is greater than or equal to 4 and less than or equal to 16. There are cases in which the advantageous effect of transmit diversity is achievable.
Transmission Method #2-7:
The number of signal points in the in-phase I-quadrature Q plane of the transmission signal is greater than 4 and less than or equal to 64. The advantageous effect of transmit diversity is achievable.
Transmission Method #2-8:
The number of signal points in the in-phase I-quadrature Q plane of the transmission signal is 16.
Transmission Method #2-9:
The number of signal points in the in-phase I-quadrature Q plane of the transmission signal is 64.

Since the above-described characteristics are achieved, by using the second selection method, in the transmission device illustrated in FIG. 1, influence of phase noise in RF unit and influence of non-linear distortion in transmission power amplifier can be reduced, and there are cases in which the advantageous effect of transmit diversity is achievable in transmission method #2-5 through transmission method #2-7. Accordingly, in the reception device that receives the modulated signal transmitted by the transmission device illustrated in FIG. 1, it is possible to achieve an advantageous effect of improvement in data reception quality.

Moreover, a third selection method, which is a combination of the first selection method and the second selection method, may be used.
Third Selection Method:
The transmission device illustrated in FIG. 1 switches the transmission method of the modulated signal based on information on the transmission method included in control signal 100. Here, the transmission method illustrated in FIG. 1 can select the following transmission methods.

Transmission Method #3-1:
A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).
Transmission Method #3-2:
A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).
Transmission Method #3-3:
A single stream is transmitted (s1(i) is transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).
Transmission Method #3-4:
A single stream is transmitted (s1(i) is transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).
Transmission Method #3-5:
Either one of transmission method #1-5 or transmission method #2-5.
Transmission Method #3-6:
Either one of transmission method #1-6 or transmission method #2-6.
Transmission Method #3-7:
Two streams are transmitted (s1(i) and s2(i) are transmitted). The modulation scheme of s1(i) is QPSK (or π/2 shift QPSK), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).
Transmission Method #3-8:
Two streams are transmitted (s1(i) and s2(i) are transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta=0$ radians in Equation (13) through Equation (20) (note that $\theta$ is greater than or equal to 0 radians and less than $2\pi$ radians (0 radians$\leq \theta < 2\pi$ radians)).

Transmission Method #3-9:

Two streams are transmitted (s1(i) and s2(i) are transmitted). The modulation scheme of s1(i) is 64 QAM (or $\pi/2$ shift 64 QAM) (or a modulation scheme in which 64 signal points are in the in-phase I-quadrature Q plane, such as 16APSK (a shift may be performed)), and the modulation scheme of s2(i) is 64 QAM (or $\pi/2$ shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta=0$ radians in Equation (13) through Equation (20) (note that $\theta$ is greater than or equal to 0 radians and less than $2\pi$ radians (0 radians$\leq \theta < 2\pi$ radians)).

Note that in the third selection method, the transmission method need not correspond to all transmission methods from transmission method #3-1 to transmission method #3-9. For example, in the third selection method, the transmission method may correspond to one or more transmission method from among the following three transmission methods: transmission method #3-5, transmission method #3-6, and transmission method #3-7. In the third transmission method, the transmission method may correspond to one or more transmission method from among the following two transmission methods: transmission method #3-8 and transmission method #3-9.

In the third selection method, the transmission method need not correspond to transmission method #3-1 (in the third selection method, the transmission method need not include transmission method #3-1 in the transmission method selection candidates in the transmission device illustrated in FIG. 1).

The third selection method may include a transmission method other than those from transmission method #3-1 to transmission method #3-9.

Since the above-described characteristics are achieved, by using the third selection method, in the transmission device illustrated in FIG. 1, influence of phase noise in RF unit and influence of non-linear distortion in transmission power amplifier can be reduced, and there are cases in which the advantageous effect of transmit diversity is achievable in transmission method #3-5 through transmission method #3-7. Accordingly, in the reception device that receives the modulated signal transmitted by the transmission device illustrated in FIG. 1, it is possible to achieve an advantageous effect of improvement in data reception quality.

Figure 5:
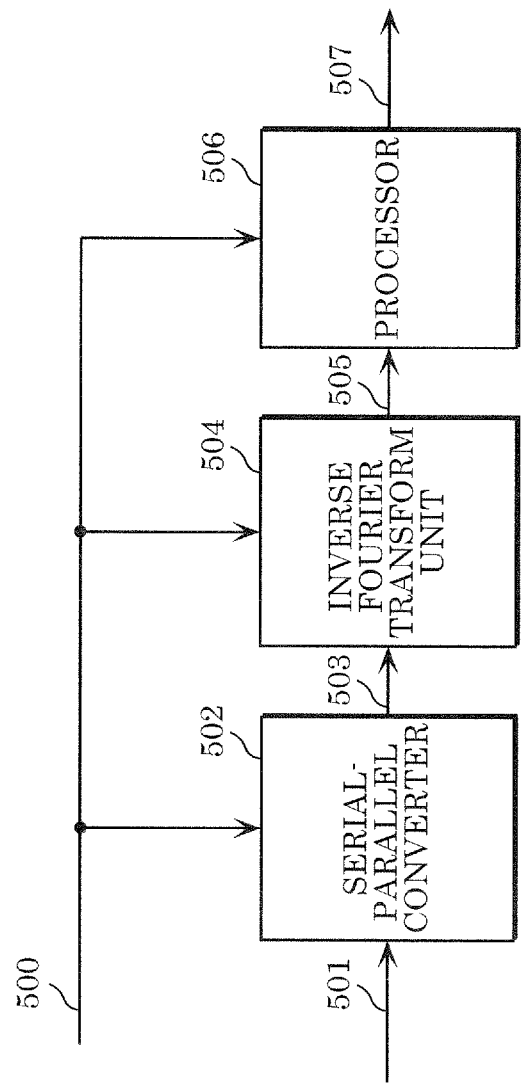
FIG. 5 illustrates one example of a configuration of a radio unit in a transmission device.

FIG. 5 illustrates one example of a configuration of radio units 107_A and 107_B illustrated in FIG. 1 when the transmission device illustrated in FIG. 1 has an OFDM (orthogonal frequency division multiplexing) configuration. Serial-parallel converter 502 receives inputs of signal 501 and control signal 500 (control signal 100 in FIG. 1), applies a serial-parallel conversion based on control signal 500, and outputs serial-parallel converted signal 503.

Inverse Fourier transform unit 504 receives inputs of serial-parallel converted signal 503 and control signal 500, and based on control signal 500, applies, as one example of an inverse Fourier transform, an IFFT (inverse fast Fourier transform), and outputs inverse Fourier transformed signal 505.

Processor 506 receives inputs of inverse Fourier transformed signal 505 and control signal 500, applies processing such as frequency conversion and amplification based on control signal 500, and outputs modulated signal 507.

(For example, when signal 501 is signal-processed signal 106_A illustrated in FIG. 1, modulated signal 507 corresponds to transmission signal 108_A in FIG. 1. Moreover, when signal 501 is signal-processed signal 106_B illustrated in FIG. 1, modulated signal 507 corresponds to transmission signal 108_B in FIG. 1.)

Figure 6:
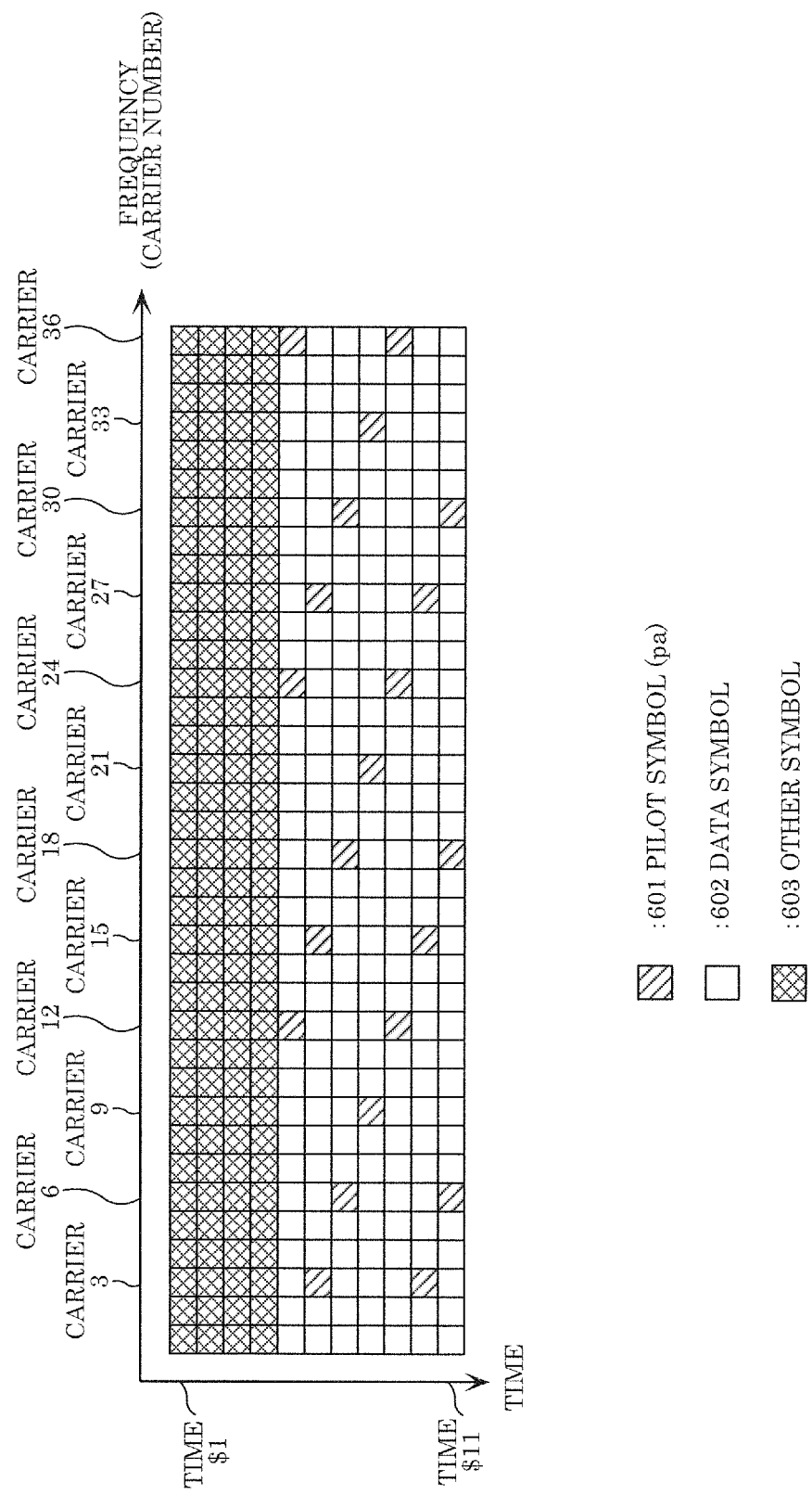
FIG. 6 illustrates one example of a frame configuration of a transmission signal.

FIG. 6 illustrates a frame configuration of transmission signal 108_A illustrated in FIG. 1. In FIG. 6, frequency (carriers) is (are) represented on the horizontal axis and time is represented on the vertical axis. Since a multi-carrier transmission method such as OFDM is used, symbols are present in the carrier direction. In FIG. 6, symbols from carriers 1 to 36 are shown. Moreover, in FIG. 6, symbols for time $1 through time $11 are shown.

In FIG. 6, 601 is a pilot symbol (pilot signal 251A (pa(t) in FIG. 2, FIG. 3)), 602 is a data symbol, and 603 is an other symbol. Here, a pilot symbol is, for example, a PSK (phase shift keying) symbol, and is a symbol for the reception device that receives this frame to perform channel estimation (propagation path fluctuation estimation), frequency offset estimation, and phase fluctuation estimation. For example, the transmission device illustrated in FIG. 1 and the reception device that receives the frame illustrated in FIG. 6 may share the transmission method of the pilot symbol.

Note that mapped signal 201A (mapped signal 105_1 in FIG. 1) is referred to as "stream #1" and mapped signal 201B (mapped signal 105_2 in FIG. 1) is referred to as "stream #2". Note that this also applied to subsequent descriptions.

Data symbol 602 is a symbol that corresponds to a data symbol included in baseband signal 208A generated in the signal processing illustrated in FIG. 2, FIG. 3. Accordingly, data symbol 602 satisfies "a symbol including both the symbol "stream #1" and the symbol "stream #2"", "the symbol "stream #1"", or "the symbol "stream #2"", as determined by the configuration of the precoding matrix used by weighting synthesizer 203 (in other words, data symbol 602 corresponds to weighting synthesized signal 204A (z1(i))).

Other symbols 603 are symbols corresponding to preamble signal 252 and control information symbol signal 253 illustrated in FIG. 2, FIG. 3 (however, the other symbols may include symbols other than a preamble or control information symbol). Here, a preamble may transmit data (control data), and may be configured as, for example, a symbol for signal detection, a signal for performing frequency and time synchronization, or a symbol for performing channel estimation (a symbol for performing propagation path fluctuation estimation). The control information symbol is a symbol including control information for the reception device that received the frame in FIG. 6 to demodulate and decode a data symbol.

For example, carriers $1 to 36 from time $1 to time $4 in FIG. 6 are other symbols 603. Then, at time $5, carrier 1 through carrier 11 are data symbols 602. Thereafter, at time $5, carrier 12 is pilot symbol 601, at time $5, carriers 13 to 23 are data symbols 602, at time $5, carrier 24 is pilot symbol 601 . . . at time $6, carriers 1 and 2 are data symbols 602, at time $6, carrier 3 is pilot symbol 601 . . . at time $11, carrier 30 is pilot symbol 601, at time $11, carriers 31 to 36 are data symbols 602.

Figure 7:
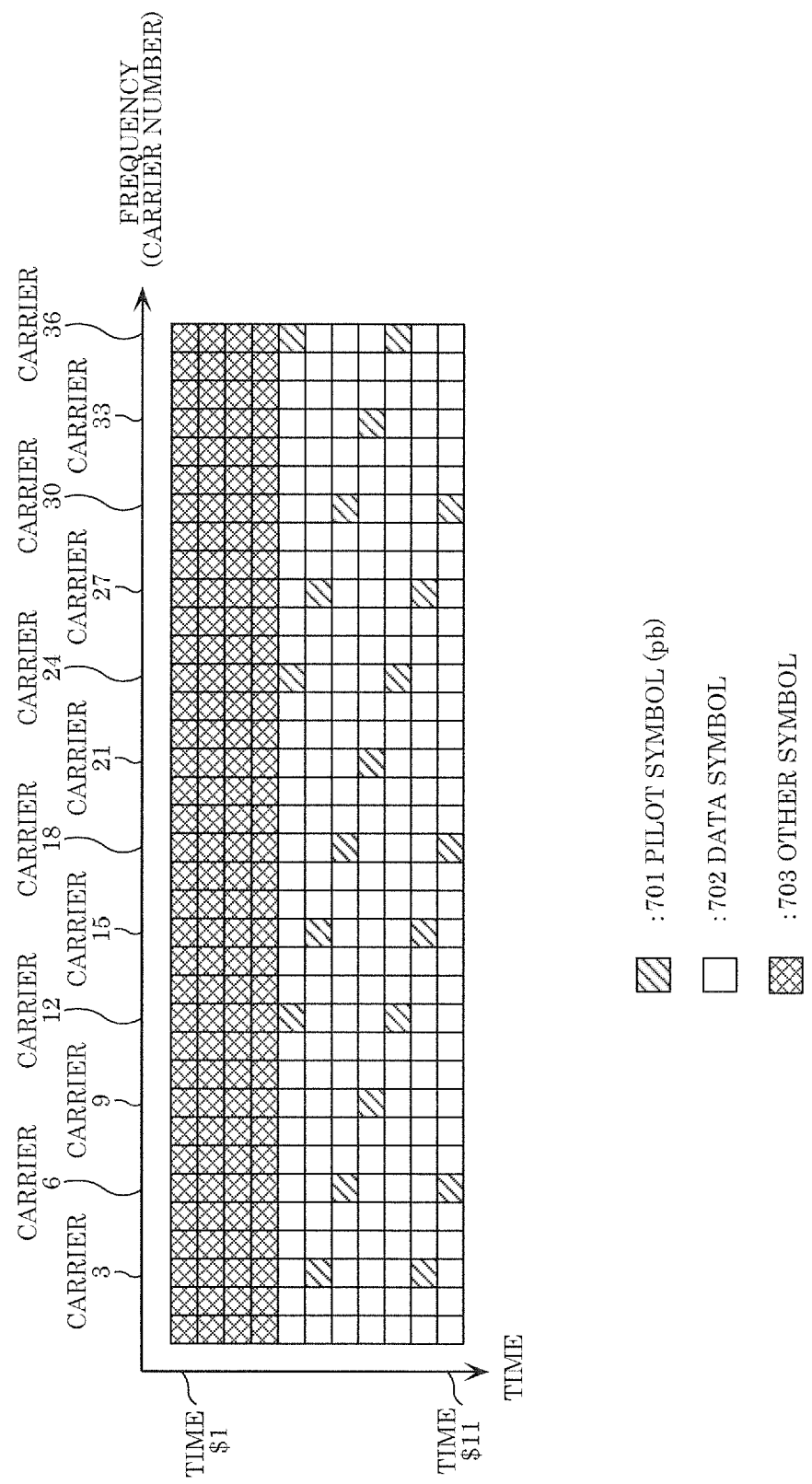
FIG. 7 illustrates one example of a frame configuration of a transmission signal.

FIG. 7 illustrates a frame configuration of transmission signal 108_B illustrated in FIG. 1. In FIG. 7, frequency (carriers) is (are) represented on the horizontal axis and time is represented on the vertical axis. Since a multi-carrier transmission method such as OFDM is used, symbols are present in the carrier direction. In FIG. 7, symbols from carriers 1 to 36 are shown. Moreover, in FIG. 7, symbols for time $1 through time $11 are shown.

In FIG. 7, 701 is a pilot symbol (pilot signal 251B (pb(t) in FIG. 2, FIG. 3)), 702 is a data symbol, and 703 is an other symbol. Here, a pilot symbol is, for example, a PSK symbol, and is a symbol for the reception device that receives this frame to perform channel estimation (propagation path fluctuation estimation), frequency offset estimation, and phase fluctuation estimation. For example, the transmission device illustrated in FIG. 1 and the reception device that receives the frame illustrated in FIG. 7 may share the transmission method of the pilot symbol.

Data symbol 702 is a symbol that corresponds to a data symbol included in baseband signal 208B generated in the signal processing illustrated in FIG. 2, FIG. 3. Accordingly, data symbol 702 satisfies "a symbol including both the symbol "stream #1" and the symbol "stream #2"", "the symbol "stream #1"", or "the symbol "stream #2"", as determined by the configuration of the precoding matrix used by weighting synthesizer 203 (in other words, data symbol 702 corresponds to phase-changed signal 206B (z2(i))).

Other symbols 703 are symbols corresponding to preamble signal 252 and control information symbol signal 253 illustrated in FIG. 2, FIG. 3 (however, the other symbols may include symbols other than a preamble or control information symbol). Here, a preamble may transmit data (control data), and is configured as, for example, a symbol for signal detection, a signal for performing frequency and time synchronization, or a symbol for performing channel estimation (a symbol for performing propagation path fluctuation estimation). The control information symbol is a symbol including control information for the reception device that received the frame in FIG. 7 to demodulate and decode a data symbol.

For example, carriers 1 to 36 from time $1 to time $4 in FIG. 7 are other symbols 703. Then, at time $5, carrier 1 through carrier 11 are data symbols 702. Thereafter, at time $5, carrier 12 is pilot symbol 701, at time $5, carriers 13 to 23 are data symbols 702, at time $5, carrier 24 is pilot symbol 701 . . . at time $6, carriers 1 and 2 are data symbols 702, at time $6, carrier 3 is pilot symbol 701 . . . at time $11, carrier 30 is pilot symbol 701, at time $11, carriers 31 to 36 are data symbols 702.

When a symbol is present in carrier A at time $B in FIG. 6 and a symbol is present in carrier A at time $B in FIG. 7, the symbol in carrier A at time $B in FIG. 6 and the symbol in carrier A at time $B in FIG. 5 are transmitted at the same time and same frequency. Note that the frame configuration is not limited to the configurations illustrated in FIG. 6 and FIG. 7; FIG. 6 and FIG. 7 are mere examples of frame configurations.

The other symbols in FIG. 6 and FIG. 7 are symbols corresponding to "preamble signal 252 and control symbol 253 in FIG. 2, FIG. 3". Accordingly, when an other symbol 603 in FIG. 6 at the same time and same frequency (same carrier) as an other symbol 703 in FIG. 7 transmits control information, it transmits the same data (the same control information).

Note that this is under the assumption that the frame of FIG. 6 and the frame of FIG. 7 are received at the same time by the reception device, but even when the frame of FIG. 6 or the frame of FIG. 7 has been received, the reception device can obtain the data transmitted by the transmission device.

Figure 8:
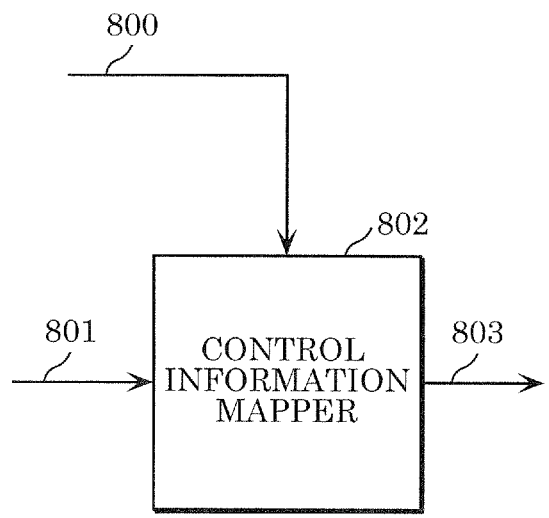
FIG. 8 illustrates one example of a configuration of components relevant to control information generation.

FIG. 8 illustrates one example of components relating to control information generation for generating control information symbol signal 253 illustrated in FIG. 2, FIG. 3.

Control information mapper 802 receives inputs of data 801 related to control information and control signal 800, maps data 801 related to control information in using a modulation scheme based on control signal 800, and outputs control information mapped signal 803. Note that control information mapped signal 803 corresponds to control information symbol signal 253 in FIG. 2, FIG. 3.

Figure 9:
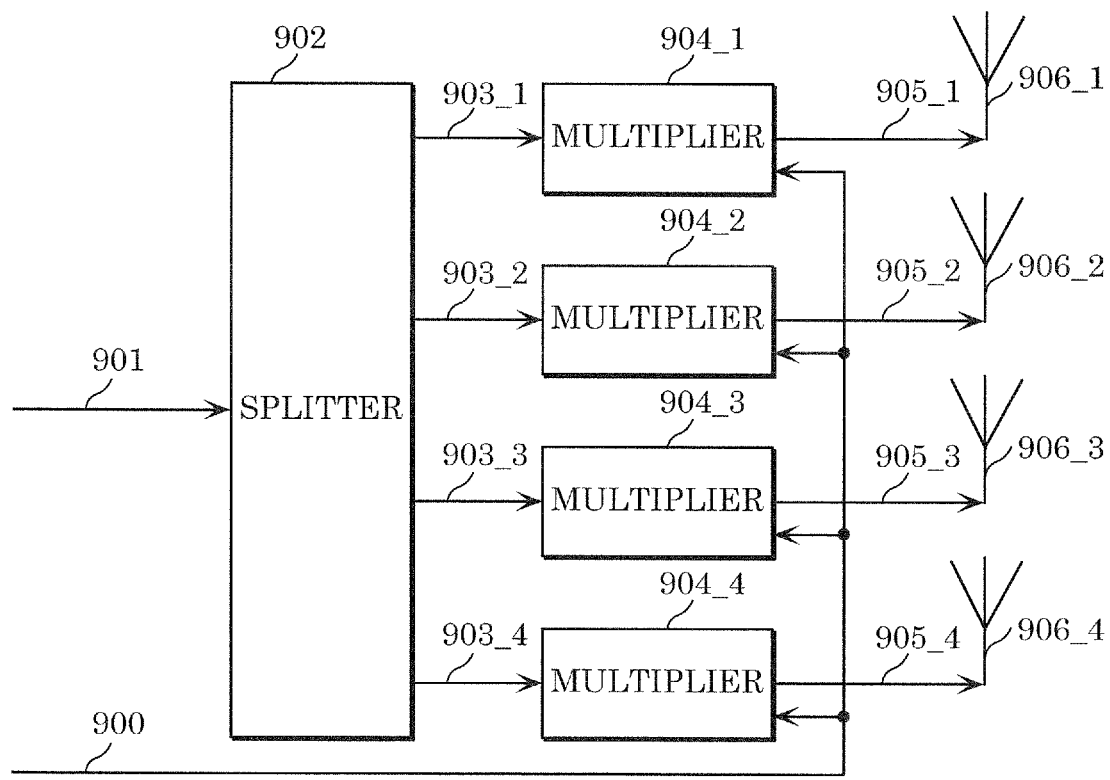
FIG. 9 illustrates one example of a configuration of an antenna unit in a transmission device.

FIG. 9 illustrates one example of a configuration of antenna unit #A (109_A), antenna #B (109_B) illustrated in FIG. 1 (antenna unit #A (109_A) and antenna unit #B (109_B) are exemplified as including a plurality of antennas).

Splitter 902 receives an input of transmission signal 901, performs splitting, and outputs transmission signals 903_1, 903_2, 903_3, and 903_4.

Multiplier 904_1 receives inputs of transmission signal 903_1 and control signal 900, and based on the multiplication coefficient included in control signal 900, multiplies a multiplication coefficient with transmission signal 903_1, and outputs multiplied signal 905_1. Multiplied signal 905_1 is output from antenna 906_1 as radio waves.

When transmission signal 903_1 is expressed as Tx1(t) (t is time) and the multiplication coefficient is expressed as W1 (W1 can be defined as a complex number and thus may be a real number), multiplied signal 905_1 can be expressed as Tx1(t)×W1.

Multiplier 904_2 receives inputs of transmission signal 903_2 and control signal 900, and based on the multiplication coefficient included in control signal 900, multiplies a multiplication coefficient with transmission signal 903_2, and outputs multiplied signal 905_2. Multiplied signal 905_2 is output from antenna 906_2 as radio waves.

When transmission signal 903_2 is expressed as Tx2(t) and the multiplication coefficient is expressed as W2 (W2 can be defined as a complex number and thus may be a real number), multiplied signal 905_2 can be expressed as Tx2(t)×W2.

Multiplier 904_3 receives inputs of transmission signal 903_3 and control signal 900, and based on the multiplication coefficient included in control signal 900, multiplies a multiplication coefficient with transmission signal 903_3, and outputs multiplied signal 905_3. Multiplied signal 905_3 is output from antenna 906_3 as radio waves.

When transmission signal 903_3 is expressed as Tx3(t) and the multiplication coefficient is expressed as W3 (W3 can be defined as a complex number and thus may be a real number), multiplied signal 905_3 can be expressed as Tx3(t)×W3.

Multiplier 904_4 receives inputs of transmission signal 903_4 and control signal 900, and based on the multiplication coefficient included in control signal 900, multiplies a multiplication coefficient with transmission signal 903_4, and outputs multiplied signal 905_4. Multiplied signal 905_4 is output from antenna 906_4 as radio waves.

When transmission signal 903_4 is expressed as Tx4(t) and the multiplication coefficient is expressed as W4 (W4 can be defined as a complex number and thus may be a real number), multiplied signal 905_4 can be expressed as Tx4(t)×W4.

Note that "the absolute value of W1, the absolute value of W2, the absolute value of W3, and the absolute value of W4 are equal" may be true. Here, this is the equivalent of having performed a phase change (it goes without saying that the absolute value of W1, the absolute value of W2, the absolute value of W3, and the absolute value of W4 may be unequal).

Moreover, in FIG. 9, the antenna unit is exemplified as including four antennas (and four multipliers), but the number of antennas is not limited to four; the antenna unit may include two or more antennas.

When the configuration of antenna unit #A (109_A) in FIG. 1 is as illustrated in FIG. 9, transmission signal 901 corresponds to transmission signal 108_A in FIG. 1. When the configuration of antenna unit #B (109_B) in FIG. 1 is as illustrated in FIG. 9, transmission signal 901 corresponds to transmission signal 108_B in FIG. 1 and transmission signal 108_B in FIG. 1. However, antenna unit #A (109_A) and antenna unit #B (109_B) need not have the configurations illustrated in FIG. 9; as previously described, the antenna units need not receive an input of control signal 100. For example, antenna unit #A (109_A), antenna unit #B (109_B) illustrated in FIG. 1 may include one antenna and, alternatively, may include a plurality of antennas.

Figure 10:
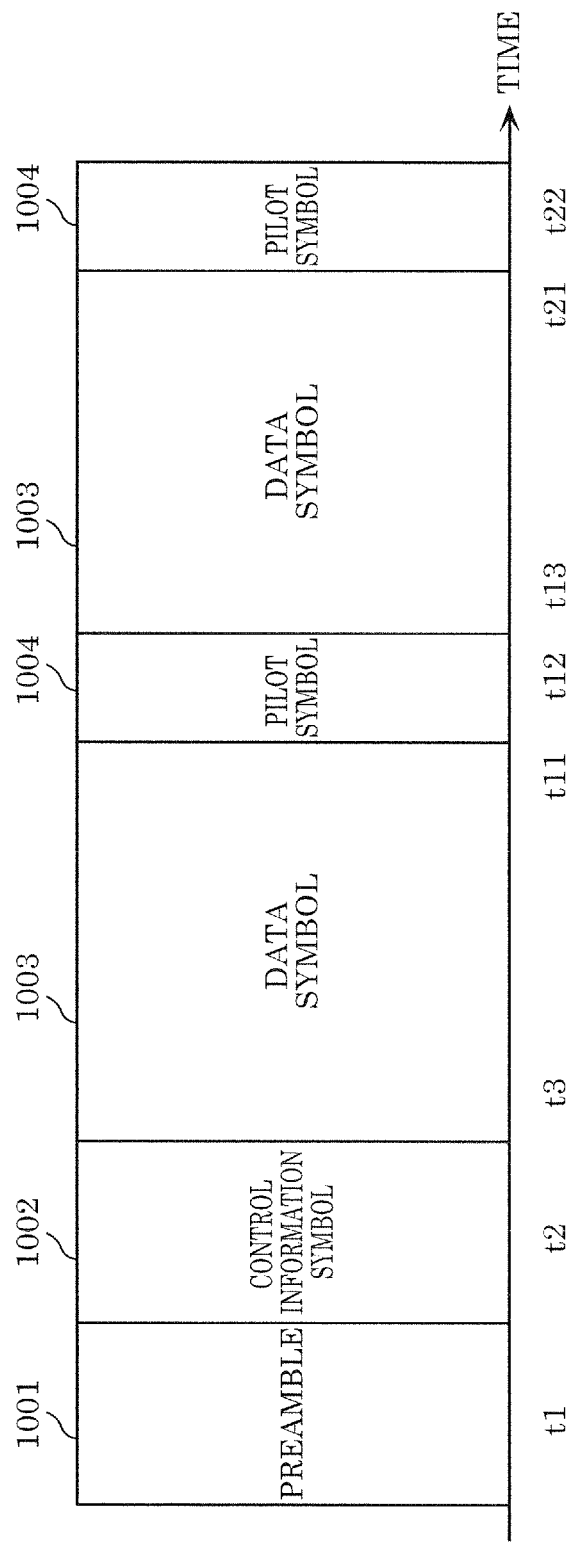
FIG. 10 illustrates one example of a frame configuration of a transmission signal.

FIG. 10 illustrates an example of a frame configuration of transmission signal 108_A illustrated in FIG. 1. In FIG. 10, time is represented on the horizontal axis. The difference between FIG. 10 and FIG. 6 is that the frame configuration illustrated in FIG. 10 is an example of a frame configuration when a single-carrier scheme is used, and symbols are present along the time axis. In FIG. 10, symbols from time t1 to t22 are shown.

Preamble 1001 in FIG. 10 corresponds to preamble signal 252 in, for example, FIG. 2, FIG. 3. Here, for example, the preamble may transmit data (for control purposes), may be a symbol for signal detection, a symbol for frequency and time synchronization, or a symbol for channel estimation (a symbol for propagation path fluctuation estimation).

Control information symbol 1002 in FIG. 10 is a symbol that corresponds to control information symbol signal 253 in, for example, FIG. 2, FIG. 3, and is a symbol including control information for realizing demodulation and decoding of data symbols by the reception device that received the frame illustrated in FIG. 10.

Pilot symbol 1004 illustrated in FIG. 10 is a symbol corresponding to pilot signal 251A (pa(t)) such as in FIG. 2, FIG. 3. Pilot symbol 1004 is, for example, a PSK symbol, and is used by the reception device that receives the frame for, for example, channel estimation (propagation path variation estimation), frequency offset estimation, and phase variation estimation. For example, the transmission device illustrated in FIG. 1 and the reception device that receives the frame illustrated in FIG. 10 may share the pilot symbol transmission method.

1003 in FIG. 10 is a data symbol for transmitting data.

Note that mapped signal 201A (mapped signal 105_1 in FIG. 1) is referred to as "stream #1" and mapped signal 201B (mapped signal 105_2 in FIG. 1) is referred to as "stream #2".

Data symbol 1003 is a symbol that corresponds to a data symbol included in baseband signal 208A generated in the signal processing illustrated in FIG. 2, FIG. 3. Accordingly, data symbol 1003 satisfies "a symbol including both the symbol "stream #1" and the symbol "stream #2"", "the symbol "stream #1"", or "the symbol "stream #2"", as determined by the configuration of the precoding matrix used by weighting synthesizer 203 (in other words, data symbol 1003 corresponds to weighting synthesized signal 204A (z1(i))).

Note that, although not illustrated in FIG. 10, the frame may include symbols other than a preamble, control information symbol, data symbol, and pilot symbol.

For example, in FIG. 10, the transmission device transmits preamble 1001 at time t1, transmits control information symbol 1002 at time t2, transmits data symbols 1003 from time t3 to time t11, transmits pilot symbol 1004 at time t12, transmits data symbols 1003 from time t13 to time t21, and transmits pilot symbol 1004 at time t22.

Figure 11:
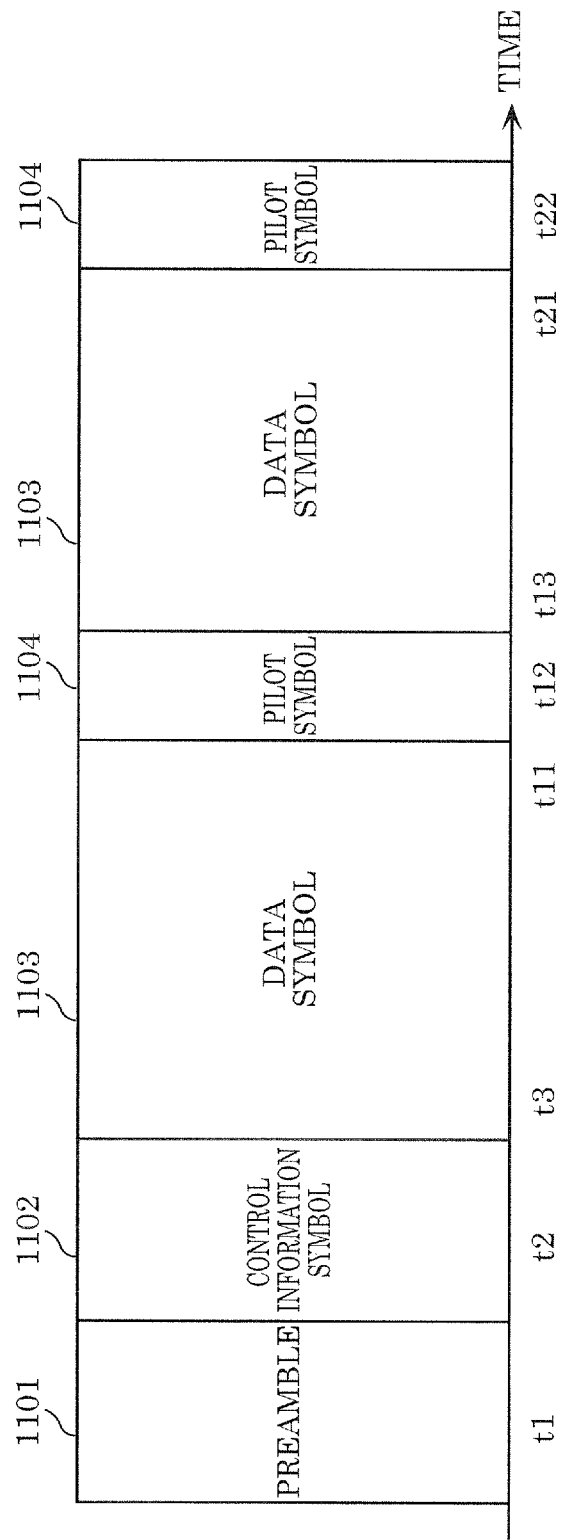
FIG. 11 illustrates one example of a frame configuration of a transmission signal.

FIG. 11 illustrates an example of a frame configuration of transmission signal 108_B illustrated in FIG. 1. In FIG. 11, time is represented on the horizontal axis. The difference between FIG. 11 and FIG. 7 is that the frame configuration illustrated in FIG. 11 is an example of a frame configuration when a single-carrier scheme is used, and symbols are present along the time axis. In FIG. 11, symbols from time t1 to t22 are shown.

Preamble 1101 in FIG. 11 corresponds to preamble signal 252 in, for example, FIG. 2, FIG. 3. Here, a preamble may transmit data (for control purposes), and may be configured as, for example, a symbol for signal detection, a signal for performing frequency and time synchronization, or a symbol for performing channel estimation (a symbol for performing propagation path fluctuation estimation).

Control information symbol 1102 in FIG. 11 is a symbol that corresponds to control information symbol signal 253 in, for example, FIG. 2, FIG. 3, and is a symbol including control information for realizing demodulation and decoding of data symbols by the reception device that received the frame illustrated in FIG. 11.

Pilot symbol 1104 illustrated in FIG. 11 is a symbol corresponding to pilot signal 251B (pb(t)) such as in FIG. 2, FIG. 3. Pilot symbol 1104 is, for example, a PSK symbol, and is used by the reception device that receives the frame for, for example, channel estimation (propagation path variation estimation), frequency offset estimation, and phase variation estimation. For example, the transmission device illustrated in FIG. 1 and the reception device that receives the frame illustrated in FIG. 11 may share the pilot symbol transmission method.

1103 in FIG. 11 is a data symbol for transmitting data.

Note that mapped signal 201A (mapped signal 105_1 in FIG. 1) is referred to as "stream #1" and mapped signal 201B (mapped signal 105_2 in FIG. 1) is referred to as "stream #2".

Data symbol 1103 is a symbol that corresponds to a data symbol included in baseband signal 208B generated in the signal processing illustrated in FIG. 2, FIG. 3. Accordingly, data symbol 1103 satisfies "a symbol including both the symbol "stream #1" and the symbol "stream #2"", "the symbol "stream #1"", or "the symbol "stream #2"", as determined by the configuration of the precoding matrix used by weighting synthesizer 203 (in other words, data symbol 1103 corresponds to phase-changed signal 206B ($z2(i)$)).

Note that, although not illustrated in FIG. 11, the frame may include symbols other than a preamble, control information symbol, data symbol, and pilot symbol.

For example, in FIG. 11, the transmission device transmits preamble 1101 at time t1, transmits control information symbol 1102 at time t2, transmits data symbols 1103 from time t3 to time t11, transmits pilot symbol 1104 at time t12, transmits data symbols 1103 from time t13 to time t21, and transmits pilot symbol 1104 at time t22.

When a symbol is present at time tp in FIG. 10 and a symbol is present at time tp in FIG. 10 (where p is an integer that is greater than or equal to 1), the symbol at time tp in FIG. 10 and the symbol at time tp in FIG. 11 are transmitted at the same time and same frequency (for example, the data symbol at time t3 in FIG. 10 and the data symbol at time t3 in FIG. 11 are transmitted at the same time and same frequency). Note that the frame configuration is not limited to the configurations illustrated in FIG. 10 and FIG. 11; FIG. 10 and FIG. 11 are mere examples of frame configurations.

Moreover, a method in which the preamble and control information symbol in FIG. 10 and FIG. 11 transmit the same data (same control information) may be used.

Note that this is under the assumption that the frame of FIG. 10 and the frame of FIG. 11 are received at the same time by the reception device, but even when the frame of FIG. 10 or the frame of FIG. 11 has been received, the reception device can obtain the data transmitted by the transmission device.

Figure 12:
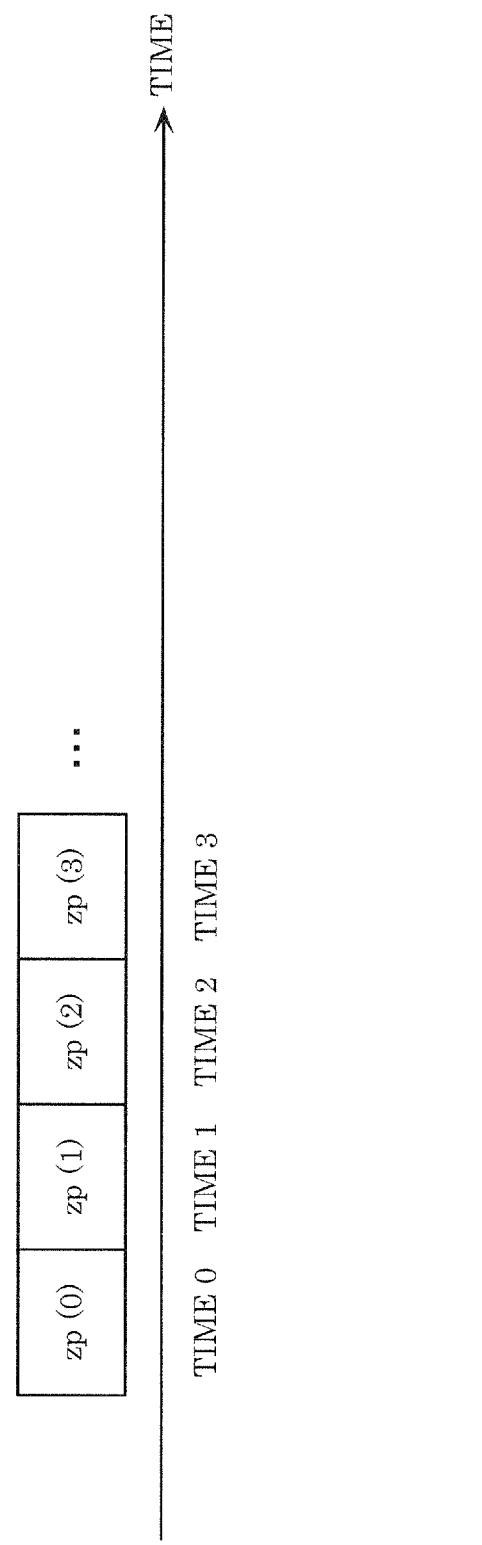
FIG. 12 illustrates one example of a symbol arrangement method with respect to the time axis.

FIG. 12 illustrates an example of a method of arranging symbols on the time axis for weighting synthesized signal 204A ($z1(i)$) and phase-changed signal 206B ($z2(i)$).

In FIG. 12, for example, zp(0) is shown. Here, q is 1 or 2. Accordingly, zp(0) in FIG. 12 indicates "in $z1(i)$ and $z2(i)$, $z1(0)$ and $z2(0)$ when symbol number i=0". Similarly, zp(1) indicates "in $z1(i)$ and $z2(i)$, $z1(1)$ and $z2(1)$ when symbol number i=1" (in other words, zp(X) indicates "in $z1(i)$ and $z2(i)$, $z1(X)$ and $z2(X)$ when symbol number i=X"). Note that this also applies to FIG. 13, FIG. 14, and FIG. 15.

As illustrated in FIG. 12, symbol zp(0) whose symbol number i=0 is arranged at time 0, symbol zp(1) whose symbol number i=1 is arranged at time 1, symbol zp(2) whose symbol number i=2 is arranged at time 2, symbol zp(3) whose symbol number i=3 is arranged at time 3, and other symbols are arranged in a similar fashion. With this, symbols are arranged on the time axis for weighting synthesized signal 204A ($z1(i)$) and phase-changed signal 206B ($z2(i)$). However, FIG. 12 merely illustrates one example; the relationship between time and symbol number is not limited to this example.

Figure 13:
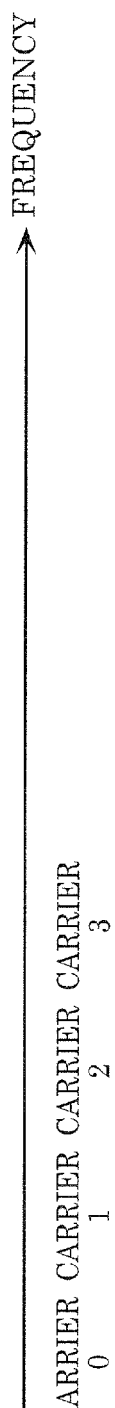
FIG. 13 illustrates one example of a symbol arrangement method with respect to the frequency axis.

FIG. 13 illustrates an example of a method of arranging symbols on the frequency axis for weighting synthesized signal 204A ($z1(i)$) and phase-changed signal 206B ($z2(i)$).

As illustrated in FIG. 13, symbol zp(0) whose symbol number i=0 is arranged at carrier 0, symbol zp(1) whose symbol number i=1 is arranged at carrier 1, symbol zp(2) whose symbol number i=2 is arranged at carrier 2, symbol zp(3) whose symbol number i=3 is arranged at carrier 3, and other symbols are arranged in a similar fashion. With this, symbols are arranged on the frequency axis for weighting synthesized signal 204A ($z1(i)$) and phase-changed signal 206B ($z2(i)$). However, FIG. 13 merely illustrates one example; the relationship between frequency and symbol number is not limited to this example.

Figure 14:
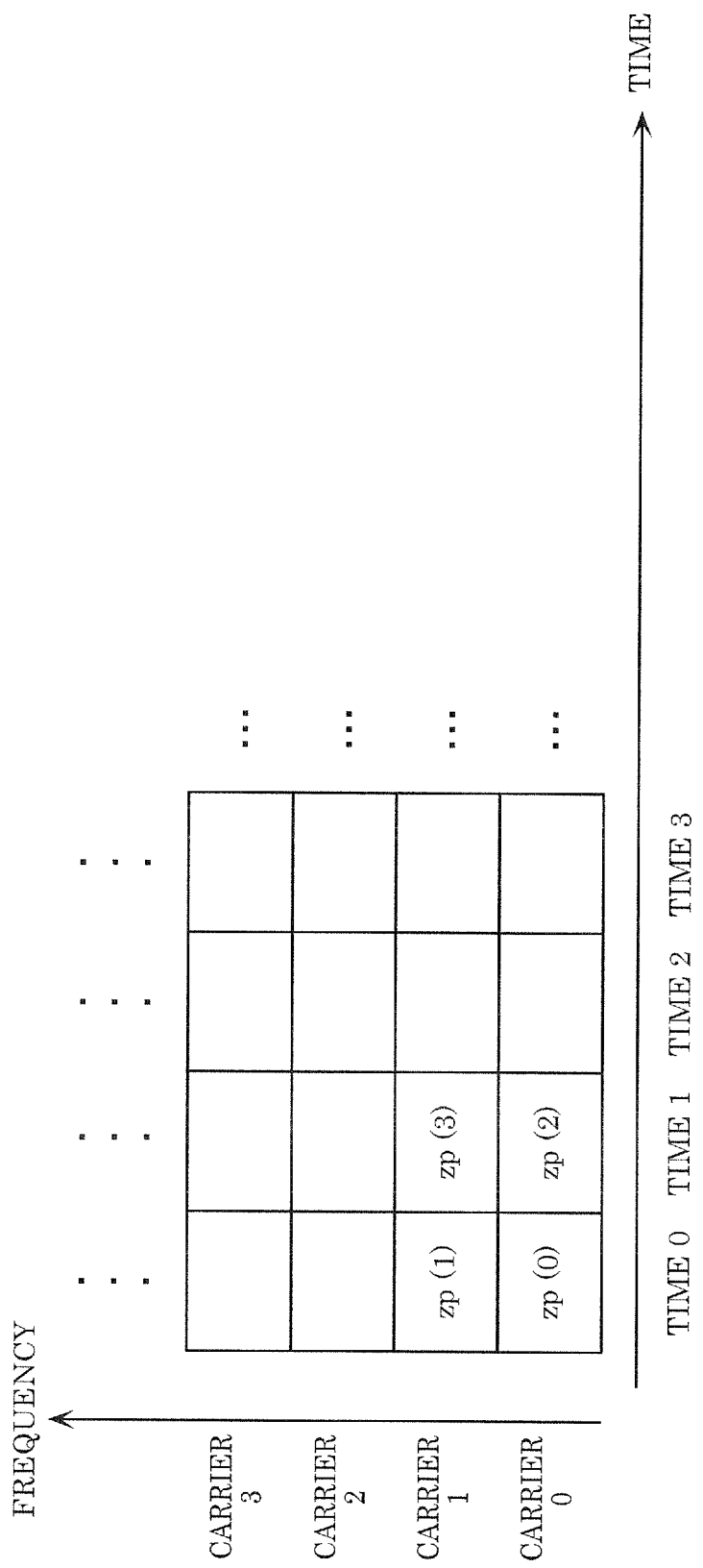
FIG. 14 illustrates one example of a symbol arrangement method with respect to the time and frequency axes.

FIG. 14 illustrates an example of an arrangement of symbols on the time and frequency axes for weighting synthesized signal 204A ($z1(i)$) and phase-changed signal 206B ($z2(i)$).

As illustrated in FIG. 14, symbol zp(0) whose symbol number i=0 is arranged at time 0 and carrier 0, symbol zp(1) whose symbol number i=1 is arranged at time 0 and carrier 1, symbol zp(2) whose symbol number i=2 is arranged at time 1 and carrier 0, symbol zp(3) whose symbol number i=3 is arranged at time 1 and carrier 1, and other symbols are arranged in a similar fashion. With this, symbols are arranged on the time and frequency axes for weighting synthesized signal 204A ($z1(i)$) and phase-changed signal 206B ($z2(i)$). However, FIG. 14 merely illustrates one example; the relationship between time and frequency and symbol number is not limited to this example.

Figure 15:
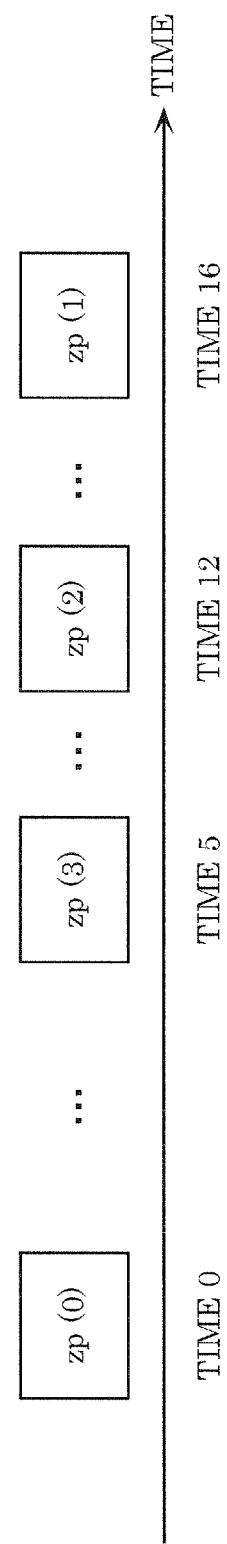
FIG. 15 illustrates one example of a symbol arrangement method with respect to the time axis.

FIG. 15 illustrates an example of an arrangement of symbols relative to time for weighting synthesized signal 204A ($z1(i)$) and phase-changed signal 206B ($z2(i)$). Note FIG. 15 illustrates an example of an arrangement of symbols when an interleaver (component for rearranging symbols) is included in radio units 107_A, 107_B illustrated in FIG. 1 (note that the configuration of radio units 107_A, 107_B illustrated in FIG. 1 when including an interleaver (component for rearranging symbols) will be described later with reference to FIG. 18).

As illustrated in FIG. 15, symbol zp(0) whose symbol number i=0 is arranged at time 0, symbol zp(1) whose symbol number i=1 is arranged at time 16, symbol zp(2) whose symbol number i=2 is arranged at time 12, symbol zp(3) whose symbol number i=3 is arranged at time 5, and other symbols are arranged in a similar fashion. With this, symbols are arranged on the time axis for weighting synthesized signal 204A ($z1(i)$) and phase-changed signal 206B ($z2(i)$). However, FIG. 15 merely illustrates one example; the relationship between time and symbol number is not limited to this example.

Figure 16:
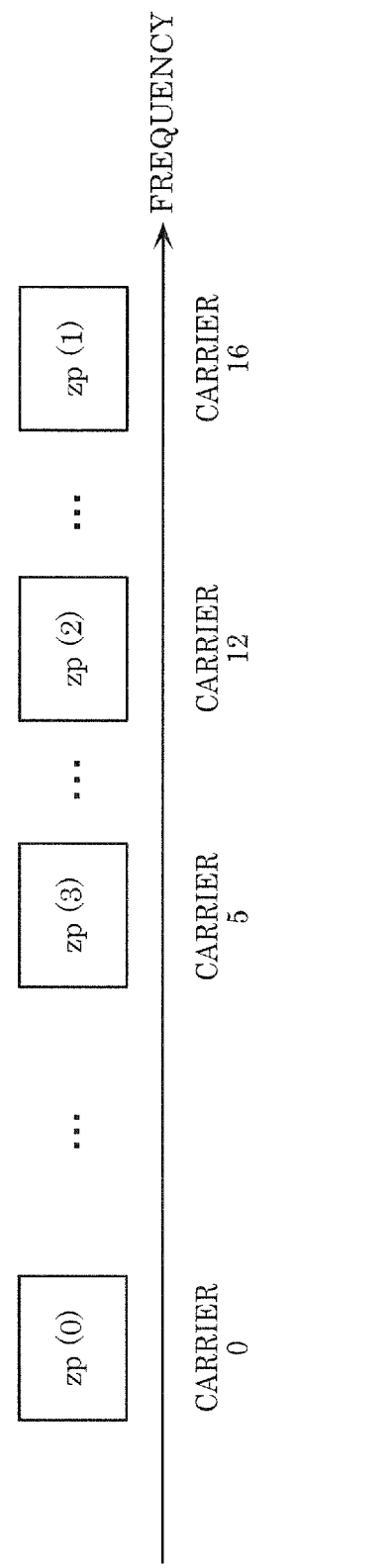
FIG. 16 illustrates one example of a symbol arrangement method with respect to the frequency axis.

FIG. 16 illustrates an example of an arrangement of symbols relative to time for weighting synthesized signal 204A ($z1(i)$) and phase-changed signal 206B ($z2(i)$). Note FIG. 16 illustrates an example of an arrangement of symbols when an interleaver (component for rearranging symbols) is included in radio units 107_A, 107_B illustrated in FIG. 1 (note that the configuration of radio units 107_A, 107_B illustrated in FIG. 1 when including an interleaver (component for rearranging symbols) will be described later with reference to FIG. 18).

As illustrated in FIG. 16, symbol zp(0) whose symbol number i=0 is arranged at carrier 0, symbol zp(1) whose symbol number i=1 is arranged at carrier 16, symbol zp(2) whose symbol number i=2 is arranged at carrier 12, symbol zp(3) whose symbol number i=3 is arranged at carrier 5, and other symbols are arranged in a similar fashion. With this, symbols are arranged on the time axis for weighting synthesized signal 204A ($z1(i)$) and phase-changed signal 206B ($z2(i)$). However, FIG. 16 merely illustrates one example; the relationship between frequency and symbol number is not limited to this example.

Figure 17:
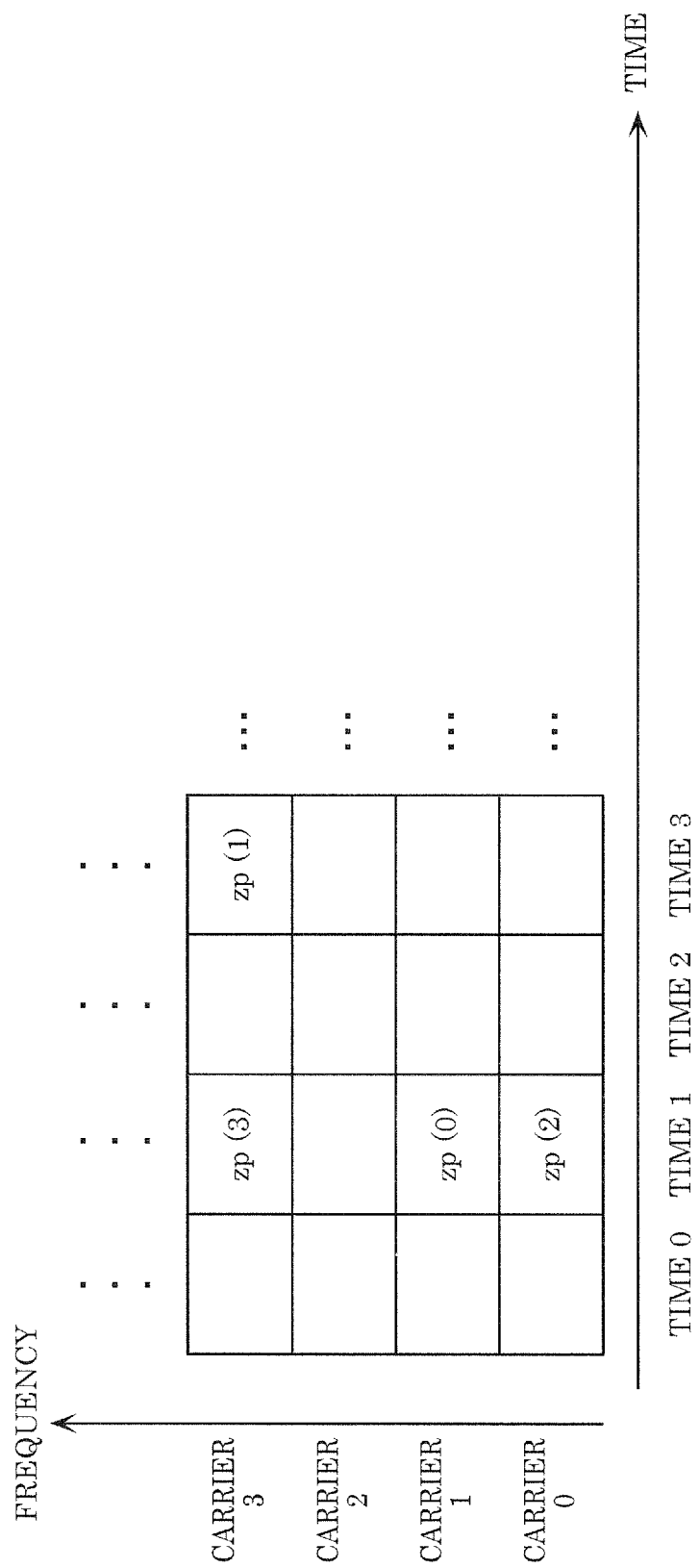
FIG. 17 illustrates one example of a symbol arrangement method with respect to the time and frequency axes.

FIG. 17 illustrates an example of an arrangement of symbols relative to time for weighting synthesized signal 204A ($z1(i)$) and phase-changed signal 206B ($z2(i)$). Note FIG. 17 illustrates an example of an arrangement of symbols when an interleaver (component for rearranging symbols) is included in radio units 107_A, 107_B illustrated in FIG. 1 (note that the configuration of radio units 107_A, 107_B illustrated in FIG. 1 when including an interleaver (component for rearranging symbols) will be described later with reference to FIG. 18).

As illustrated in FIG. 17, symbol zp(0) whose symbol number i=0 is arranged at time 1 and carrier 1, symbol zp(1) whose symbol number i=1 is arranged at time 3 and carrier 3, symbol zp(2) whose symbol number i=2 is arranged at time 1 and carrier 0, symbol zp(3) whose symbol number i=3 is arranged at time 1 and carrier 3, and other symbols are arranged in a similar fashion. With this, symbols are arranged on the time and frequency axes for weighting synthesized signal 204A (z1(i)) and phase-changed signal 206B (z2(i)). However, FIG. 17 merely illustrates one example; the relationship between time and frequency and symbol number is not limited to this example.

Figure 18:
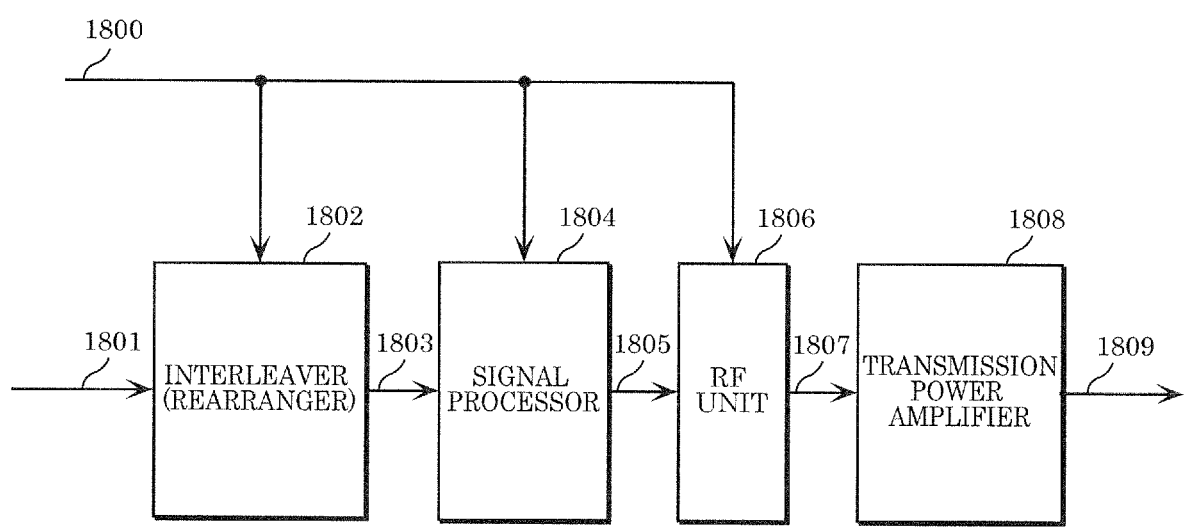
FIG. 18 illustrates one example of a configuration of a radio unit in a transmission device.

FIG. 18 illustrates an example of arrangement of symbols when radio units 107_A, 107_B illustrated in FIG. 1 include an interleaver (component for rearranging symbols).

Interleaver (rearranger) 1802 receives inputs of signal-processed signal 1801 (corresponding to 105_1, 105_2 in FIG. 1) and control signal 1800 (corresponding to 100 in FIG. 1), and, for example, in accordance with control signal 1800, rearrange the symbols, and output rearranged signal 1803. Note that an example of the rearrangement of symbols is as described with reference to FIG. 14 through FIG. 17.

Signal processor 1804 receives inputs of rearranged signal 1803 and control signal 1800, and in accordance with control signal 1800, performs signal processing, and outputs signal-processed signal 1805. For example, when the transmission device illustrated in FIG. 1 supports both a single-carrier scheme and an OFDM scheme, based on control signal 1800, signal processor 1804 either performs signal processing in accordance with the single-carrier scheme or performs signal processing in accordance with the OFDM scheme.

RF unit 1806 receives inputs of signal-processed signal 1805 and control signal 1800, and based on control signal 1800, performs processing such as frequency conversion, and outputs modulated signal 1807.

Transmission power amplifier 1808 receives an input of modulated signal 1807, performs signal amplification, and outputs modulated signal 1809.

Figure 19:
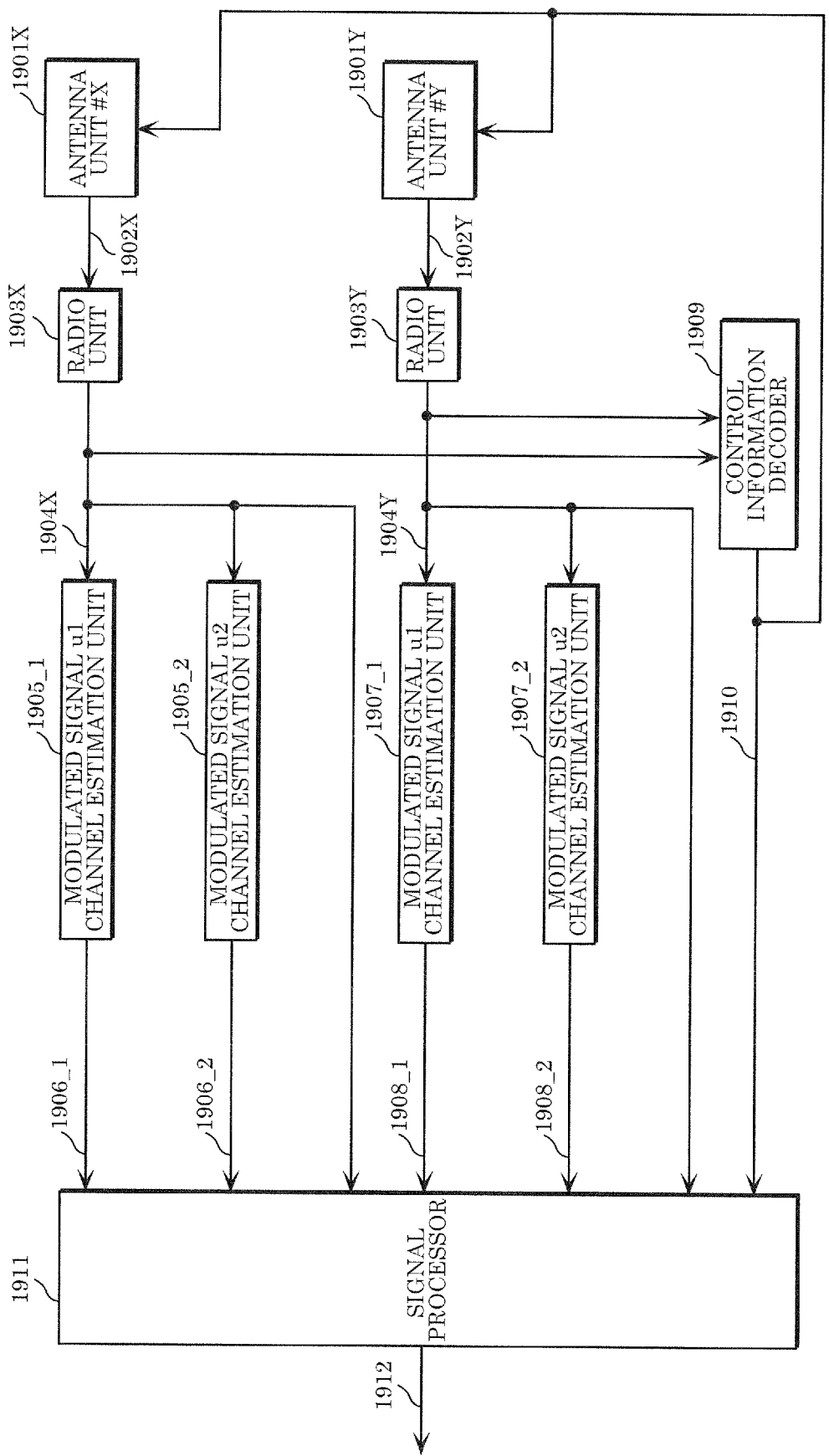
FIG. 19 illustrates one example of a configuration of a reception device.

FIG. 19 illustrates one example of a configuration of a reception device that receives a modulated signal upon the transmission device illustrated in FIG. 1 transmitting, for example, the frame configuration illustrated in FIG. 6 or FIG. 7, or a transmission signal illustrated in FIG. 10 or FIG. 11.

Radio unit 1903X receives an input of reception signal 1902X received by antenna unit #X (1901X), applies processing such as frequency conversion and a Fourier transform, and outputs baseband signal 1904X.

Similarly, radio unit 1903Y receives an input of reception signal 1902Y received by antenna unit #Y (1901Y), applies processing such as frequency conversion and a Fourier transform, and outputs baseband signal 1904Y.

Note FIG. 19 illustrates a configuration in which antenna unit #X (1901X) and antenna unit #Y (1901Y) receive control signal 1910 as an input, but antenna unit #X (1901X) and antenna unit #Y (1901Y) may be configured to not receive an input of control signal 1910. Operations performed when control signal 1910 is present as an input will be described in detail later.

Figure 20:
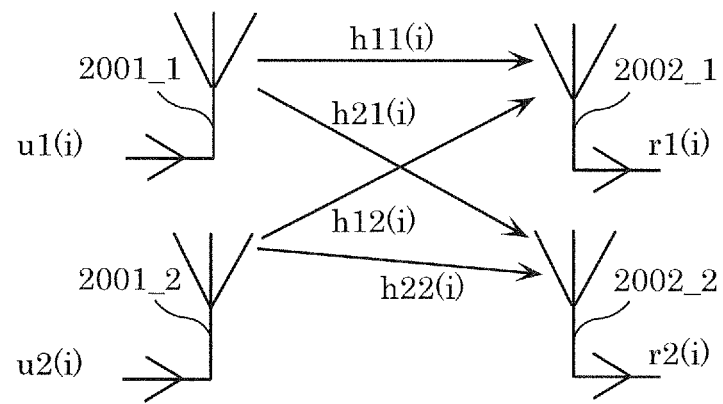
FIG. 20 illustrates one example of the relationship between a transmission device and a reception device.

FIG. 20 illustrates the relationship between the transmission device and the reception device. Antennas 2001_1 and 2001_2 in FIG. 20 are transmitting antennas, and antenna 2001_1 in FIG. 20 corresponds to antenna unit #A (109_A) in FIG. 1. Antenna 2001_2 in FIG. 20 corresponds to antenna unit #B (109_B) in FIG. 1.

Antennas 2002_1 and 2002_2 in FIG. 20 are receiving antennas, and antenna 2002_1 in FIG. 20 corresponds to antenna unit #X (1901X) in FIG. 19. Antenna 2002_2 in FIG. 20 corresponds to antenna unit #Y (1901Y) in FIG. 19.

As illustrated in FIG. 20, the signal transmitted from transmitting antenna 2001_1 is u1(i), the signal transmitted from transmitting antenna 2001_2 is u2(i), the signal received by receiving antenna 2002_1 is r1(i), and the signal received by receiving antenna 2002_2 is r2(i) Note that i is a symbol number, and, for example, is an integer that is greater than or equal to 0.

The propagation coefficient from transmitting antenna 2001_1 to receiving antenna 2002_1 is h11(i), the propagation coefficient from transmitting antenna 2001_1 to receiving antenna 2002_2 is h21(i), the propagation coefficient from transmitting antenna 2001_2 to receiving antenna 2002_1 is h12(i), and the propagation coefficient from transmitting antenna 2001_2 to receiving antenna 2002_2 is h22(i). In this case, the following relation equation holds true.

[MATH. 46]

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} u1(i) \\ u2(i) \end{pmatrix} + \begin{pmatrix} n1(i) \\ n2(i) \end{pmatrix} \qquad \text{Equation (46)}$$

Note that n1(i) and n2(i) are noise.

Channel estimation unit 1905_1 of modulated signal u1 in FIG. 19 receives an input of baseband signal 1904X, and using the preamble and/or pilot symbol illustrated in FIG. 6 or FIG. 7 (or FIG. 10 or FIG. 11), performs channel estimation on modulated signal u1, that is to say, estimates h21(i) in Equation (46), and outputs channel estimated signal 1906_1.

Channel estimation unit 1905_2 of modulated signal u2 receives an input of baseband signal 1904X, and using the preamble and/or pilot symbol illustrated in FIG. 6 or FIG. 7 (or FIG. 10 or FIG. 11), performs channel estimation on modulated signal u2, that is to say, estimates h12(i) in Equation (46), and outputs channel estimated signal 1906_2.

Channel estimation unit 1907_1 of modulated signal u1 receives an input of baseband signal 1904Y, and using the preamble and/or pilot symbol illustrated in FIG. 6 or FIG. 7 (or FIG. 10 or FIG. 11), performs channel estimation on modulated signal u1, that is to say, estimates h21(i) in Equation (46), and outputs channel estimated signal 1908_1.

Channel estimation unit 1907_2 of modulated signal u2 receives an input of baseband signal 1904Y, and using the preamble and/or pilot symbol illustrated in FIG. 6 or FIG. 7 (or FIG. 10 or FIG. 11), performs channel estimation on modulated signal u2, that is to say, estimates h22(i) in Equation (46), and outputs channel estimated signal 1908_2.

Control information decoder 1909 receives inputs of baseband signals 1904X and 1904Y, demodulates and decodes control information including "other symbols" in FIG. 6 and FIG. 7 (or FIG. 10 and FIG. 11), and outputs control signal 1910 including control information.

Signal processor 1911 receives inputs of channel estimated signals 1906_1, 1906_2, 1908_1, 1908_2, baseband signals 1904X, 1904Y, and control signal 1910, and performs demodulation and decoding using the relationship in Equation (46) or based on control information in control signal 1910 (for example, information on a modulation scheme or a scheme relating to the error correction code), and outputs reception data 1912.

Note that control signal 1910 need not be generated via the method illustrated in FIG. 19. For example, control signal 1910 in FIG. 19 may be generated based on information transmitted by a device that is the communication partner (FIG. 1) in FIG. 8, and, alternatively, the device in FIG. 19 may include an input unit, and control signal 1910 may be generated based on information input from the input unit.

Figure 21:
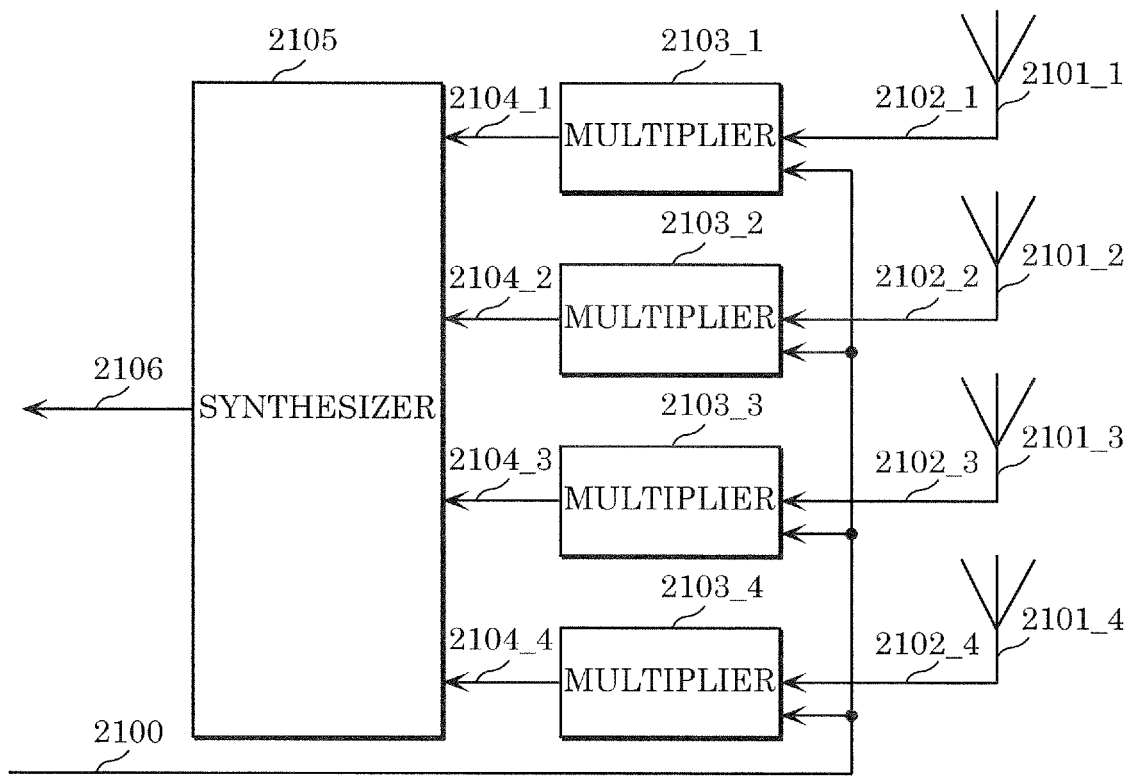
FIG. 21 illustrates one example of a configuration of an antenna unit in a reception device.

FIG. 21 illustrates one example of a configuration of antenna unit #X (1901X) and antenna unit #Y (1901Y) illustrated in FIG. 19 (antenna unit #X (1901X) and antenna unit #Y (1901Y) are exemplified as including a plurality of antennas).

Multiplier 2103_1 receives inputs of reception signal 2102_1 received by antenna 2101_1 and control signal 2100, and based on information on a multiplication coefficient included in control signal 2100, multiplies reception signal 2102_1 with the multiplication coefficient, and outputs multiplied signal 2104_1.

When reception signal 2102_1 is expressed as Rx1(t) (t is time) and the multiplication coefficient is expressed as D1 (D1 can be defined as a complex number and thus may be a real number), multiplied signal 2104_1 can be expressed as Rx1(t)×D1.

Multiplier 2103_2 receives inputs of reception signal 2102_2 received by antenna 2101_2 and control signal 2100, and based on information on a multiplication coefficient included in control signal 2100, multiplies reception signal 2102_2 with the multiplication coefficient, and outputs multiplied signal 2104_2.

When reception signal 2102_2 is expressed as Rx2(t) and the multiplication coefficient is expressed as D2 (D2 can be defined as a complex number and thus may be a real number), multiplied signal 2104_2 can be expressed as Rx2(t)×D2.

Multiplier 2103_3 receives inputs of reception signal 2103_3 received by antenna 2101_3 and control signal 2100, and based on information on a multiplication coefficient included in control signal 2100, multiplies reception signal 2102_3 with the multiplication coefficient, and outputs multiplied signal 2104_3.

When reception signal 2102_3 is expressed as Rx3(t) and the multiplication coefficient is expressed as D3 (D3 can be defined as a complex number and thus may be a real number), multiplied signal 2104_3 can be expressed as Rx3(t)×D3.

Multiplier 2103_4 receives inputs of reception signal 2102_4 received by antenna 2101_4 and control signal 2100, and based on information on a multiplication coefficient included in control signal 2100, multiplies reception signal 2102_4 with the multiplication coefficient, and outputs multiplied signal 2104_4.

When reception signal 2102_4 is expressed as Rx4(t) and the multiplication coefficient is expressed as D4 (D4 can be defined as a complex number and thus may be a real number), multiplied signal 2104_4 can be expressed as Rx4(t)×D4.

Synthesizer 2105 receives inputs of multiplied signals 2104_1, 2104_2, 2104_3, and 1004_4, synthesizes multiplied signals 2104_1, 2104_2, 2104_3, and 2104_4, and outputs synthesized signal 2106. Note that synthesized signal 2106 is expressed as Rx1(t)×D1+Rx2(t)×D2+Rx3(t)×D3+Rx4(t)×D4.

In FIG. 21, the antenna unit is exemplified as including four antennas (and four multipliers), but the number of antennas is not limited to four; the antenna unit may include two or more antennas.

When antenna unit #X (1901X) illustrated in FIG. 19 has the configuration illustrated in FIG. 21, reception signal 1902X corresponds to synthesized signal 2106 in FIG. 21, and control signal 1910 corresponds to control signal 2100 in FIG. 10. When antenna unit #Y (1901Y) illustrated in FIG. 19 has the configuration illustrated in FIG. 21, reception signal 1902Y corresponds to synthesized signal 2106 in FIG. 21, and control signal 1910 corresponds to control signal 2100 in FIG. 21.

However, antenna unit #X (1901X) and antenna unit #Y (1901Y) need not have the configurations illustrated in FIG. 21; as previously described, the antenna units need not receive an input of control signal 1910. antenna unit #X (1901X) and antenna unit #Y (1901Y) may each be comprised on a single antenna.

Note that control signal 1900 may be generated based on information transmitted by a device that is the communication partner, and, alternatively, the device may include an input unit, and control signal 1900 may be generated based on information input from the input unit.

With the transmission method described in this embodiment, by the transmission device illustrated in FIG. 1 transmitting the modulated signal, the reception device in FIG. 19 that receives the modulated signal transmitted by the transmission device in FIG. 1 can reduce the influence of phase noise and the influence of non-linear distortion, and thus can achieve an advantageous effect that the data reception quality is improved.

Note that the modulated signal transmitted by the transmission device illustrated in FIG. 1 may be a single-carrier scheme modulated signal and, alternatively, may be a multi-carrier scheme modulated signal such as an OFDM modulated signal. Moreover, the modulated signal may be applied with a spread spectrum communication method.

Control signal 100 in the transmission device illustrated in FIG. 1 may include control information for specifying transmission using a single-carrier scheme or transmission using a multi-carrier scheme such as OFDM. When control signal 100 indicates transmission using a single-carrier scheme, the transmission device illustrated in FIG. 1 transmits a single-carrier scheme modulated signal, and when control signal 100 indicates transmission using a multi-carrier scheme such as OFDM, the transmission device illustrated in FIG. 1 transmits a multi-carrier scheme modulated signal such as an OFDM modulated signal. Note that as a result of the transmission signal illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted in FIG. 1.

Embodiment 2

In this embodiment, differences from Embodiment 1 will be described when the transmission device illustrated in FIG. 1 can transmit both a single-carrier scheme modulated signal and a multi-carrier scheme modulated signal such as an OFDM modulated signal, or one or the other.

In this embodiment, the following three types of transmission devices will be considered.

First Transmission Device:

The first transmission device is a transmission device capable of selectively transmitting both a single-carrier scheme modulated signal and a multi-carrier scheme modulated signal such as an OFDM modulated signal. Control signal 100 in the transmission device illustrated in FIG. 1 includes control information for specifying transmission using a single-carrier scheme or transmission using a multi-carrier scheme such as OFDM, and when control signal 100 indicates transmission using a single-carrier scheme, the transmission device illustrated in FIG. 1 transmits a single-carrier scheme modulated signal, and when control signal 100 indicates transmission using a multi-carrier scheme such as OFDM, the transmission device illustrated in FIG. 1 transmits a multi-carrier scheme modulated signal such as an OFDM modulated signal. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

Second Transmission Device:

The second transmission device is a transmission device capable of transmitting a single-carrier scheme modulated signal. When control signal 100 in the transmission device illustrated in FIG. 1 includes control information for specifying transmission using a single-carrier scheme or transmission using a multi-carrier scheme such as OFDM, the second transmission device can only select transmission using a single-carrier scheme as this control information. Accordingly, the transmission device illustrated in FIG. 1 transmits a single-carrier scheme modulated signal. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

Third Transmission Device:

The third transmission device is a transmission device capable of transmitting a multi-carrier scheme modulated signal such as an OFDM modulated signal. When control signal 100 in the transmission device illustrated in FIG. 1 includes control information for specifying transmission using a single-carrier scheme or transmission using a multi-carrier scheme such as OFDM, the second transmission device can only select transmission using a multi-carrier scheme such as OFMD as this control information. Accordingly, the transmission device illustrated in FIG. 1 transmits a multi-carrier scheme modulated signal such as a OFDM modulated signal. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

In Embodiment 1, the configuration of the transmission device, the configuration of the reception device that receives the modulated signal transmitted by the transmission device, the frame configuration example in the case of single-carrier scheme, and the frame configuration example in the case of multi-carrier scheme such as OFDM have already been described, so repeated description will be omitted.

In this embodiment, as a transmission signal method for a modulated signal when a single-carrier scheme is used, any one of the first selection method, second selection method, or third selection method described in Embodiment 1 is applied, and the transmission device illustrated in FIG. 1 transmits the modulated signal. Here, in the second transmission device, influence of phase noise in the RF unit and influence of non-linear distortion in the transmission power amplifier can be reduced, and depending on the transmission method, it is possible to achieve an advantageous effect of transmit diversity. Accordingly, in the reception device that receives the modulated signal transmitted by the second transmission device, it is possible to achieve an advantageous effect of improvement in data reception quality.

In this embodiment, the following methods for transmitting a multi-carrier scheme modulated signal such as an OFDM modulated signal will be considered.

Fourth Selection Method:

The transmission device illustrated in FIG. 1 switches the transmission method of the modulated signal based on information on the transmission method included in control signal 100. Here, the transmission device illustrated in FIG. 1 can select the following transmission methods.

Transmission Method #4-1:

A single stream is transmitted (s1(i) is transmitted). The modulation scheme (of s1(i)) is BPSK (or $\pi/2$ shift BPSK) (however, the single stream modulated signal may be transmitted using a single antenna and, alternatively, transmitted using a plurality of antennas).

Transmission Method #4-2:

A single stream is transmitted (s1(i) is transmitted). The modulation scheme (of s1(i)) is QPSK (or $\pi/2$ shift QPSK) (however, the single stream modulated signal may be transmitted using a single antenna and, alternatively, transmitted using a plurality of antennas).

Transmission Method #4-3:

A single stream is transmitted (s1(i) is transmitted). The modulation scheme of s1(i) is 16 QAM (or $\pi/2$ shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #4-4:

A single stream is transmitted (s1(i) is transmitted). The modulation scheme of s1(i) is 64 QAM (or $\pi/2$ shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #4-5:

Two streams are transmitted (s1(i) and s2(i) are transmitted). The modulation scheme of s1(i) is BPSK (or $\pi/2$ shift BPSK), and the modulation scheme of s2(i) is BPSK (or $\pi/2$ shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #4-6:

Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #4-7:

Two streams are transmitted (s1(i) and s2(i) are transmitted). The modulation scheme of s1(i) is QPSK (or π/2 shift QPSK), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)) (when θ=π/4 radians (45 degrees), the average transmission power of the modulated signals transmitted from the antennas is equal).

Transmission Method #4-8:

Two streams are transmitted (s1(i) and s2(i) are transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #4-9:

Two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Note that in the fourth selection method, the transmission method need not correspond to all transmission methods from transmission method #4-1 through transmission method #4-9. For example, in the fourth selection method, the transmission method may correspond to one or more transmission method from among the following three transmission methods: transmission method #4-5, transmission method #4-6, and transmission method #4-7. In the fourth transmission method, the transmission method may correspond to one or more transmission method from among the following two transmission methods: transmission method #4-8 and transmission method #4-9. In the fourth selection method, the transmission method need not correspond to transmission method #4-1 (in the fourth selection method, the transmission method need not include transmission method #4-1 in the transmission method selection candidates in the transmission device illustrated in FIG. 1).

The fourth selection method may include a transmission method other than those from transmission method #4-1 to transmission method #4-9.

Here, the following is satisfied.
Transmission Method #4-1:
The number of signal points in the in-phase I-quadrature Q plane of the transmission signal is 2.
Transmission Method #4-2:
The number of signal points in the in-phase I-quadrature Q plane of the transmission signal is 4.
Transmission Method #4-3:
The number of signal points in the in-phase I-quadrature Q plane of the transmission signal is 16.
Transmission Method #4-4:
The number of signal points in the in-phase I-quadrature Q plane of the transmission signal is 64.
Transmission Method #4-5:
The number of signal points in the in-phase I-quadrature Q plane of the transmission signal is greater than 2 and less than or equal to 4. The advantageous effect of transmit diversity is achievable.
Transmission Method #4-6:
The number of signal points in the in-phase I-quadrature Q plane of the transmission signal is greater than 4 and less than or equal to 16. The advantageous effect of transmit diversity is achievable.
Transmission Method #4-7:
The number of signal points in the in-phase I-quadrature Q plane of the transmission signal is greater than 4 and less than or equal to 64. The advantageous effect of transmit diversity is achievable.
Transmission Method #4-8:
The number of signal points in the in-phase I-quadrature Q plane of the transmission signal is greater than 16 and less than or equal to 256. The advantageous effect of transmit diversity is achievable.
Transmission Method #4-9:
The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the fourth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the fourth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, a fifth selection method different than the fourth selection method that is used when transmitting a multi-carrier scheme modulated signal such as an OFDM modulated signal will be described.
Fifth Selection Method:
Transmission Method #5-1:
A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).
Transmission Method #5-2:
A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).
Transmission Method #5-3:
A single stream is transmitted (s1(i) is transmitted). The modulation scheme of s1(i) is 16 QAM (or π/2 shift 16

QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas)).

Transmission Method #5-4:

A single stream is transmitted (s1(i) is transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas)).

Transmission Method #5-5:

Two streams are transmitted (s1(i) and s2(i) are transmitted). The modulation scheme of s1(i) is BPSK (or π/2 shift BPSK), and the modulation scheme of s2(i) is BPSK (or π/2 shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #5-6:

Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #5-7:

Two streams are transmitted (s1(i) and s2(i) are transmitted). The modulation scheme of s1(i) is QPSK (or π/2 shift QPSK), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)) (when θ=π/4 radians (45 degrees), the average transmission power of the modulated signals transmitted from the antennas is equal).

Transmission Method #5-8:

Two streams are transmitted (s1(i) and s2(i) are transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Transmission Method #5-9:

Two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta=0$ radians in Equation (13) through Equation (20) (note that $\theta$ is greater than or equal to 0 radians and less than $2\pi$ radians (0 radians$\leq\theta<2\pi$ radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta\neq 0$.

Note that in the fifth selection method, the transmission method need not correspond to all transmission methods from transmission method #5-1 through transmission method #5-9. For example, in the fifth selection method, the transmission method may correspond to one or more transmission method from among the following three transmission methods: transmission method #5-5, transmission method #5-6, and transmission method #5-7. In the fifth transmission method, the transmission method may correspond to one or more transmission method from among the following two transmission methods: transmission method #5-8 and transmission method #5-9.

In the fifth selection method, the transmission method need not correspond to transmission method #4-1 (in the fifth selection method, the transmission method need not include transmission method #5-1 in the transmission method selection candidates in the transmission device illustrated in FIG. 1).

The fifth selection method may include a transmission method other than those from transmission method #5-1 to transmission method #5-9.

Here, the following is satisfied.
Transmission Method #5-1:
 The number of signal points in the in-phase I-quadrature Q plane of the transmission signal is 2.
Transmission Method #5-2:
 The number of signal points in the in-phase I-quadrature Q plane of the transmission signal is 4.
Transmission Method #5-3:
 The number of signal points in the in-phase I-quadrature Q plane of the transmission signal is 16.
Transmission Method #5-4:
 The number of signal points in the in-phase I-quadrature Q plane of the transmission signal is 64.
Transmission Method #5-5:
 The number of signal points in the in-phase I-quadrature Q plane of the transmission signal is greater than 2 and less than or equal to 4. The advantageous effect of transmit diversity is achievable.
Transmission Method #5-6:
 The number of signal points in the in-phase I-quadrature Q plane of the transmission signal is greater than 4 and less than or equal to 16. The advantageous effect of transmit diversity is achievable.
Transmission Method #5-7:
 The number of signal points in the in-phase I-quadrature Q plane of the transmission signal is greater than 4 and less than or equal to 64. The advantageous effect of transmit diversity is achievable.
Transmission Method #5-8:
 The number of signal points in the in-phase I-quadrature Q plane of the transmission signal is greater than or equal to 16 and less than or equal to 256. The advantageous effect of transmit diversity may be achievable.
Transmission Method #5-9:
 The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the fifth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the fifth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, a sixth selection method different than the fourth selection method and the fifth selection method that is used when transmitting a multi-carrier scheme modulated signal such as an OFDM modulated signal will be described.

Sixth Selection Method:

Transmission Method #6-1:

A single stream is transmitted (s1(i) is transmitted). The modulation scheme (of s1(i)) is BPSK (or $\pi/2$ shift BPSK) (however, the single stream modulated signal may be transmitted using a single antenna and, alternatively, transmitted using a plurality of antennas).

Transmission Method #6-2:

A single stream is transmitted (s1(i) is transmitted). The modulation scheme (of s1(i)) is QPSK (or $\pi/2$ shift QPSK) (however, the single stream modulated signal may be transmitted using a single antenna and, alternatively, transmitted using a plurality of antennas).

Transmission Method #6-3:

A single stream is transmitted (s1(i) is transmitted). The modulation scheme of s1(i) is 16 QAM (or $\pi/2$ shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #6-4:

A single stream is transmitted (s1(i) is transmitted). The modulation scheme of s1(i) is 64 QAM (or $\pi/2$ shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #6-5:

Two streams are transmitted (s1(i) and s2(i) are transmitted). The modulation scheme of s1(i) is BPSK (or $\pi/2$ shift BPSK), and the modulation scheme of s2(i) is BPSK (or $\pi/2$ shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta\neq 0$.

Transmission Method #6-6:

Two streams are transmitted (s1(i) and s2(i) are transmitted). The modulation scheme of s1(i) is QPSK (or $\pi/2$ shift QPSK), and the modulation scheme of s2(i) is QPSK (or $\pi/2$ shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta\neq 0$.

Transmission Method #6-7:

Two streams are transmitted (s1(i) and s2(i) are transmitted). The modulation scheme of s1(i) is QPSK (or $\pi/2$ shift QPSK), and the modulation scheme of s2(i) is 16 QAM (or $\pi/2$ shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)) (when θ=π/4 radians (45 degrees), the average transmission power of the modulated signals transmitted from the antennas is equal).

Transmission Method #6-8:

Two streams are transmitted (s1(i) and s2(i) are transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #6-9:

Two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Note that in the sixth selection method, the transmission method need not correspond to all transmission methods from transmission method #6-1 through transmission method #6-9. For example, in the sixth selection method, the transmission method may correspond to one or more transmission method from among the following three transmission methods: transmission method #6-5, transmission method #6-6, and transmission method #6-7. In the sixth transmission method, the transmission method may correspond to one or more transmission method from among the following two transmission methods: transmission method #6-8 and transmission method #6-9.

In the sixth selection method, the transmission method need not correspond to transmission method #6-1 (in the sixth selection method, the transmission method need not include transmission method #6-1 in the transmission method selection candidates in the transmission device illustrated in FIG. 1).

The sixth selection method may include a transmission method other than those from transmission method #6-1 to transmission method #6-9.

Here, the following is satisfied.
Transmission Method #6-1:
The number of signal points in the in-phase I-quadrature Q plane of the transmission signal is 2.
Transmission Method #6-2:
The number of signal points in the in-phase I-quadrature Q plane of the transmission signal is 4.
Transmission Method #6-3:
The number of signal points in the in-phase I-quadrature Q plane of the transmission signal is 16.
Transmission Method #6-4:
The number of signal points in the in-phase I-quadrature Q plane of the transmission signal is 64.
Transmission Method #6-5:
The number of signal points in the in-phase I-quadrature Q plane of the transmission signal is greater than or equal to 2 and less than or equal to 4. There are cases in which the advantageous effect of transmit diversity is achievable.
Transmission Method #6-6:
The number of signal points in the in-phase I-quadrature Q plane of the transmission signal is greater than or equal to 4 and less than or equal to 16. There are cases in which the advantageous effect of transmit diversity is achievable.
Transmission Method #6-7:
The number of signal points in the in-phase I-quadrature Q plane of the transmission signal is greater than 4 and less than or equal to 64. The advantageous effect of transmit diversity is achievable.
Transmission Method #6-8:
The number of signal points in the in-phase I-quadrature Q plane of the transmission signal is greater than 16 and less than or equal to 256. The advantageous effect of transmit diversity is achievable.
Transmission Method #6-9:
The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the sixth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the sixth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, a seventh selection method different than the fourth selection method, the fifth selection method, and the sixth selection method that is used when transmitting a multi-carrier scheme modulated signal such as an OFDM modulated signal will be described.

Seventh Selection Method:
Transmission Method #7-1:
A single stream is transmitted ($s1(i)$ is transmitted). The modulation scheme (of $s1(i)$) is BPSK (or $\pi/2$ shift BPSK) (however, the single stream modulated signal may be transmitted using a single antenna and, alternatively, transmitted using a plurality of antennas).
Transmission Method #7-2:
A single stream is transmitted ($s1(i)$ is transmitted). The modulation scheme (of $s1(i)$) is QPSK (or $\pi/2$ shift QPSK) (however, the single stream modulated signal may be transmitted using a single antenna and, alternatively, transmitted using a plurality of antennas).
Transmission Method #7-3:
A single stream is transmitted ($s1(i)$ is transmitted). The modulation scheme of $s1(i)$ is 16 QAM (or $\pi/2$ shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).
Transmission Method #7-4:
A single stream is transmitted ($s1(i)$ is transmitted). The modulation scheme of $s1(i)$ is 64 QAM (or $\pi/2$ shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).
Transmission Method #7-5:
Two streams are transmitted ($s1(i)$ and $s2(i)$ are transmitted). The modulation scheme of $s1(i)$ is BPSK (or $\pi/2$ shift BPSK), and the modulation scheme of $s2(i)$ is BPSK (or $\pi/2$ shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #7-6:

Two streams are transmitted (s1(i) and s2(i) are transmitted). The modulation scheme of s1(i) is QPSK (or $\pi/2$ shift QPSK), and the modulation scheme of s2(i) is QPSK (or $\pi/2$ shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #7-7:

Two streams are transmitted (s1(i) and s2(i) are transmitted). The modulation scheme of s1(i) is QPSK (or $\pi/2$ shift QPSK), and the modulation scheme of s2(i) is 16 QAM (or $\pi/2$ shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians ($0$ radians$\leq \theta < 2\pi$ radians)) (when $\theta=\pi/4$ radians (45 degrees), the average transmission power of the modulated signals transmitted from the antennas is equal).

Transmission Method #7-8:

Two streams are transmitted (s1(i) and s2(i) are transmitted). The modulation scheme of s1(i) is 16 QAM (or $\pi/2$ shift 16 QAM) (or a modulation scheme in which 16 signal points are in the in-phase I-quadrature Q plane, such as 16APSK (a shift may be performed)), and the modulation scheme of s2(i) is 16 QAM (or $\pi/2$ shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #7-9:

Two streams are transmitted (s1(i) and s2(i) are transmitted). The modulation scheme of s1(i) is 64 QAM (or $\pi/2$ shift 64 QAM) (or a modulation scheme in which 64 signal points are in the in-phase I-quadrature Q plane, such as 16APSK (a shift may be performed)), and the modulation scheme of s2(i) is 64 QAM (or $\pi/2$ shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians ($0$ radians$\leq \theta < 2\pi$ radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Note that in the seventh selection method, the transmission method need not correspond to all transmission methods from transmission method #7-1 through transmission method #7-9. For example, in the seventh selection method, the transmission method may correspond to one or more transmission method from among the following three transmission methods: transmission method #7-5, transmission method #7-6, and transmission method #7-7. In the seventh transmission method, the transmission method may correspond to one or more transmission method from among the following two transmission methods: transmission method #7-8 and transmission method #7-9.

In the seventh selection method, the transmission method need not correspond to transmission method #7-1 (in the seventh selection method, the transmission method need not include transmission method #7-1 in the transmission method selection candidates in the transmission device illustrated in FIG. 1).

The seventh selection method may include a transmission method other than those from transmission method #7-1 to transmission method #7-9.

Here, the following is satisfied.
Transmission Method #7-1:
The number of signal points in the in-phase I-quadrature Q plane of the transmission signal is 2.
Transmission Method #7-2:
The number of signal points in the in-phase I-quadrature Q plane of the transmission signal is 4.
Transmission Method #7-3:
The number of signal points in the in-phase I-quadrature Q plane of the transmission signal is 16.
Transmission Method #7-4:
The number of signal points in the in-phase I-quadrature Q plane of the transmission signal is 64.
Transmission Method #7-5:
The number of signal points in the in-phase I-quadrature Q plane of the transmission signal is greater than or equal to 2 and less than or equal to 4. There are cases in which the advantageous effect of transmit diversity is achievable.
Transmission Method #7-6:
The number of signal points in the in-phase I-quadrature Q plane of the transmission signal is greater than or equal to 4 and less than or equal to 16. There are cases in which the advantageous effect of transmit diversity is achievable.
Transmission Method #7-7:
The number of signal points in the in-phase I-quadrature Q plane of the transmission signal is greater than 4 and less than or equal to 64. The advantageous effect of transmit diversity is achievable.
Transmission Method #7-8:
The number of signal points in the in-phase I-quadrature Q plane of the transmission signal is greater than or equal to 16 and less than or equal to 256. The advantageous effect of transmit diversity may be achievable.
Transmission Method #7-9:
The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the seventh selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the seventh selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, an eighth selection method different than the fourth selection method, the fifth selection method, the sixth selection method, and the seventh selection method that is used when transmitting a multi-carrier scheme modulated signal such as an OFDM modulated signal will be described.

Eighth Selection Method:
Transmission Method #8-1:
A single stream is transmitted (s1(i) is transmitted). The modulation scheme (of s1(i)) is BPSK (or π/2 shift BPSK) (however, the single stream modulated signal may be transmitted using a single antenna and, alternatively, transmitted using a plurality of antennas).

Transmission Method #8-2:
A single stream is transmitted (s1(i) is transmitted). The modulation scheme (of s1(i)) is QPSK (or π/2 shift QPSK) (however, the single stream modulated signal may be transmitted using a single antenna and, alternatively, transmitted using a plurality of antennas).

Transmission Method #8-3:
A single stream is transmitted (s1(i) is transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #8-4:
A single stream is transmitted (s1(i) is transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #8-5:
Either one of transmission method #4-5 or transmission method #6-5.

Transmission Method #8-6:
Either one of transmission method #4-6 or transmission method #6-6.

Transmission Method #8-7:
Two streams are transmitted (s1(i) and s2(i) are transmitted). The modulation scheme of s1(i) is QPSK (or π/2 shift QPSK), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #8-8:
Two streams are transmitted (s1(i) and s2(i) are transmitted). The modulation scheme of s1(i) is 16 QAM (or π/2 shift 16 QAM) (or a modulation scheme in which 16 signal points are in the in-phase I-quadrature Q plane, such as 16APSK (a shift may be performed)), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Transmission Method #8-9:
Two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than $2\pi$ radians (0 radians≤θ<$2\pi$ radians)).

Alternatively, two streams are transmitted (s1(i) and s2(i) are transmitted). The modulation scheme of s1(i) is 64 QAM (or $\pi/2$ shift 64 QAM) (or a modulation scheme in which 64 signal points are in the in-phase I-quadrature Q plane, such as 64APSK (a shift may be performed)), and the modulation scheme of s2(i) is 64 QAM (or $\pi/2$ shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Note that in the eighth selection method, the transmission method need not correspond to all transmission methods from transmission method #8-1 through transmission method #8-9. For example, in the eighth selection method, the transmission method may correspond to one or more transmission method from among the following three transmission methods: transmission method #8-5, transmission method #8-6, and transmission method #8-7. In the eighth transmission method, the transmission method may correspond to one or more transmission method from among the following two transmission methods: transmission method #8-8 and transmission method #8-9.

In the eighth selection method, the transmission method need not correspond to transmission method #8-1 (in the eighth selection method, the transmission method need not include transmission method #8-1 in the transmission method selection candidates in the transmission device illustrated in FIG. 1).

The eighth selection method may include a transmission method other than those from transmission method #8-1 to transmission method #8-9.

Here, the following is satisfied.
Transmission Method #8-1:
  The number of signal points in the in-phase I-quadrature Q plane of the transmission signal is 2.
Transmission Method #8-2:
  The number of signal points in the in-phase I-quadrature Q plane of the transmission signal is 4.
Transmission Method #8-3:
  The number of signal points in the in-phase I-quadrature Q plane of the transmission signal is 16.
Transmission Method #8-4:
  The number of signal points in the in-phase I-quadrature Q plane of the transmission signal is 64.
Transmission Method #8-5:
  The number of signal points in the in-phase I-quadrature Q plane of the transmission signal is greater than or equal to 2 and less than or equal to 4. There are cases in which the advantageous effect of transmit diversity is achievable.
Transmission Method #8-6:
  The number of signal points in the in-phase I-quadrature Q plane of the transmission signal is greater than or equal to 4 and less than or equal to 16. There are cases in which the advantageous effect of transmit diversity is achievable.
Transmission Method #8-7:
  The number of signal points in the in-phase I-quadrature Q plane of the transmission signal is greater than 4 and less than or equal to 64. The advantageous effect of transmit diversity is achievable.
Transmission Method #8-8:
  The number of signal points in the in-phase I-quadrature Q plane of the transmission signal is greater than 16 and less than or equal to 256. The advantageous effect of transmit diversity is achievable.
Transmission Method #8-9:
  The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the eighth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the eighth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, a ninth selection method different than the fourth selection method, the fifth selection method, the sixth selection method, the seventh selection method, and the eighth selection method that is used when transmitting a multi-carrier scheme modulated signal such as an OFDM modulated signal will be described.

Ninth Selection Method:

Transmission Method #9-1:

A single stream is transmitted (s1(i) is transmitted). The modulation scheme (of s1(i)) is BPSK (or $\pi/2$ shift BPSK) (however, the single stream modulated signal may be transmitted using a single antenna and, alternatively, transmitted using a plurality of antennas).

Transmission Method #9-2:

A single stream is transmitted (s1(i) is transmitted). The modulation scheme (of s1(i)) is QPSK (or $\pi/2$ shift QPSK) (however, the single stream modulated signal may be transmitted using a single antenna and, alternatively, transmitted using a plurality of antennas).

Transmission Method #9-3:

A single stream is transmitted (s1(i) is transmitted). The modulation scheme of s1(i) is 16 QAM (or $\pi/2$ shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #9-4:

A single stream is transmitted (s1(i) is transmitted). The modulation scheme of s1(i) is 64 QAM (or $\pi/2$ shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #9-5:

Either one of transmission method #4-5 or transmission method #6-5.

Transmission Method #9-6:

Either one of transmission method #4-6 or transmission method #6-6.

Transmission Method #9-7:

Two streams are transmitted (s1(i) and s2(i) are transmitted). The modulation scheme of s1(i) is QPSK (or $\pi/2$ shift QPSK), and the modulation scheme of s2(i) is 16 QAM (or $\pi/2$ shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, $\theta \neq 0$ radians in Equation (13) through Equation (20) (note that $\theta$ is greater than or equal to 0 radians and less than $2\pi$ radians (0 radians$\leq \theta <2\pi$ radians)).

Transmission Method #9-8:

Two streams are transmitted (s1(i) and s2(i) are transmitted). The modulation scheme of s1(i) is 16 QAM (or $\pi/2$ shift 16 QAM) (or a modulation scheme in which 16 signal points are in the in-phase I-quadrature Q plane, such as 16APSK (a shift may be performed)), and the modulation scheme of s2(i) is 16 QAM (or $\pi/2$ shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #9-9:

Two streams are transmitted (s1(i) and s2(i) are transmitted). The modulation scheme of s1(i) is 64 QAM (or $\pi/2$ shift 64 QAM) (or a modulation scheme in which 64 signal points are in the in-phase I-quadrature Q plane, such as 16APSK (a shift may be performed)), and the modulation scheme of s2(i) is 64 QAM (or $\pi/2$ shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ≠0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)). Here, θ=0 radians in Equation (13) through Equation (20) (note that θ is greater than or equal to 0 radians and less than 2π radians (0 radians≤θ<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed, coefficient multiplication is also performed (by coefficient multipliers 301A, 302A)).

Next, precoding processing will be described.

In the transmission device illustrated in FIG. 1, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrixes in Equation (13) through Equation (20)).

Based on control signal 200, weighting synthesizer 203 illustrated in FIG. 2, FIG. 3 uses one matrix specified by control signal 200 from among the N matrices from the first matrix to the N-th matrix, and performs precoding.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Note that in the ninth selection method, the transmission method need not correspond to all transmission methods from transmission method #9-1 to transmission method #9-9. For example, in the ninth selection method, the transmission method may correspond to one or more transmission method from among the following three transmission methods: transmission method #9-5, transmission method #9-6, and transmission method #9-7. In the ninth transmission method, the transmission method may correspond to one or more transmission method from among the following two transmission methods: transmission method #9-8 and transmission method #9-9.

In the ninth selection method, the transmission method need not correspond to transmission method #9-1 (in the ninth selection method, the transmission method need not include transmission method #9-1 in the transmission method selection candidates in the transmission device illustrated in FIG. 1).

The ninth selection method may include a transmission method other than those from transmission method #9-1 to transmission method #9-9. Here, the following is satisfied.
Transmission Method #9-1:
    The number of signal points in the in-phase I-quadrature Q plane of the transmission signal is 2.
Transmission Method #9-2:
    The number of signal points in the in-phase I-quadrature Q plane of the transmission signal is 4.
Transmission Method #9-3:
    The number of signal points in the in-phase I-quadrature Q plane of the transmission signal is 16.
Transmission Method #9-4:
    The number of signal points in the in-phase I-quadrature Q plane of the transmission signal is 64.
Transmission Method #9-5:
    The number of signal points in the in-phase I-quadrature Q plane of the transmission signal is greater than or equal to 2 and less than or equal to 4. There are cases in which the advantageous effect of transmit diversity is achievable.
Transmission Method #9-6:
    The number of signal points in the in-phase I-quadrature Q plane of the transmission signal is greater than or equal to 4 and less than or equal to 16. There are cases in which the advantageous effect of transmit diversity is achievable.
Transmission Method #9-7:
    The number of signal points in the in-phase I-quadrature Q plane of the transmission signal is greater than 4 and less than or equal to 64. The advantageous effect of transmit diversity is achievable.
Transmission Method #9-8:
    The number of signal points in the in-phase I-quadrature Q plane of the transmission signal is greater than or equal to 16 and less than or equal to 256. The advantageous effect of transmit diversity may be achievable.
Transmission Method #9-9:
    The number of signal points in the in-phase I-quadrature Q plane of the transmission signal is greater than or equal to 64 and less than or equal to 4096. The advantageous effect of transmit diversity may be achievable.

As described above, the selection method for the transmission method when a single-carrier scheme modulated signal is transmitted and the selection method for the transmission method when a multi-carrier scheme modulated signal such as an OFDM modulated signal is transmitted are different.

The reason for why the ninth selection method is used as the selection method for the transmission method when a multi-carrier scheme modulated signal such as an OFDM modulated signal is transmitted will be described.

As a transmission device that transmits a multi-carrier scheme modulated signal such as an OFDM modulated signal, regardless of the modulation scheme used, it is necessary to satisfy the conditions that the influence of phase noise in the RF unit is small and the influence of non-linear distortion in the transmission power amplifier is small (when these conditions are not satisfied, in the reception device that receives the modulated signal transmitted by the transmission device, it is difficult to achieve high data reception quality (since the transmission device transmits modulated signals for a plurality of carriers at the same time, regardless of the modulation scheme used, the PAPR is large, so the above-described conditions are important)).

Accordingly, when the transmission device illustrated in FIG. 1 is the third transmission device (or the first transmission device), by using the ninth selection method, when a plurality of modulated signals are transmitted, it is possible to increase the probability that high data reception quality can be achieved by the reception device, so performing precoding is given as much priority as possible.

As described above, regardless of whether the transmission device transmits a single-carrier scheme modulated signal or a multi-carrier scheme modulated signal such as an OFDM modulated signal, the reception device that receives the modulated signal transmitted by the transmission device can achieve an advantageous effect that it is possible to achieve an even higher data reception quality.

Next, application examples will be given of a single-carrier transmission method and a multi-carrier scheme transmission method such as an OFDM transmission method as described above.

For example, assume that communications standard α exists as a radio communications method. The frequency band used in communications standard α is predetermined, and in communications standard α, one or more frequency bands are set. In such cases, communications standard α is capable of both single-carrier modulated signal transmission and multi-carrier modulated signal transmission, such as OFDM modulated signal transmission.

Moreover, communications standard α supports any one of the first selection method, second selection method, or third selection method described in Embodiment 1 as single-carrier transmission, and supports any one of the fourth selection method, fifth selection method, sixth selection method, seventh selection method, eighth selection method, or ninth selection method described in this embodiment as multi-carrier transmission such as OFDM transmission.

Accordingly, based on the descriptions of the first transmission device, second transmission device, and third transmission device, the following three types of transmission devices can be considered.

Fourth Transmission Device:

The fourth transmission device is a transmission device capable of selectively transmitting both a single-carrier scheme modulated signal in accordance with communications standard α and a multi-carrier scheme modulated signal such as an OFDM modulated signal in accordance with communications standard α. Control signal 100 in the transmission device illustrated in FIG. 1 includes control information for specifying transmission using a single-carrier scheme or transmission using a multi-carrier scheme such as OFDM, and when control signal 100 indicates transmission using a single-carrier scheme, the transmission device illustrated in FIG. 1 transmits a single-carrier scheme modulated signal in accordance with communications standard α, and when control signal 100 indicates transmission using a multi-carrier scheme such as OFDM, the transmission device illustrated in FIG. 1 transmits a multi-carrier scheme modulated signal such as an OFDM modulated signal in accordance with communications standard α. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

Fifth Transmission Device:

The fifth transmission device is a transmission device capable of transmitting a single-carrier scheme modulated signal in accordance with communications standard α. When control signal 100 in the transmission device illustrated in FIG. 1 includes control information for specifying transmission using a single-carrier scheme or transmission using a multi-carrier scheme such as OFDM, the second transmission device can only select transmission using a single-carrier scheme as this control information. Accordingly, the transmission device illustrated in FIG. 1 transmits a single-carrier scheme modulated signal in accordance with communications standard α. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

Sixth Transmission Device:

The sixth transmission device is a transmission device capable of transmitting a multi-carrier scheme modulated signal such as an OFDM modulated signal in accordance with communications standard α. When control signal 100 in the transmission device illustrated in FIG. 1 includes control information for specifying transmission using a single-carrier scheme or transmission using a multi-carrier scheme such as OFDM, the second transmission device can only select transmission using a multi-carrier scheme such as OFMD as this control information. Accordingly, the transmission device illustrated in FIG. 1 transmits a multi-carrier scheme modulated signal such as a OFDM modulated signal in accordance with communications standard α. Note that as a result of the transmission device illustrated in FIG. 1 transmitting, to the reception device illustrated in FIG. 19, control information for specifying transmission using a single-carrier scheme or transmission using a multi-carrier scheme such as OFDM, the reception device illustrated in FIG. 19 can receive, demodulate, and decode the modulated signal transmitted by the transmission device illustrated in FIG. 1.

When the fourth transmission device supports communications standard α, for example, transmission of a single-carrier scheme modulated signal in accordance with single-carrier scheme and transmission of a multi-carrier scheme modulated signal such as a OFDM signal in accordance with communications standard α correspond with a common RF unit and common transmission power amplifier in the transmission device, a RF unit and transmission power amplifier that exhibit small influence of phase noise and non-linear distortion may be used for the multi-carrier scheme modulated signal such as a OFDM signal that conforms to communications standard α. Accordingly, for the single-carrier scheme modulated signal that conforms to communications standard α as well, influence of phase noise and non-linear distortion is small, and with this transmission device, regardless of whether a single-carrier scheme demodulated signal that conforms to communications standard α or a multi-carrier scheme modulated signal such as a OFDM modulated signal that conforms to communications standard α is transmitted, the reception device has an advantageous effect that it can achieve a high data reception quality.

Another example is as follows. In the fourth transmission device, when a single-carrier scheme modulated signal is transmitted in accordance with communications standard α, an RF unit and transmission power amplifier that are dedicated for single-carrier scheme modulated signal usage are used, and when a multi-carrier scheme modulated signal such as an OFDM modulated signal is transmitted in accordance with communications standard α, an RF unit and transmission power amplifier that are dedicated for multi-carrier scheme modulated signal such as OFDM modulated signal usage are used.

Accordingly, regardless of whether a single-carrier scheme demodulated signal that conforms to communications standard α or a multi-carrier scheme modulated signal such as a OFDM modulated signal that conforms to communications standard α is transmitted by this transmission device, the reception device has an advantageous effect that it can achieve a high data reception quality. Moreover, when this transmission device transmits a single-carrier scheme modulated signal in accordance with communications standard α, a suitable RF unit and transmission power amplifier can be used, which yields an advantageous effect that it is possible to reduce power consumption.

The fifth transmission device transmits a single-carrier scheme modulated signal in accordance with communications standard α. Here, as described in Embodiments 1 and 2, the transmission methods that are capable of performing transmission are limited in the selection methods, and thus, it is possible to reduce PAPR. Accordingly, it is possible to reduce the influence of phase noise and non-linear distortion, and in the reception device that receives the modulated signal transmitted by the transmission device, it is possible to achieve an advantageous effect that data reception quality can be improved, and in the transmission device, it is possible to achieve an advantageous effect that an RF unit and transmission power amplifier that are small in circuitry scale and are low-consumption can be used.

The sixth transmission device transmits a multi-carrier scheme modulated signal such as an OFDM modulated signal in accordance with communications standard α. Here, as described in Embodiment 2, the transmission methods that are capable of performing transmission are limited in the selection methods, and thus, in the reception device that receives the modulated signal transmitted by the transmission device, there is an advantageous effect that data reception quality is improved.

As described above, in communications standard α that supports both single-carrier transmission and multi-carrier transmission such as OFDM transmission, it is important that the transmission method for single-carrier transmission and the transmission method for multi-carrier transmission such as OFDM transmission include different aspects. This makes it possible to achieve the advantageous effects described above.

Note that a spread spectrum communication method may be used for the single-carrier scheme modulated signal, and a spread spectrum communication method may be used for the multi-carrier scheme modulated signal such as a OFDM modulated signal.

(Supplemental Information)

As a matter of course, the present disclosure may be carried out by combining a plurality of the exemplary embodiments and other contents described herein.

Moreover, the embodiments are merely examples. For example, while a "modulation scheme, an error correction coding method (error correction code, code length, encode rate, etc., to be used), control information, etc." are exemplified, it is possible to carry out the present disclosure with the same configuration even when other types of a "modulation scheme, an error correction coding method (error correction code, code length, encode rate, etc., to be used), control information, etc." are applied.

Regarding the modulation scheme, even when a modulation scheme other than the modulation schemes described herein is used, it is possible to carry out the embodiments and the other subject matter described herein. For example, amplitude phase shift keying (APSK) (such as 16APSK, 64APSK, 128APSK, 256APSK, 1024APSK and 4096APSK), pulse amplitude modulation (PAM) (such as 4PAM, 8PAM, 16PAM, 64PAM, 128PAM, 256PAM, 1024PAM and 4096PAM), phase shift keying (PSK) (such as BPSK, QPSK, 8PSK, 16PSK, 64PSK, 128PSK, 256PSK, 1024PSK and 4096PSK), and quadrature amplitude modulation (QAM) (such as 4 QAM, 8QAM, 16 QAM, 64 QAM, 128QAM, 256 QAM, 1024 QAM and 4096 QAM) may be applied, or in each modulation scheme, uniform mapping or non-uniform mapping may be performed. Moreover, a method for arranging 2, 4, 8, 16, 64, 128, 256, 1024, etc., signal points on an I-Q plane (a modulation scheme having 2, 4, 8, 16, 64, 128, 256, 1024, etc., signal points) is not limited to a signal point arrangement method of the modulation schemes described herein.

In the present disclosure, it can be considered that the apparatus which includes the transmission device is a communications and broadcast apparatus, such as a broadcast station, a base station, an access point, a terminal or a mobile phone. In such cases, it can be considered that the apparatus that includes the reception device is a communication apparatus such as a television, a radio, a terminal, a personal computer, a mobile phone, an access point, or a base station. Moreover, it can also be considered that the transmission device and reception device according to the present disclosure are each a device having communication functions that is formed so as to be connectable via some interface to an apparatus for executing an application in, for example, a television, a radio, a personal computer or a mobile phone. Moreover, in this embodiment, symbols other than data symbols, such as pilot symbols (preamble, unique word, post-amble, reference symbol, etc.) or symbols for control information, may be arranged in any way in a frame. Here, the terms "pilot symbol" and "control information" are used, but the naming of such symbols is not important; the functions that they perform are.

A pilot symbol may be a known symbol that is modulated using PSK modulation in a transceiver (alternatively, a symbol transmitted by a transmitter can be known by a receiver by the receiver being periodic), and the receiver detects, for example, frequency synchronization, time synchronization, and a channel estimation (channel state information (CSI)) symbol (of each modulated signal) by using the symbol.

Moreover, the symbol for control information is a symbol for transmitting information required to be transmitted to a communication partner in order to establish communication pertaining to anything other than data (such as application data) (this information is, for example, the modulation scheme, error correction encoding method, or encode rate of the error correction encoding method used in the communication, or settings information in an upper layer).

Note that the present invention is not limited to each exemplary embodiment, and can be carried out with various modifications. For example, in each embodiment, the present disclosure is described as being performed as a communications device. However, the present disclosure is not limited to this case, and this communications method can also be used as software.

Note that a program for executing the above-described communications method may be stored in Read Only Memory (ROM) in advance to cause a Central Processing Unit (CPU) to operate this program.

Moreover, the program for executing the communications method may be stored in a computer-readable storage medium, the program stored in the recording medium may be recorded in RAM (Random Access Memory) in a computer, and the computer may be caused to operate according to this program.

Each configuration of each of the above-described embodiments, etc., may be realized as a LSI (large scale integration) circuit, which is typically an integrated circuit. These integrated circuits may be formed as separate chips, or may be formed as one chip so as to include the entire configuration or part of the configuration of each embodiment. LSI is described here, but the integrated circuit may also be referred to as an IC (integrated circuit), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable Field Programmable Gate Array (FPGA) or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology. Adaption of biotechnology, for example, is a possibility.

Figure 22:
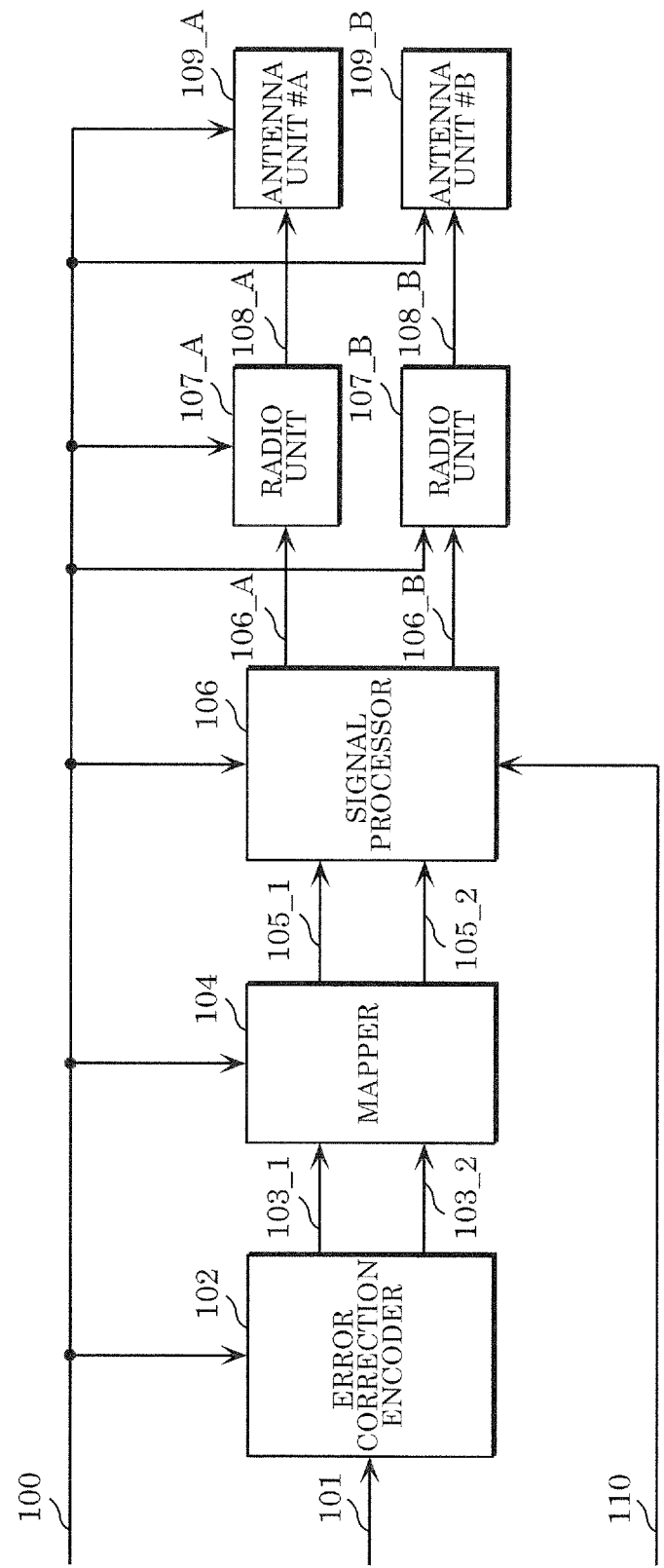
FIG. 22 illustrates one example of a configuration of a transmission device.

Moreover, in the embodiments of the present specification, the description of the configuration of the transmission device was given based on the configuration illustrated in FIG. 1, but the configuration of the transmission device is not limited to this example; for example, the transmission device may have the configuration illustrated in FIG. 22, and further, this may be applied to each of the embodiments.

In FIG. 22, components that operate the same as in FIG. 1 share like reference marks. Accordingly, descriptions that overlap with, for example, FIG. 1 will be omitted.

FIG. 22 differs in operation from FIG. 1 in that error correction encoder 102 outputs encoded data 103_1, 103_2. For example, error correction encoder 102 is a component that encodes block code such as low density parity check (LDPC) code. Here, the 2n−1-th block encoded data is output as encoded data 103_1, and the 2n-th block encoded data is output as encoded data 103_1 (n is an integer that is greater than or equal to 1).

Mapper 104 performs the modulation scheme mapping specified based on encoded data 103_1 to output mapped signal 105_1, and performs the modulation scheme mapping specified based on encoded data 103_2 to output mapped signal 105_2.

Figure 23:
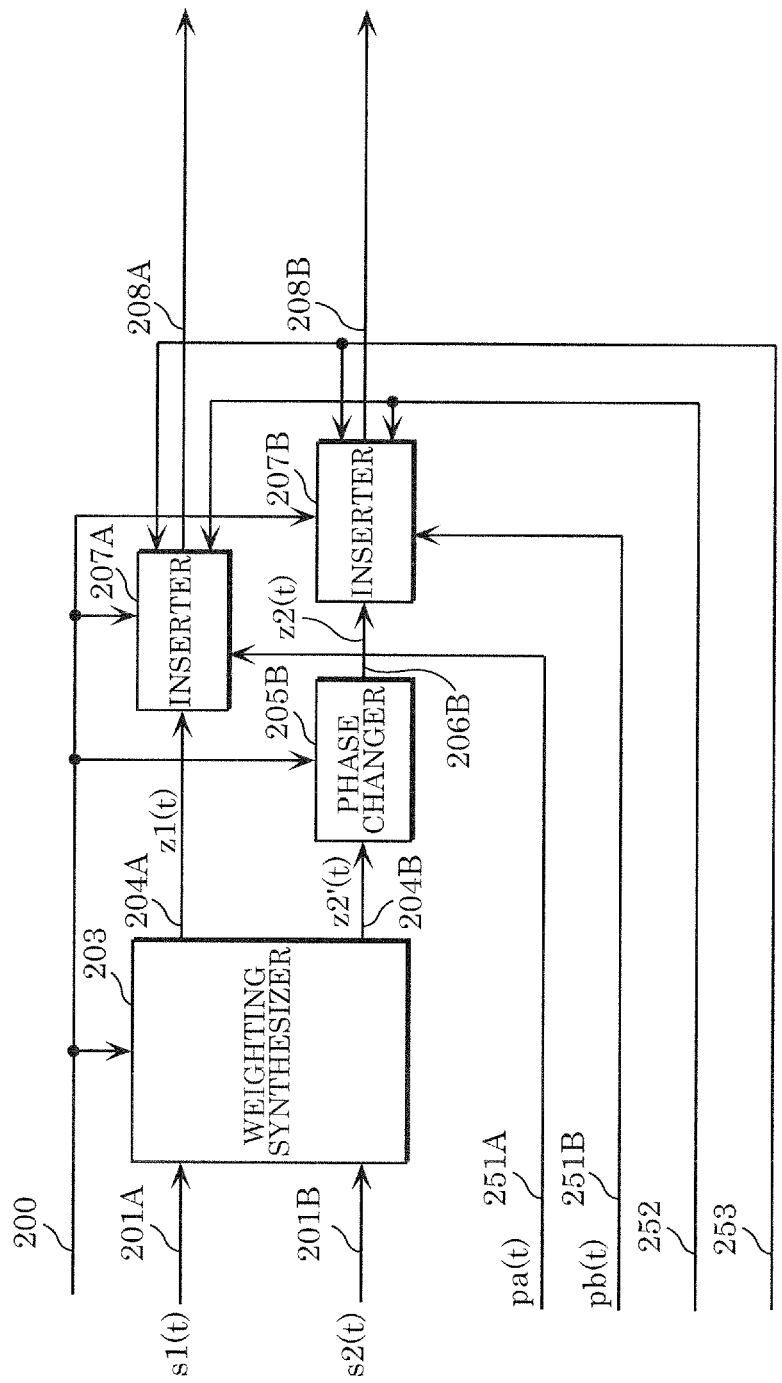
FIG. 23 illustrates one example of a configuration of a signal processor in a transmission device.

Moreover, the embodiments in the present specification described the configuration of signal processor 106 illustrated in FIG. 1 and FIG. 22 based on the configuration illustrated in FIG. 2, but signal processor 106 may have the configuration illustrated in FIG. 23 instead of FIG. 2, and further, this may be applied to each of the embodiments.

In FIG. 23, components that operate the same as in FIG. 2 share like reference marks. Accordingly, descriptions that overlap with, for example, FIG. 2 will be omitted.

FIG. 23 differs from FIG. 2 in that phase changer 209B illustrated in FIG. 2 is omitted. Accordingly, baseband signal 208A corresponds to signal-processed signal 106_A in FIG. 1, FIG. 22, and baseband signal 208B corresponds to signal-processed signal 106_B in FIG. 1, FIG. 22.

In the present specification, even if the specifics of the transmission device configuration are different, by generating a signal equivalent to any one of signal-processed signal 106_A, 106_B described above in any of the embodiments of the present specification and transmitting the signal using a plurality of antenna units, when the reception device is in an environment in which direct waves are dominant, in particular when in an LOS environment, it is possible to achieve an advantageous effect in which the reception quality of the reception device that is performing MIMO data symbol transferring (transfer via a plurality of streams) can be improved (other advantageous effects described in the present specification are also achievable).

Note that in signal processor 106 illustrated in FIG. 1 and FIG. 22, a phase change may be provided both before and after weighting synthesizer 203. More specifically, signal processor 106 includes, before weighting synthesizer 203, one or both of phase changer 205A_1 that generates phase-changed signal 2801A by applying a phase change to mapped signal 201A, and phase changer 205B_1 that generates phase-changed signal 2801B by applying a phase change to mapped signal 201B. Signal processor 106 further includes, before inserter 207A, 207B, one or both of phase changer 205A_2 that generates phase-changed signal 206A by applying a phase change to weighting synthesized signal 204A, and phase changer 205B_2 that generates phase-changed signal 206B by applying a phase change to weighting synthesized signal 204B.

Here, when signal processor 106 includes phase changer 205A_1, one input of weighting synthesizer 203 is phase-changed signal 2801A, and when signal processor 106 does not include phase changer 205A_1, one input of weighting synthesizer 203 is mapped signal 201A. When signal processor 106 includes phase changer 205B_1, the other input of weighting synthesizer 203 is phase-changed signal 2801B, and when signal processor 106 does not include phase changer 205B_1, the other input of weighting synthesizer 203 is mapped signal 201B. When signal processor 106 includes phase changer 205A_2, the input of inserter 207A is phase-changed signal 206A, and when signal processor 106 does not include phase changer 205A_2, the input of inserter 207A is weighting synthesized signal 204A. When signal processor 106 includes phase changer 205B_2, the input of inserter 207B is phase-changed signal 206B, and when signal processor 106 does not include phase changer 205B_2, the input of inserter 207B is weighting synthesized signal 204B.

Moreover, the transmission device illustrated in FIG. 1 and FIG. 22 may include a second signal processor that implements different signal processing on signal-processed signal 106_A, 106_B, i.e., the output of signal processor 106. Here, radio unit 107_A receives an input of signal A processed with second signal processing and performs predetermined processing on the input signal, and radio unit 107_B receives an input of signal B processed with second signal processing and performs predetermined processing on the input signal, where signal A and signal B processed with second signal processing are two signals output from a second signal processor.

When signal processor 106 further includes, before inserter 207A, 207B, both of phase changer 205A_2 that generates phase-changed signal 206A by applying a phase change to weighting synthesized signal 204A, and phase changer 205B_2 that generates phase-changed signal 206B by applying a phase change to weighting synthesized signal 204B, phase-changed signals 206A (z1(i)), 206B(z2(i)) input into inserters 207A, 207B can be expressed by overwriting the following found in Equation (3) and Equation (37) through Equation (45):

[MATH. 47]

$$\begin{pmatrix} 1 & 0 \\ 0 & y(i) \end{pmatrix}$$

with

[MATH. 48]

$$\begin{pmatrix} y_A(i) & 0 \\ 0 & y_B(i) \end{pmatrix}$$

as a first replacement. When this first replacement is made in Equation (3) and Equation (37) through Equation (45), with respect to all configurations described with reference to Equation (3) and Equation (37) through Equation (45) in the present specification, the resulting equations may be applied as variations.

Phase change value $A(y_A(i))$ and phase change value $B(y_B(i))$ can respectively be expressed as $y_A(i)=ej\times\delta_A(i)$ and $y_B(i)=ej\times\delta_B(i)$. Here, $\delta_A(i)$ and $\delta_B(i)$ are real numbers. $\delta_A(i)$ and $\delta_B(i)$ are set such that a result of a modulo operation of the divisor $2\pi$ with respect to $\delta_A(i)-\delta_B(i)$ changes in a cycle N (N is an integer that is greater than or equal to N) However, how $\delta_A(i)$ and $\delta_B(i)$ are set is not limited to this example. For example, a method in which phase change value $A(y_A(i))$ and phase change value $B(y_B(i))$ each change cyclically or regularly, and the difference $(y_A(i)/y_B(i))$ between phase change values A and B changes cyclically or regularly may be used.

When signal processor 106 does not include, before inserter 207A, 207B, either one of phase changer 205A_2 that generates phase-changed signal 206A by applying a phase change to weighting synthesized signal 204A, and phase changer 205B_2 that generates phase-changed signal 206B by applying a phase change to weighting synthesized signal 204B, phase-changed signal 206A (z1(i)) and weighting synthesized signal 204B (z2(i)) input into inserters 207A, 207B can be expressed by overwriting the following found in Equation (3) and Equation (37) through Equation (45):

[MATH. 49]

$$\begin{pmatrix} 1 & 0 \\ 0 & y(i) \end{pmatrix}$$

with

[MATH. 50]

$$\begin{pmatrix} y(i) & 0 \\ 0 & 1 \end{pmatrix}$$

as a second replacement. When this second replacement is made in Equation (3) and Equation (37) through Equation (45), with respect to all configurations described with reference to Equation (3) and Equation (37) through Equation (45) in the present specification, the resulting equations may be applied as variations.

For example, phase change value y(i) is set as indicated in Equation (2). However, the method for setting phase change value y(i) is not limited to the method used in Equation (2); for example, a method in which the phase is changed cyclically or regularly is conceivable.

Note that in Embodiment 1, it is described that when the modulation scheme used for mapped signal 201A (s1(i)) is QPSK and the modulation scheme used for mapped signal 201B (s2(i)) is 16 QAM, the values for u and v in Equation (37) may be set as follows to achieve good data reception quality in the reception device:

[MATH. 51]

$u=\sqrt{2/3}$   Equation (51)

[MATH. 52]

$v=\sqrt{4/3}$   Equation (52)

[MATH. 53]

$u=a\times\sqrt{2/3}$   Equation (53)

[MATH. 54]

$v=a\times\sqrt{4/3}$   Equation (54)

However, examples of settings for the values of u and v that can achieve good data reception quality in the reception device when the modulation scheme used for mapped signal 201A (s1(i)) is QPSK and the modulation scheme used for mapped signal 201B (s2(i)) is 16 QAM is not limited to the combination of Equation (51) and Equation (52) and the combination of Equation (53) and Equation (54).

One example will be described in which the error correction encoding scheme used by error correction encoder 102 to generate encoded data 103 is selectable between a first error correction encoding scheme and a second error correction encoding scheme that is different from the first error correction encoding scheme in regard to one or both of the encode rate and code length.

Mapper 104 uses a first modulation scheme to generate mapped signal 201A (s1(i)), and uses a second modulation scheme different from the first modulation scheme to generate mapped signal 201B (s2(i)). Here, when signal processor 106 uses the first error correction encoding scheme as the error correction encoding scheme and uses the first and second modulation schemes as a combination of modulation schemes, values $u_1$ and $v_1$ are used as the values for u and v, respectively, in Equation (37). Moreover, when signal processor 106 uses the second error correction encoding scheme as the error correction encoding scheme and uses the first and second modulation schemes as a combination of modulation schemes, values $u_2$ and $v_2$ are used as the values for u and v, respectively, in Equation (37). Here, when the ratio of $u_1$ and $v_1$ differs from the ratio of $u_2$ and $v_2$, compared to when the ratio of $u_1$ and $v_1$ is the same as the ratio of $u_2$ and $v_2$, there is a probability that the reception device can achieve good data reception quality.

Note that in the above description, the ratio of values of u and v in Equation (37) was described as being changed when the encode rate or code length or both of the error correction encoding scheme used by error correction encoder 102 to generate encoded data 103 is different, but the ratio of the u and v values may be changed based on conditions other than the encode rate or code length of the error correction encoding scheme. For example, signal processor 106 may change the ratio of the u and v values in accordance with a combination of modulation schemes used as the first modulation scheme and the second modulation scheme. Furthermore, as one other example, even when error correction encoding schemes are equal and the combination of modulation schemes used as the first modulation scheme and the second modulation scheme are equal, signal processor 106 may change the ratio of the values of u and v so as to differ between when a single-carrier scheme modulated signal is transmitted and a multi-carrier scheme modulated signal such as an OFDM modulated signal is transmitted. This configuration makes it possible for reception device to achieve good data reception quality.

(Supplemental Information 2)

The fifth, sixth, seventh, eighth, and ninth selection methods described in Embodiment 2 are described as being applied to a multi-carrier transmission method such as OFDM, but the fifth, sixth, seventh, eighth, and ninth selection methods may be applied to a single-carrier method. In other words, the transmission device may use the fifth, sixth, seventh, eighth, and ninth selection methods when generating a modulated signal for transmission.

The advantages of this configuration will be described next.

For example, in transmission method #7-5, transmission method #7-6, transmission method #7-8, and transmission method #7-9 in the seventh selection method, upon generating a plurality of modulated signals, the transmission device selects a precoding matrix to be used in the precoding from among a plurality of precoding matrices. When the transmission device selects "a precoding matrix that satisfies any one of Equation (13) through Equation (20) in which $\theta \neq 0$", an advantageous effect in which data reception quality is good can be achieved when the reception field intensities of the modulated signals to be transmitted by the transmission device are different in the reception device, which is the communication partner (each stream is transmitted from a plurality of antennas, so a spatial diversity effect can be realized).

However, when the transmission device selects "a precoding matrix that satisfies any one of Equation (13) through Equation (20) in which $\theta \neq 0$", an advantageous effect in which data reception quality is good can be achieved when the reception field intensities of the modulated signals to be transmitted by the transmission device are not greatly different in the reception device, which is the communication partner.

Accordingly, the transmission device can achieve an advantageous effect of improved data reception quality in the reception device, which is the communication partner, by suitably selecting a precoding matrix to be used when generating a plurality of modulated signals to be transmitted using, for example, feedback information from a terminal.

Note that in the first, second, third, fourth, fifth, sixth, seventh, eighth, and ninth selection methods described in Embodiments 1 and 2, there is no need to support all of the inclusive transmission methods. Moreover, in the first, second, third, fourth, fifth, sixth, seventh, eighth, and ninth selection methods, transmission methods other than the inclusive transmission methods may be included in the group of candidates to be selected from by the transmission device. Moreover, both of the above may be combined.

For example, in the seventh selection method, in Embodiment 2, transmission method #7-1, transmission method #7-2, transmission method #7-3, transmission method #7-4, transmission method #7-5, transmission method #7-6, transmission method #7-7, transmission method #7-8, and transmission method #7-9 are given as transmission method candidates to be selected from by the transmission device. Here, all transmission methods #7-1 through #7-9 may be included in the group of candidates to be selected from by the transmission device. Moreover, transmission methods other than transmission methods #7-1 through #7-9 may be included in the group of candidates to be selected from by the transmission device.

A specific example will be given.

Example 1

The group of candidates to be selected from the transmission device is set as "transmission method #7-1, transmission method #7-2, transmission method #7-3, transmission method #7-4, transmission method #7-5, transmission method #7-6, transmission method #7-8, and transmission method #7-9".

Example 2

The group of candidates to be selected from the transmission device is set as "transmission method #7-1, transmission method #7-2, transmission method #7-3, transmission method #7-4, transmission method #7-5, transmission method #7-6, transmission method #7-7, transmission method #7-8, transmission method #7-9, and transmission method #A".

Transmission method #A is, for example, the following transmission method.

A modulation scheme (of s1(i)) for transmitting a single stream (i.e., for transmitting s1(i)) is 256 QAM (or 256APSK (Amplitude Phase Shift Keying) or a modulation scheme in which 256 signal points are in the in-phase I-quadratic Q plane)(however, the single stream modulated signal may be transmitted using a single antenna and, alternatively, may be transmitted using a plurality of antennas).

Example 3

The group of candidates to be selected from the transmission device is set as "transmission method #7-1, transmission method #7-2, transmission method #7-3, transmission method #7-4, transmission method #7-5, transmission method #7-6, transmission method #7-8, transmission method #7-9, and transmission method #A".

Although Examples 1, 2, and 3 are provided as specific examples, these examples are not limiting.

Moreover, if the transmission device selects a transmission method from among transmission methods included in a 7'-th selection method that includes transmission methods #7'-1 through #7'-9, in the reception device, which is the communication partner, data reception quality improves. 7'-th selection method:

Transmission Method #7'-1:

The modulation scheme (of s1(i)) for transmitting a single stream (i.e., transmitting s1(i)) is BPSK (or π/2 shift BPSK) (however, the single stream modulated signal may be transmitted using a single antenna and, alternatively, transmitted using a plurality of antennas).

Transmission Method #7'-2:

The modulation scheme (of s1(i)) for transmitting a single stream (i.e., transmitting s1(i)) is QPSK (or π/2 shift QPSK) (however, the single stream modulated signal may be transmitted using a single antenna and, alternatively, transmitted using a plurality of antennas).

Transmission Method #7'-3:

The modulation scheme (of s1(i)) for transmitting a single stream (i.e., transmitting s1(i)) is 16 QAM (or π/2 shift 16 QAM) (or a modulation scheme in which 16 signal points are in the in-phase I-quadrature Q plane, such as 16APSK (a shift may be performed)) (however, the single stream modulated signal may be transmitted using a single antenna and, alternatively, transmitted using a plurality of antennas).

Transmission Method #7'-4:

The modulation scheme (of s1(i)) for transmitting a single stream (i.e., transmitting s1(i)) is 64 QAM (or π/2 shift 64 QAM) (or a modulation scheme in which 64 signal points are in the in-phase I-quadrature Q plane, such as 64APSK (a shift may be performed)) (however, the single stream modulated signal may be transmitted using a single antenna and, alternatively, transmitted using a plurality of antennas).

Transmission Method #7'-5:

Two streams are transmitted (s1(i) and s2(i) are transmitted). The modulation scheme of s1(i) is BPSK (or π/2 shift BPSK), and the modulation scheme of s2(i) is BPSK (or π/2 shift BPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed; coefficient multiplication may also be performed (by coefficient multipliers 301A, 302A)).

Next, precoding processing will be described.

In the transmission device illustrated in FIG. 1, a given encode rate is set as the error correction encoding. Here, a plurality of precoding matrices expressed by any one of Equation (13) through Equation (20) are prepared for performing precoding processes. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrices in Equation (13) through Equation (20)).

Based on control signal 200, weighting synthesizer 203 illustrated in FIG. 2, FIG. 3 performs precoding using one matrix specified by control signal 200 from among the N matrices from the first matrix to the N-th matrix.

Note that the N matrices include at least one precoding matrix that satisfies any of Equations (13) through (20) in which θ=0, and include at least one precoding matrix that satisfies any one of Equation (13) through Equation (20) in which θ≠0.

Transmission Method #7'-6;

Two streams are transmitted (s1(i) and s2(i) are transmitted). The modulation scheme of s1(i) is QPSK (or π/2 shift QPSK), and the modulation scheme of s2(i) is QPSK (or π/2 shift QPSK). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed; coefficient multiplication may also be performed (by coefficient multipliers 301A, 302A)).

Next, precoding processing will be described.

In the transmission device illustrated in FIG. 1, a given encode rate is set as the error correction encoding. Here, a plurality of precoding matrices expressed by any of Equations (13) through (20) are prepared for performing precoding processes. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrices in Equation (13) through Equation (20)).

Based on control signal 200, weighting synthesizer 203 illustrated in FIG. 2, FIG. 3 performs precoding using one matrix specified by control signal 200 from among the N matrices from the first matrix to the N-th matrix.

Note that the N matrices include at least one precoding matrix that satisfies any one of Equation (13) through Equation (20) in which θ=0, and include at least one precoding matrix that satisfies any one of Equation (13) through Equation (20) in which θ≠0.

Transmission Method #7'-7:

Two streams are transmitted (s1(i) and s2(i) are transmitted). The modulation scheme of s1(i) is QPSK (or π/2 shift QPSK), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed; coefficient multiplication may also be performed (by coefficient multipliers 301A, 302A)). Here, θ≠0 radians in Equation (13) through Equation (20) (note that θ is greater than or equal to 0 radians and less than 2π radians (0 radians≤θ<2π radians)) (when θ=π/4 radians (45 degrees), the average transmission power of the modulated signals transmitted from the antennas is equal).

Transmission Method #7'-8:

Two streams are transmitted (s1(i) and s2(i) are transmitted). The modulation scheme of s1(i)) is 16 QAM (or π/2 shift 16 QAM) (or a modulation scheme in which 16 signal points are in the in-phase I-quadrature Q plane, such as 16APSK (a shift may be performed)), and the modulation scheme of s2(i) is 16 QAM (or π/2 shift 16 QAM) (or a modulation scheme in which 16 signal points are in the in-phase I-quadrature Q plane, such as 16APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed; coefficient multiplication may also be performed (by coefficient multipliers 301A, 302A)).

Next, precoding processing will be described.

In the transmission device illustrated in FIG. 1, a given encode rate is set as the error correction encoding. Here, a plurality of precoding matrices expressed by any of Equations (13) through (20) are prepared for performing precoding processes. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrices in Equation (13) through Equation (20)).

Based on control signal 200, weighting synthesizer 203 illustrated in FIG. 2, FIG. 3 performs precoding using one matrix specified by control signal 200 from among the N matrices from the first matrix to the N-th matrix.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Transmission Method #7'-9:

Two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed; coefficient multiplication may also be performed (by coefficient multipliers 301A, 302A)). Here, $\theta \neq 0$ radians in Equation (13) through Equation (20) (note that $\theta$ is greater than or equal to 0 radians and less than 2π radians (0 radians≤$\theta$<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 16APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed; coefficient multiplication may also be performed (by coefficient multipliers 301A, 302A)).

mitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed; coefficient multiplication may also be performed (by coefficient multipliers 301A, 302A)). Here, $\theta=0$ radians in Equation (13) through Equation (20) (note that $\theta$ is greater than or equal to 0 radians and less than 2π radians (0 radians≤$\theta$<2π radians)).

Alternatively, two streams are transmitted (s1(i) and s2(i) are transmitted). The modulation scheme of s1(i) is 64 QAM (or π/2 shift 64 QAM) (or a modulation scheme in which 64 signal points are in the in-phase I-quadrature Q plane, such as 64APSK (a shift may be performed)), and the modulation scheme of s2(i) is 64 QAM (or π/2 shift 64 QAM) (or a modulation scheme in which 64 signal points are in the in-phase I-quadrature Q plane, such as 64APSK (a shift may be performed)). Here, two modulated signals are transmitted. The first modulated signal is transmitted using one or more antennas, and the second modulated signal is transmitted using one or more antennas. Here, based on FIG. 2 and FIG. 3, precoding (weighted synthesis) is performed using any one of the (precoding) matrices in Equation (13) through Equation (20), and thereafter, a phase change is performed (by phase changer 205B), and the two streams are transmitted (note that a phase change need not be performed; coefficient multiplication may also be performed (by coefficient multipliers 301A, 302A)).

Next, precoding processing will be described.

In the transmission device illustrated in FIG. 1, a given encode rate is set as the error correction encoding. Here, a plurality of precoding matrices expressed by any of Equations (13) through (20) are prepared for performing precoding processes. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrices in Equation (13) through Equation (20)).

Based on control signal 200, weighting synthesizer 203 illustrated in FIG. 2, FIG. 3 performs precoding using one matrix specified by control signal 200 from among the N matrices from the first matrix to the N-th matrix.

Note that the N matrices include at least one precoding matrix that satisfies any one of Equation (13) through Equation (20) in which $\theta=0$, and include at least one precoding matrix that satisfies any one of Equation (13) through Equation (20) in which $\theta \neq 0$.

Note that in transmission method #7'-5, transmission method #7'-6, transmission method #7'-8, and transmission method #7'-9, "a given encode rate is set as the error correction encoding" is stipulated, but this is not limited to a single encode rate.

For example, when the encode rate is 1/2, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrices in Equation (13) through Equation (20)).

Based on control signal 200, weighting synthesizer 203 illustrated in FIG. 2, FIG. 3 performs precoding using one matrix specified by control signal 200 from among the N matrices from the first matrix to the N-th matrix.

Note that the N matrices include at least one precoding matrix that satisfies any one of Equation (13) through Equation (20) in which θ=0, and include at least one precoding matrix that satisfies any one of Equation (13) through Equation (20) in which θ≠0. When the encode rate is 2/3, a plurality of precoding matrices expressed by any of Equation (13) through Equation (20) are provided for performing precoding processing. For example, N (N is an integer that is greater than or equal to 2) precoding matrices are prepared. Here, the N precoding matrices are referred to as i-th matrix (i is an integer that is greater than or equal to 1 and less than or equal to N) (the i-th matrix may be expressed as any one of the matrices in Equation (13) through Equation (20)).

Based on control signal 200, weighting synthesizer 203 illustrated in FIG. 2, FIG. 3 performs precoding using one matrix specified by control signal 200 from among the N matrices from the first matrix to the N-th matrix.

Note that the following may be adopted: the N matrices include at least one precoding matrix that satisfies any one of Equation (13) through Equation (20) in which θ=0, and include at least one precoding matrix that satisfies any one of Equation (13) through Equation (20) in which θ≠0.

Moreover, in the 7'-th selection method, there is no need to support all of the inclusive transmission methods. Moreover, in the 7'-th selection method, transmission methods other than the inclusive transmission methods may be included in the group of candidates to be selected from by the transmission device. Moreover, both of the above may be combined.

For example, in the 7'-th selection method, transmission method #7'-1, transmission method #7'-2, transmission method #7'-3, transmission method #7'-4, transmission method #7'-5, transmission method #7'-6, transmission method #7'-7, transmission method #7'-8, and transmission method #7'-9 are given as transmission method candidates to be selected from by the transmission device. Here, all transmission methods #7'-1 through #7'-9 may be included in the group of candidates to be selected from by the transmission device. Moreover, transmission methods other than transmission methods #7'-1 through #7'-9 may be included in the group of candidates to be selected from by the transmission device.

A specific example will be given.

Example 4

Transmission method #7'-1, transmission method #7'-2, transmission method #7'-3, transmission method #7'-4, transmission method #7'-5, transmission method #7'-6, transmission method #7'-8, and transmission method #7'-9 are set as candidates to be selected from by the transmission device.

Example 5

Transmission method #7'-1, transmission method #7'-2, transmission method #7'-3, transmission method #7'-4, transmission method #7'-5, transmission method #7'-6, transmission method #7'-7, transmission method #7'-8, transmission method #7'-9, and transmission method #A are set as candidates to be selected from by the transmission device.

Example 6

Transmission method #7'-1, transmission method #7'-2, transmission method #7'-3, transmission method #7'-4, transmission method #7'-5, transmission method #7'-6, transmission method #7'-8, transmission method #7'-9, and transmission method #A are set as candidates to be selected from by the transmission device.

Although Examples 4, 5, and 6 are provided as specific examples, these examples are not limiting.

Embodiment 3

In this embodiment, a configuration different from those in FIG. 2 and FIG. 23 of signal processor 106 in the transmission device illustrated in FIG. 1 and FIG. 22 will be described.

Figure 24:
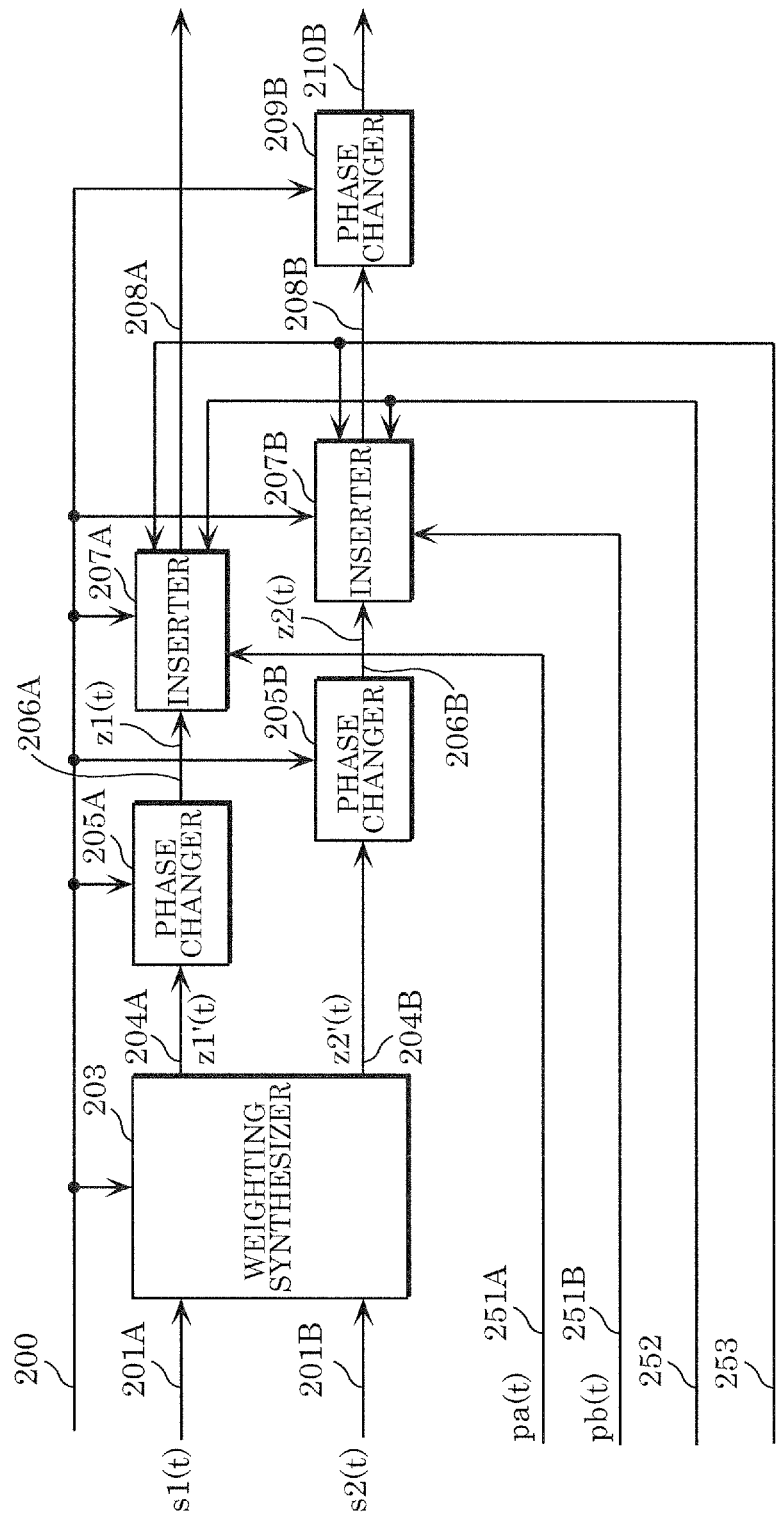
FIG. 24 illustrates one example of a configuration of a signal processor in a transmission device.

FIG. 24 illustrates one example of a configuration of signal processor 106 different from the configurations illustrated in FIG. 2 and FIG. 23. Components that operate the same as in FIG. 2 and FIG. 23 share like reference marks. Accordingly, repeated description thereof will be omitted.

FIG. 24 differs from FIG. 2 particularly in regard to the addition of two phase changers directly after weighting synthesizer 203.

Phase changer 205A receives inputs of weighting synthesized signal 204A and control signal 200, applies a phase change to weighting synthesized signal 204A based on control signal 200, and outputs phase-changed signal 206A. As one example, weighting synthesized signal 204A is expressed as z1'(t). Note that t is time, and z1'(t) is defined as a complex number. Accordingly, z1'(t) may be a real number. Phase-changed signal 206A is expressed as z1(t). z1(t) is defined as a complex number. Accordingly, z1(t) may be a real number. z1'(t) and z1(t) are described as functions of t, but may be functions of frequency f, and may be functions of both time t and frequency f. These may also be functions of symbol number i. Hereinafter, they will be described as functions of symbol number i. In regard to this point, throughout the entire present specification, the same description and formulaic equations are given.

Phase changer 205B receives inputs of weighting synthesized signal 204B and control signal 200, applies a phase change to weighting synthesized signal 204B based on control signal 200, and outputs phase-changed signal 206B. As one example, weighting synthesized signal 204B is expressed as z2'(t). Note that t is time, and z2'(t) is defined as a complex number. Accordingly, z2'(t) may be a real number. Phase-changed signal 206B is expressed as z2(t). Note that z2(t) is defined as a complex number. Accordingly, z2(t) may be a real number. z2'(t) and z2(t) are described as functions of t, but may be functions of frequency f, and may be functions of both time t and frequency f. These may also be functions of symbol number i. Hereinafter, they will be described as functions of symbol number i.

Weighting synthesizer (precoder) 203 performs the following calculation.

[MATH. 55]

$$\begin{pmatrix} r1'(i) \\ r2'(i) \end{pmatrix} = \begin{pmatrix} a & b \\ c & d \end{pmatrix} \begin{pmatrix} s1(i) \\ s2(i) \end{pmatrix}$$

Equation (55)

In Equation (55), a, b, c, and d are defined as complex numbers, and, accordingly, may be real numbers. Detailed examples of the precoding matrix (Equation (4)) of a, b, c, and d are given in Equation (5) through Equation (36) in Embodiment 1.

In phase changer 205A, for example, a phase change of Y(i) is applied to z1'(i). Accordingly, z1(i) can be expressed as z1(i)=Y(i)×z1'(i). Not that, for example, symbol number i is an integer that is greater than or equal to 0.

In phase changer 205B, for example, a phase change of y(i) is applied to z2'(i). Accordingly, z2(i) can be expressed as z2(i)=y(i)×z2'(i).

Accordingly, z1(i) and z2(i) can be expressed with the following formula.

[MATH. 56]

$$\begin{pmatrix} z1(i) \\ z2(i) \end{pmatrix} = \begin{pmatrix} Y(i) & 0 \\ 0 & y(i) \end{pmatrix} \begin{pmatrix} a & b \\ c & d \end{pmatrix} \begin{pmatrix} s1(i) \\ s2(i) \end{pmatrix}$$
$$= \begin{pmatrix} e^{j \times \varepsilon(i)} & 0 \\ 0 & e^{j \times \delta(i)} \end{pmatrix} \begin{pmatrix} a & b \\ c & d \end{pmatrix} \begin{pmatrix} s1(i) \\ s2(i) \end{pmatrix} \quad \text{Equation (56)}$$

Note that δ(i) and ε(i) are real numbers. z1(i) and z2(i) are transmitted from the transmission device at the same time and using the same frequency (same frequency band).

Note that δ(i) and ε(i) are real numbers. z1(i) and z2(i) are transmitted from the transmission device at the same time and using the same frequency (same frequency band).

[MATH. 57]

$$Y(i) = e^{j\left(\frac{\pi \times i}{N} + \Gamma\right)} \quad \text{Equation (57)}$$

[MATH. 58]

$$y(i) = e^{j\left(\frac{-\pi \times i}{N} + \Omega\right)} \quad \text{Equation (58)}$$

Note that N is the phase change cycle, and is an integer that is greater than or equal to 3. In other words, the number of transmission streams or number of transmission modulated signals is an integer that is greater than 2. Moreover, Γ and Ω are real numbers (as a simplified example, Γ and Ω are zero; however, this example is not limiting). When set in this manner, the peak-to-average power ratio (PAPR) of signal z1(i) and the PAPR of z2(i) are, in the case of a single-carrier scheme, the same. Accordingly, the phase noise in radio units 107_A and 108_B in, for example, FIG. 1 and FIG. 22, and the linear required criteria for the transmission power unit are the same, which is advantageous since low power consumption is easily achievable and a common radio unit configuration can be used (note that there is a high probability that the same advantageous effects can be achieved when a multi-carrier scheme such as OFDM is used as well).

Phase change values Y(i) and y(i) may be applied in the following manner.

[MATH. 59]

$$Y(i) = e^{j\left(\frac{-\pi \times i}{N} + \Gamma\right)} \quad \text{Equation (59)}$$

[MATH. 60]

$$y(i) = e^{j\left(\frac{\pi \times i}{N} + \Omega\right)} \quad \text{Equation (60)}$$

Even when applied as in Equation (59) and Equation (60), the same advantageous effects as above can be achieved.

Phase change values Y(i) and y(i) may be applied in the following manner.

[MATH. 61]

$$Y(i) = e^{j\left(\frac{k \times \pi \times i}{N} + \Gamma\right)} \quad \text{Equation (61)}$$

[MATH. 62]

$$y(i) = e^{j\left(\frac{-k \times \pi \times i}{N} + \Omega\right)} \quad \text{Equation (62)}$$

Note that k is an integer excluding 0. Even when applied as in Equation (61) and Equation (62), the same advantageous effects as above can be achieved.

Application of phase change values Y(i) and y(i) is not limited to the above examples. When the precoding matrix used by weighting synthesizer 203 in FIG. 24 is expressed as in Equation (33) and Equation (34), weighting synthesizer 203 in FIG. 24 outputs mapped signal 201A as weighting synthesized signal 204A and mapped signal 201B as weighting synthesized signal 204B without performing signal processing on mapped signals 201A, 201B. Stated differently, weighting synthesizer 203 may be omitted. Alternately, when weighting synthesizer 203 is provided, control for whether to perform weighting synthesis or not may be determined according to control signal 200.

Next, the configuration illustrated in FIG. 25, which is different from those in FIG. 2, FIG. 23, and FIG. 24, of signal processor 106 in the transmission device illustrated in FIG. 1 and FIG. 22, will be described.

Figure 25:
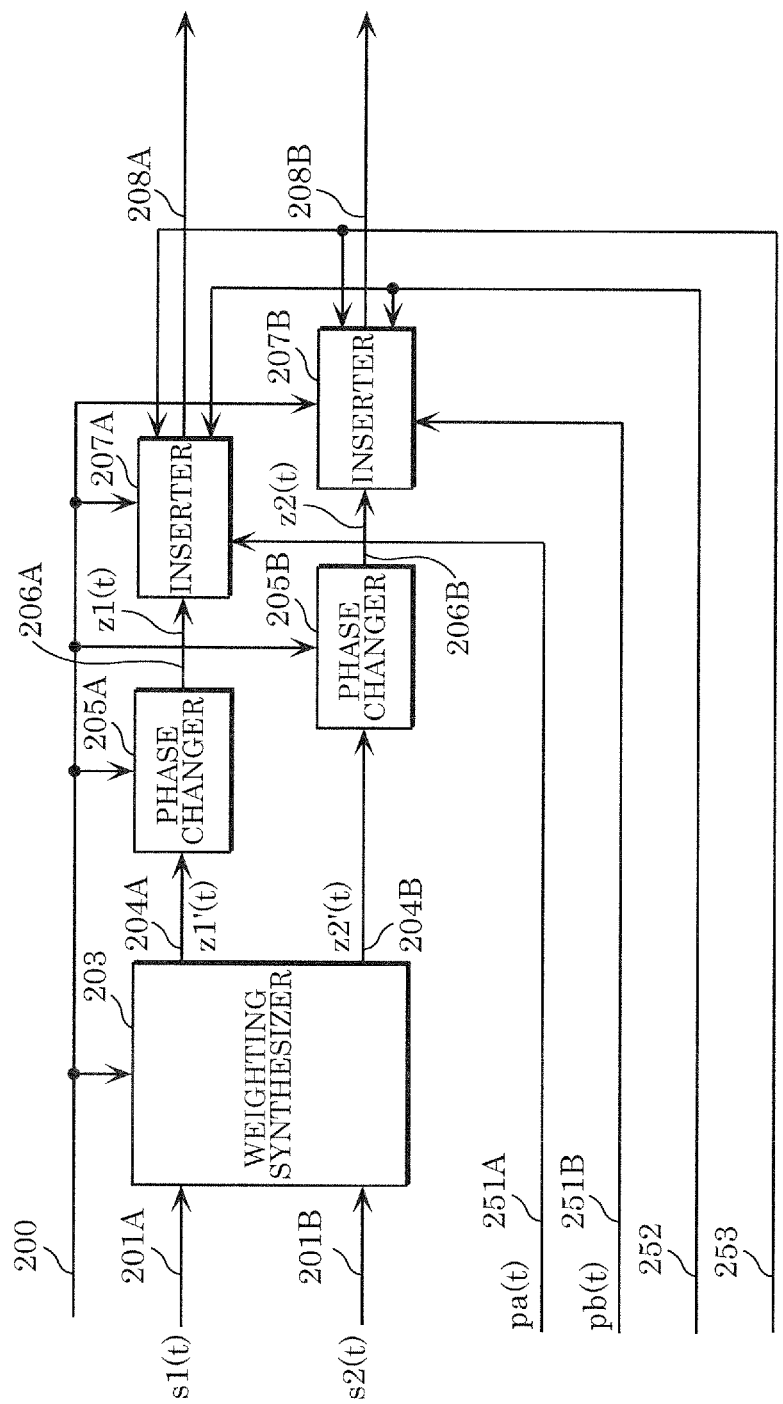
FIG. 25 illustrates one example of a configuration of a signal processor in a transmission device.

In FIG. 25, components that operate the same as in FIG. 24 share like reference marks. Accordingly, repeated description thereof will be omitted. FIG. 24 and FIG. 25 differ in that phase changer 209B is present in FIG. 24 and omitted in FIG. 25. This point of difference has already been described in the description of FIG. 23. Accordingly, repeated description will be omitted.

Moreover, operations performed by weighting synthesizer 203 and phase changers 205A, 205B in FIG. 25 are the same as in the description of FIG. 24. Accordingly, repeated description will be omitted. When the precoding matrix used by weighting synthesizer 203 in FIG. 25 is expressed as in Equation (33) and Equation (34), weighting synthesizer 203 in FIG. 25 outputs mapped signal 201A as weighting synthesized signal 204A and mapped signal 201B as weighting synthesized signal 204B without performing signal processing on mapped signals 201A, 201B. Stated differently, weighting synthesizer 203 may be omitted. Alternately, when weighting synthesizer 203 is provided, control for whether to perform weighting synthesis or not may be determined according to control signal 200.

The configuration of signal processor 106 in the transmission device in FIG. 1 and FIG. 22 has the configurations of FIG. 24 and FIG. 25 described in this embodiment, and even if various embodiments described in the present specification are combined with respect to transmission device in FIG. 1 and FIG. 22 including the configurations in FIG. 24 and FIG. 25, these can be implemented in the same manner as in the embodiments, and can achieve the same advantageous effects described in the embodiments.

(Supplemental Information 3)

In this embodiment, a configuration different from those in FIG. 2, FIG. 23, FIG. 24, and FIG. 25 of signal processor 106 in the transmission device illustrated in FIG. 1 and FIG. 22 will be described.

The configuration of signal processor 106 in the transmission device in FIG. 1 and FIG. 22 is achieved by connecting FIG. 26 or FIG. 27 or FIG. 28 or FIG. 29 or FIG. 30 to FIG. 23 or FIG. 25. Since FIG. 23 and FIG. 25 have already been described, the following will focus on the configurations of FIG. 26 through FIG. 30.

FIG. 26 illustrates a first configuration after inserter 207A and after inserter 207B in FIG. 23 and FIG. 25.

In FIG. 26, components that operate the same as in FIG. 23, FIG. 25 share like reference marks. Accordingly, repeated description thereof will be omitted.

Cyclic delay diversity (CDD) unit 2601A receives inputs of signal 208A and control signal 200, implements a CDD process on signal 208A based on control signal 200, and outputs CDD processed signal 2602A. Note that CDD may be referred to as cyclic shift diversity (CSD).

CDD processed signal 2602A in FIG. 26 corresponds to processed signal 106_A in FIG. 1 and FIG. 22, and signal 208B corresponds to processed signal 106_B in FIG. 1 and FIG. 22.

FIG. 27 illustrates a second configuration after inserter 207A and after inserter 207B in FIG. 23 and FIG. 25.

In FIG. 27, components that operate the same as in FIG. 23, FIG. 25 share like reference marks. Accordingly, repeated description thereof will be omitted.

CDD unit 2601B receives inputs of signal 208B and control signal 200, implements a CDD process on signal 208B based on control signal 200, and outputs CDD processed signal 2602B.

Signal 208A in FIG. 27 corresponds to processed signal 106_A in FIG. 1 and FIG. 22, and CDD processed signal 2602B corresponds to processed signal 106_B in FIG. 1 and FIG. 22.

FIG. 28 illustrates a third configuration after inserter 207A and after inserter 207B in FIG. 23 and FIG. 25.

In FIG. 28, components that operate the same as in FIG. 23, FIG. 25, FIG. 26, and FIG. 27 share like reference marks. Accordingly, repeated description thereof will be omitted.

CDD processed signal 2602A in FIG. 27 corresponds to processed signal 106_A in FIG. 1 and FIG. 22, and CDD processed signal 2602B corresponds to processed signal 106_B in FIG. 1 and FIG. 22.

FIG. 29 illustrates a fourth configuration after inserter 207A and after inserter 207B in FIG. 23 and FIG. 25.

In FIG. 29, components that operate the same as in FIG. 23, FIG. 25 share like reference marks. Accordingly, repeated description thereof will be omitted.

Phase changer 209A receives inputs of signal 208A and control signal 200, and based on control signal 200, applies a phase change to signal 208A, and outputs phase-changed signal 210A. Note that the operations performed by phase changer 209A are the same as phase changer 209B in FIG. 2. Accordingly, repeated description thereof will be omitted.

Phase-changed signal 210A in FIG. 29 corresponds to processed signal 106_A in FIG. 1 and FIG. 22, and signal 208B corresponds to processed signal 106_B in FIG. 1 and FIG. 22.

FIG. 30 illustrates a fifth configuration after inserter 207A and after inserter 207B in FIG. 23 and FIG. 25.

In FIG. 30, components that operate the same as in FIG. 2, FIG. 23, FIG. 25, and FIG. 29 share like reference marks. Accordingly, repeated description thereof will be omitted.

Phase-changed signal 210A in FIG. 30 corresponds to processed signal 106_A in FIG. 1 and FIG. 22, and phase-changed signal 210B corresponds to processed signal 106_B in FIG. 1 and FIG. 22.

The configuration of the signal processor in the transmission device in FIG. 1 and FIG. 22 has a configuration described above, and even if various embodiments described in the present specification are combined with respect to the transmission device, these can be implemented in the same manner as in the embodiments, and can achieve the same advantageous effects described in the embodiments.

Next, operations performed by CDD units 2601A and 2601B, and phase changers 209A and 209B will be described.

First, the CDD process will be described.

FIG. 31 illustrates a configuration in the case that CDD (CSD) is used. Components that perform the same processes as CDD units 2601A and 2601B are 3102_1 through 3102_M in FIG. 31.

Cyclic delayer 3102_1 receives an input of modulated signal 3101, applies a cyclic delay, and outputs cyclic-delayed signal 3103_1. When cyclic-delayed signal 3103_1 is expressed as X1[n], X1[n] can be applied with the following equation.

[MATH. 63]

$$X1[n] = X[(n-\delta 1) \bmod N] \qquad \text{Equation (63)}$$

Note that, "mod" represents "modulo", and "y mod Z" means "remainder when y is divided by Z". Note that δ1 is the cyclic delay amount (δ1 is an integer), and x[n] is configured as N samples (N is an integer that is greater than or equal to 2). Accordingly, n is an integer that is greater than or equal to 0 and less than or equal to N−1.

Cyclic delayer 3102_M receives an input of modulated signal 3101, applies a cyclic delay, and outputs cyclic-delayed signal 3103_M. When cyclic-delayed signal 3103_M is expressed as XM[n], XM[n] can be applied with the following equation.

[MATH. 64]

$$XM[n] = X[(n-\delta M) \bmod N] \qquad \text{Equation (64)}$$

Note that δM is the cyclic delay amount (δM is an integer), and X[n] is configured as N samples (N is an integer that is greater than or equal to 2). Accordingly, n is an integer that is greater than or equal to 0 and less than or equal to N−1.

Cyclic delayer 3102_i (i is an integer that is greater than or equal to 1 and less than or equal to M (M is an integer that is greater than or equal to 1)) receives an input of modulated signal 3101, applies a cyclic delay, and outputs cyclic-delayed signal 3103_i. When cyclic-delayed signal 3103_i is expressed as Xi[n], Xi[n] can be applied with the following equation.

[MATH. 65]

$$Xi[n] = X[(n-\delta i) \bmod N] \qquad \text{Equation (65)}$$

Note that δi is the cyclic delay amount (δi is an integer), and X[n] is configured as N samples (N is an integer that is greater than or equal to 2). Accordingly, n is an integer that is greater than or equal to 0 and less than or equal to N−1.

Cyclic-delayed signal 3103_i is transmitted from antenna i. Accordingly, cyclic-delayed signal 3103_1, . . . , and cyclic-delayed signal 3103_M are each transmitted from different antennas.

This makes it possible to achieve the diversity effect via cyclic delay (in particular, reduce the adverse effects of delayed radio waves), and in the reception device, achieve an advantageous effect of improved data reception quality.

Next, the relationship between CDD units 2601A and 2601B and phase changers 209A and 209B will be described.

For example, consider a case in which CDD (CSD) is applied to OFDM.

Assume the carrier of the lowest frequency is "carrier 1", and subsequent carriers are "carrier 2", "carrier 3", "carrier 4", . . . .

For example, in phase changers 209A and 209B, CDD units 2601A and 2601B apply a cyclic delay amount τ. In such as case, phase change value Ω[i] in "carrier i" can be expressed as follows.

[MATH. 66]

$$\Omega[i] = e^{j \times \mu \times i} \quad \text{Equation (66)}$$

Note that μ is a value capable of being calculated from cyclic delay amount and/or the size of the fast Fourier transform (FFT).

When the baseband signal for "carrier i", time t before being applied with a phase change (before cyclic delay processing) is expressed as v'[i][t], the signal v[i][t] for "carrier i", time t after being applied with a phase change can be expressed as v[i][t]=Ω[i]×v'[i][t].

Accordingly, even if a cyclic delay amount is applied, phase changers 209A and 209B perform phase-change operations.

In phase changers 205A and 205B in, for example, FIG. 2, FIG. 23, FIG. 24, and FIG. 25, control for whether to apply a phase change or not may be performed via the input control signal 200. Accordingly, for example, control signal 200 may include control information regarding "apply or do not apply a phase change in phase changer 205A" and control information regarding "apply or do not apply a phase change in phase changer 205B", and based on this control information, control of whether to "apply or do not apply a phase change in phase changer 205A and phase changer 205B" may be performed.

Phase changer 205A receives an input of control signal 200, and when a phase change is not to be implemented, as indicated by control signal 200, phase changer 205A outputs input signal 204A as 206A.

Similarly, phase changer 205B receives an input of control signal 200, and when a phase change is not to be implemented, as indicated by control signal 200, phase changer 205B outputs input signal 204B as 206B.

Note that since the transmission device notifies the reception device, which is the communication partner, of the information in phase changers 205A and 205B related to "whether to implement a phase change or not", transmission is performed as part of a control information symbol.

Moreover, in FIG. 2, FIG. 24, FIG. 26, FIG. 27, FIG. 28, FIG. 29, and FIG. 30, in phase changers 209A and 209B and CDD units 2601A and 2601B, control of whether to implement a phase change or not based on the input control signal 200 may be performed, and control of whether to implement CSD processing or not based on the input control signal 200 may be performed. Accordingly, for example, control signal 200 may include control information related to performing a phase change or not in phase changer 205A, control information related to performing a phase change or not in phase changer 205B, control information related to performing CDD processing or not in CDD unit 2601A, and control information related to performing CDD processing or not in CDD unit 2601B, and based on this control information, may control whether to implement a phase change or not in phase changer 209A and phase changer 209B and whether to implement CDD processing or not in CDD unit 2601A and CDD unit 2601B.

Phase changer 209A receives an input of control signal 200, and when a phase change is not to be implemented, as indicated by control signal 200, phase changer 209A outputs input signal 208A as 210A.

Similarly, phase changer 209B receives an input of control signal 200, and when a phase change is not to be implemented, as indicated by control signal 200, phase changer 209B outputs input signal 208B as 210B.

CDD unit 2601A receives an input of control signal 200, and when CDD processing is not to be implemented, as indicated by control signal 200, CDD unit 2601A outputs input signal 208A as 2602A.

Similarly, CDD unit 2601B receives an input of control signal 200, and when CDD processing is not to be implemented, as indicated by control signal 200, CDD unit 2601B outputs input signal 208B as 2602B.

In the present disclosure, when there is a complex plane, for example, the phase unit such as an argument is "radian".

When the complex plane is used, display in a polar form can be made as display by polar coordinates of a complex number. When point (a, b) on the complex plane is associated with complex number z=a+jb (a and b are both real numbers, and j is a unit of an imaginary number), and when this point is expressed by [r, θ] in polar coordinates, a=r×cos θ and b=r×sin θ,

[MATH. 67]

$$r = \sqrt{a^2 + b^2} \quad \text{Equation (67)}$$

holds true, and r is an absolute value of z (r=|z|), and θ is an argument. Then, z=a+jb is expressed by r×ejθ.

(Supplemental Information 4)

Supplemental information regarding the description of FIG. 3 given in Embodiment 1 will be given.

Cases in which the modulation scheme used for mapped signal 201A (s1(i)) is QPSK (quadrature phase shift keying) and the modulation scheme used for mapped signal 201B (s2(i)) is 16 QAM (QAM: quadrature amplitude modulation) will be described.

Note that here, the average (transmission) power of mapped signal 201A and the average (transmission) power of mapped signal 201B are the same.

In the description of FIG. 3 in Embodiment 1, operations performed when phase changer 205B is provided are described, but when phase changer 205B does not implement a phase change, or when phase changer 205B is omitted, there is a method that can improve data reception quality. This will be discussed below.

Weighting synthesized signal 204A (Z1(i)) and the signal when a phase change is not implemented are z2(i) (this corresponds to 204B; however, 204B and 206B are the same signal). Here, based on FIG. 4, z2(i), i.e., weighting synthesized signal 204A (Z1(i)) and the signal when a phase change is not implemented, may be expressed by any of Equations (68) through (75). Note that F, u, v, β, θ, and the like are as described in Embodiment 1.

[MATH. 68]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix} \begin{pmatrix} \sqrt{\frac{2}{3}} & 0 \\ 0 & \sqrt{\frac{4}{3}} \end{pmatrix}$$

$$\begin{pmatrix} s1(i) \\ s2(i) \end{pmatrix}$$

Equation (68)

[MATH. 69]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix}$$

$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (69)

[MATH. 70]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \cos\frac{\pi}{4} & -\sin\frac{\pi}{4} \\ \sin\frac{\pi}{4} & \cos\frac{\pi}{4} \end{pmatrix} \begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

Equation (70)

[MATH. 71]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \cos\frac{\pi}{4} & -\sin\frac{\pi}{4} \\ \sin\frac{\pi}{4} & \cos\frac{\pi}{4} \end{pmatrix}$$

$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (71)

[MATH. 72]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \beta \times \cos\theta & \beta \times \sin\theta \\ \beta \times \sin\theta & -\beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix} \begin{pmatrix} \sqrt{\frac{2}{3}} & 0 \\ 0 & \sqrt{\frac{4}{3}} \end{pmatrix}$$

$$\begin{pmatrix} s1(i) \\ s2(i) \end{pmatrix}$$

Equation (72)

[MATH. 73]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \beta \times \cos\theta & \beta \times \sin\theta \\ \beta \times \sin\theta & -\beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix}$$

$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (73)

[MATH. 74]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \cos\frac{\pi}{4} & \sin\frac{\pi}{4} \\ \sin\frac{\pi}{4} & -\cos\frac{\pi}{4} \end{pmatrix} \begin{pmatrix} \sqrt{\frac{2}{3}} & 0 \\ 0 & \sqrt{\frac{4}{3}} \end{pmatrix}$$

$$\begin{pmatrix} s1(i) \\ s2(i) \end{pmatrix}$$

Equation (74)

[MATH. 75]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (75)

Note that the modulation scheme used for mapped signal 201A (s1(i)) may be 16 QAM, and the modulation scheme used for mapped signal 201B (s2(i)) may be QPSK.

Note that here, the average (transmission) power of mapped signal 201A and the average (transmission) power of mapped signal 201B are the same.

Here, based on FIG. 4, weighting synthesized signal 204A (z1(i)) and phase-changed signal 206B (z2(i)) in FIG. 3 can be expressed with any of Equations (76) through (83). Note that F, u, v, $\beta$, $\theta$, and the like are as described in Embodiment 1.

[MATH. 76]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix}$$

$$= \begin{pmatrix} \sqrt{\frac{4}{3}} & 0 \\ 0 & \sqrt{\frac{2}{3}} \end{pmatrix} \begin{pmatrix} s1(i) \\ s2(i) \end{pmatrix}$$

Equation (76)

[MATH. 77]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix}$$

$$\begin{pmatrix} \alpha \times \sqrt{\frac{4}{3}} & 0 \\ 0 & \alpha \times \sqrt{\frac{2}{3}} \end{pmatrix} \begin{pmatrix} s1(i) \\ s2(i) \end{pmatrix}$$

Equation (77)

[MATH. 78]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix}$$

$$\begin{pmatrix} \sqrt{\frac{4}{3}} & 0 \\ 0 & \sqrt{\frac{2}{3}} \end{pmatrix} \begin{pmatrix} s1(i) \\ s2(i) \end{pmatrix}$$

Equation (78)

-continued

[MATH. 79]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix}$$

$$\begin{pmatrix} \alpha \times \sqrt{\frac{4}{3}} & 0 \\ 0 & \alpha \times \sqrt{\frac{2}{3}} \end{pmatrix} \begin{pmatrix} s1(i) \\ s2(i) \end{pmatrix}$$

Equation (79)

[MATH. 80]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$\begin{pmatrix} 1 & 0 \\ 0 & y(i) \end{pmatrix}$$

$$\begin{pmatrix} \beta \times \cos\theta & \beta \times \sin\theta \\ \beta \times \sin\theta & -\beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix}$$

$$\begin{pmatrix} \sqrt{\frac{4}{3}} & 0 \\ 0 & \sqrt{\frac{2}{3}} \end{pmatrix} \begin{pmatrix} s1(i) \\ s2(i) \end{pmatrix}$$

Equation (80)

[MATH. 81]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \beta \times \cos\theta & \beta \times \sin\theta \\ \beta \times \sin\theta & -\beta \times \cos\theta \end{pmatrix}$$

$$\begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix}$$

$$\begin{pmatrix} \alpha \times \sqrt{\frac{4}{3}} & 0 \\ 0 & \alpha \times \sqrt{\frac{2}{3}} \end{pmatrix} \begin{pmatrix} s1(i) \\ s2(i) \end{pmatrix}$$

Equation (81)

[MATH. 82]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \sqrt{\frac{4}{3}} & 0 \\ 0 & \sqrt{\frac{2}{3}} \end{pmatrix} \begin{pmatrix} s1(i) \\ s2(i) \end{pmatrix}$$

Equation (82)

-continued

[MATH. 83]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j\times\delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix}$$
$$\begin{pmatrix} \alpha\times\sqrt{\frac{4}{3}} & 0 \\ 0 & \alpha\times\sqrt{\frac{2}{3}} \end{pmatrix} \begin{pmatrix} s1(i) \\ s2(i) \end{pmatrix}$$

Equation (83)

The modulation scheme used for mapped signal 201A (s1(i)) may be 16 QAM, and the modulation scheme used for mapped signal 201B (s2(i)) may be 64 QAM.

Note that here, the average (transmission) power of mapped signal 201A and the average (transmission) power of mapped signal 201B are the same.

Accordingly, weighting synthesized signal 204A (z1(i)) and phase-changed signal 206B (z2(i)) in FIG. 3 can be expressed with any of Equations (84) through (91). Note that F, u, v, β, θ, and the like are as described in Embodiment 1.

[MATH. 84]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta\times\cos\theta & -\beta\times\sin\theta \\ \beta\times\sin\theta & \beta\times\cos\theta \end{pmatrix}$$
$$\begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j\times\delta(i)} \end{pmatrix} \begin{pmatrix} \beta\times\cos\frac{\pi}{4} & -\beta\times\sin\frac{\pi}{4} \\ \beta\times\sin\frac{\pi}{4} & \beta\times\cos\frac{\pi}{4} \end{pmatrix}$$
$$\begin{pmatrix} \sqrt{\frac{2}{5}} & 0 \\ 0 & \sqrt{\frac{3}{5}} \end{pmatrix} \begin{pmatrix} s1(i) \\ s2(i) \end{pmatrix}$$

Equation (84)

[MATH. 85]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta\times\cos\theta & -\beta\times\sin\theta \\ \beta\times\sin\theta & \beta\times\cos\theta \end{pmatrix}$$
$$\begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j\times\delta(i)} \end{pmatrix} \begin{pmatrix} \beta\times\cos\frac{\pi}{4} & -\beta\times\sin\frac{\pi}{4} \\ \beta\times\sin\frac{\pi}{4} & \beta\times\cos\frac{\pi}{4} \end{pmatrix}$$
$$\begin{pmatrix} \alpha\times\sqrt{\frac{2}{5}} & 0 \\ 0 & \alpha\times\sqrt{\frac{3}{5}} \end{pmatrix} \begin{pmatrix} s1(i) \\ s2(i) \end{pmatrix}$$

Equation (85)

[MATH. 86]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j\times\delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix}$$
$$\begin{pmatrix} \sqrt{\frac{2}{5}} & 0 \\ 0 & \sqrt{\frac{3}{5}} \end{pmatrix} \begin{pmatrix} s1(i) \\ s2(i) \end{pmatrix}$$

Equation (86)

[MATH. 87]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j\times\delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix}$$
$$\begin{pmatrix} \alpha\times\sqrt{\frac{2}{5}} & 0 \\ 0 & \alpha\times\sqrt{\frac{3}{5}} \end{pmatrix} \begin{pmatrix} s1(i) \\ s2(i) \end{pmatrix}$$

Equation (87)

[MATH. 88]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix}$$
$$\begin{pmatrix} \beta\times\cos\theta & \beta\times\sin\theta \\ \beta\times\sin\theta & -\beta\times\cos\theta \end{pmatrix} \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j\times\delta(i)} \end{pmatrix} \begin{pmatrix} \beta\times\cos\frac{\pi}{4} & \beta\times\sin\frac{\pi}{4} \\ \beta\times\sin\frac{\pi}{4} & -\beta\times\cos\frac{\pi}{4} \end{pmatrix}$$
$$\begin{pmatrix} \sqrt{\frac{2}{5}} & 0 \\ 0 & \sqrt{\frac{3}{5}} \end{pmatrix} \begin{pmatrix} s1(i) \\ s2(i) \end{pmatrix}$$

Equation (88)

[MATH. 89]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & y(i) \end{pmatrix} \begin{pmatrix} \beta\times\cos\theta & \beta\times\sin\theta \\ \beta\times\sin\theta & -\beta\times\cos\theta \end{pmatrix}$$
$$\begin{pmatrix} u & 0 \\ 0 & v \end{pmatrix} \begin{pmatrix} s1(i) \\ s2(i) \end{pmatrix}$$
$$= \begin{pmatrix} 1 & 0 \\ 0 & e^{j\times\delta(i)} \end{pmatrix} \begin{pmatrix} \beta\times\cos\frac{\pi}{4} & \beta\times\sin\frac{\pi}{4} \\ \beta\times\sin\frac{\pi}{4} & -\beta\times\cos\frac{\pi}{4} \end{pmatrix}$$
$$\begin{pmatrix} \alpha\times\sqrt{\frac{2}{5}} & 0 \\ 0 & \alpha\times\sqrt{\frac{3}{5}} \end{pmatrix} \begin{pmatrix} s1(i) \\ s2(i) \end{pmatrix}$$

Equation (89)

-continued

[MATH. 90]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \sqrt{\frac{2}{5}} & 0 \\ 0 & \sqrt{\frac{3}{5}} \end{pmatrix} \begin{pmatrix} s1(i) \\ s2(i) \end{pmatrix}$$

Equation (90)

[MATH. 91]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \alpha\times\sqrt{\frac{2}{5}} & 0 \\ 0 & \alpha\times\sqrt{\frac{3}{5}} \end{pmatrix} \begin{pmatrix} s1(i) \\ s2(i) \end{pmatrix}$$

Equation (91)

Figure 32:
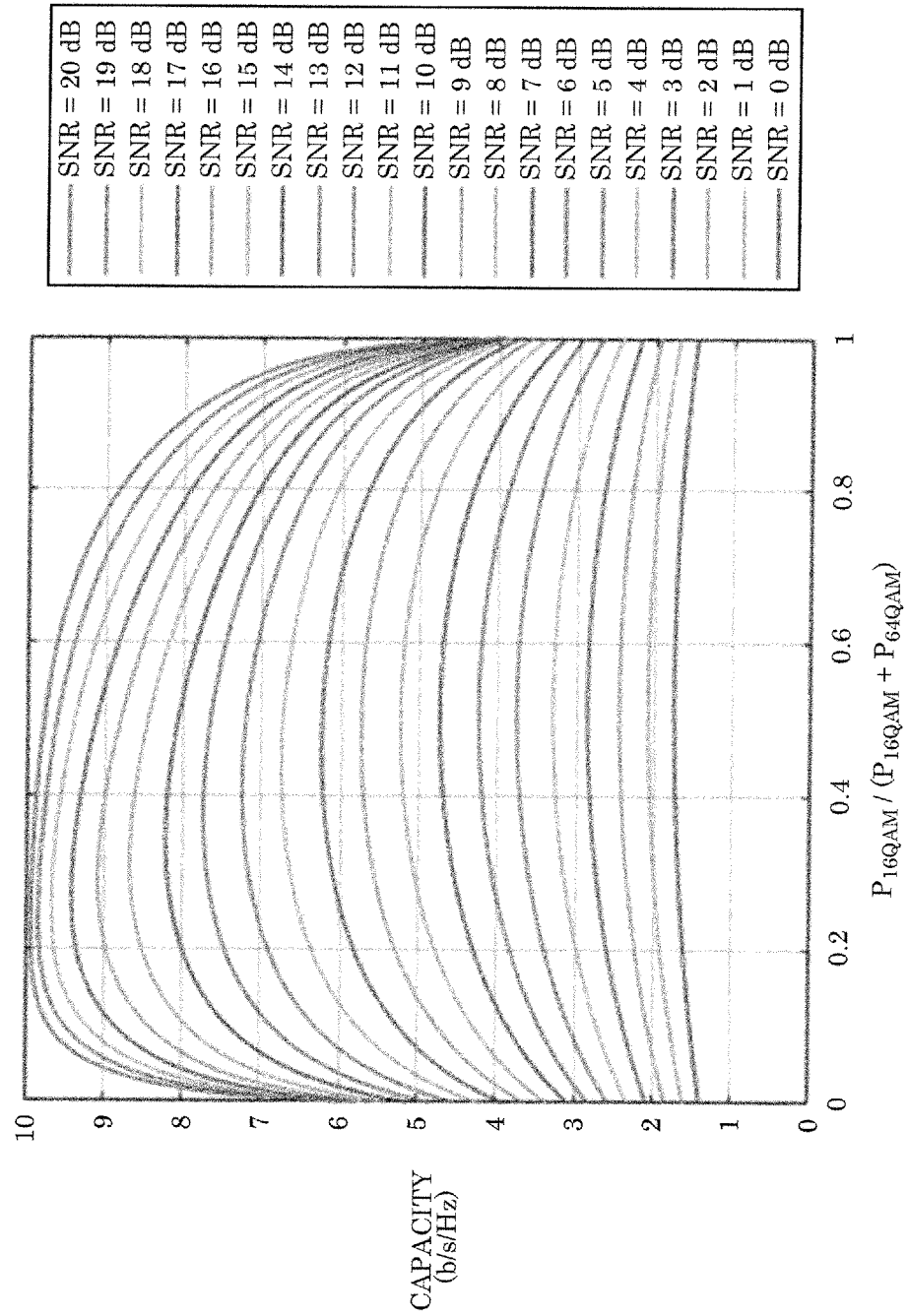
FIG. 32 illustrates, per SNR, the relationship between (i) the average power ratio for 16 QAM relative to the sum of the average power for 16 QAM and the average power for 64 QAM and (ii) capacity.

FIG. 32 illustrates capacities in each of a plurality of SNRs (signal-to-noise power ratios) on a chart where $P_{16\ QAM}/(P_{16\ QAM}+P_{64\ QAM})$ is represented on the horizontal axis and capacity is represented on the vertical axis. Here, P16 QAM indicates the average (transmission) power of 16 QAM, P64 QAM indicates the average (transmission) power of 64 QAM (note that the channel model in the chart is a AWGN (additive white Gaussian noise) environment). As can be seen from the results, by using the settings illustrated in Equation (84) through Equation (91), the reception device can achieve an advantageous effect of good data reception quality. Note that in FIG. 32, the 21 line graphs indicating relationships between power ratio and capacity correspond to, in ascending order of capacity, SNR=0 dB, 1 dB, 2 dB . . . 20 dB.

The modulation scheme used for mapped signal 201A (s1(i)) may be 64 QAM, and the modulation scheme used for mapped signal 201B (s2(i)) may be 16 QAM.

Note that here, the average (transmission) power of mapped signal 201A and the average (transmission) power of mapped signal 201B are the same.

Accordingly, based on FIG. 32, weighting synthesized signal 204A (z1(i)) and phase-changed signal 206B (z2(i)) in FIG. 3 can be expressed with any of Equations (92) through (99). Note that F, u, v, β, θ, and the like are as described in Embodiment 1.

[MATH. 92]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \beta\times\cos\theta & -\beta\times\sin\theta \\ \beta\times\sin\theta & \beta\times\cos\theta \end{pmatrix}$$

$$\begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} \beta\times\cos\frac{\pi}{4} & -\beta\times\sin\frac{\pi}{4} \\ \beta\times\sin\frac{\pi}{4} & \beta\times\cos\frac{\pi}{4} \end{pmatrix}$$

$$\begin{pmatrix} \sqrt{\frac{3}{5}} & 0 \\ 0 & \sqrt{\frac{2}{5}} \end{pmatrix} \begin{pmatrix} s1(i) \\ s2(i) \end{pmatrix}$$

Equation (92)

[MATH. 93]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \beta\times\cos\theta & -\beta\times\sin\theta \\ \beta\times\sin\theta & \beta\times\cos\theta \end{pmatrix}$$

$$\begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} \beta\times\cos\frac{\pi}{4} & -\beta\times\sin\frac{\pi}{4} \\ \beta\times\sin\frac{\pi}{4} & \beta\times\cos\frac{\pi}{4} \end{pmatrix}$$

$$\begin{pmatrix} \alpha\times\sqrt{\frac{3}{5}} & 0 \\ 0 & \alpha\times\sqrt{\frac{2}{5}} \end{pmatrix} \begin{pmatrix} s1(i) \\ s2(i) \end{pmatrix}$$

Equation (93)

[MATH. 94]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix}$$

$$\begin{pmatrix} \sqrt{\frac{3}{5}} & 0 \\ 0 & \sqrt{\frac{2}{5}} \end{pmatrix} \begin{pmatrix} s1(i) \\ s2(i) \end{pmatrix}$$

Equation (94)

[MATH. 95]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j\times\delta(i)} \end{pmatrix} \begin{pmatrix} \cos\frac{\pi}{4} & -\sin\frac{\pi}{4} \\ \sin\frac{\pi}{4} & \cos\frac{\pi}{4} \end{pmatrix}$$

$$\begin{pmatrix} \alpha\times\sqrt{\frac{3}{5}} & 0 \\ 0 & \alpha\times\sqrt{\frac{2}{5}} \end{pmatrix} \begin{pmatrix} s1(i) \\ s2(i) \end{pmatrix}$$

Equation (95)

[MATH. 96]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix}$$

$$\begin{pmatrix} \beta \times \cos\theta & \beta \times \sin\theta \\ \beta \times \sin\theta & -\beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix}$$

$$\begin{pmatrix} \sqrt{\frac{3}{5}} & 0 \\ 0 & \sqrt{\frac{2}{5}} \end{pmatrix} \begin{pmatrix} s1(i) \\ s2(i) \end{pmatrix}$$

Equation (96)

[MATH. 97]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \beta \times \cos\theta & \beta \times \sin\theta \\ \beta \times \sin\theta & -\beta \times \cos\theta \end{pmatrix}$$

$$\begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \beta \times \cos\frac{\pi}{4} & \beta \times \sin\frac{\pi}{4} \\ \beta \times \sin\frac{\pi}{4} & -\beta \times \cos\frac{\pi}{4} \end{pmatrix}$$

$$\begin{pmatrix} \alpha \times \sqrt{\frac{3}{5}} & 0 \\ 0 & \alpha \times \sqrt{\frac{2}{5}} \end{pmatrix} \begin{pmatrix} s1(i) \\ s2(i) \end{pmatrix}$$

Equation (97)

[MATH. 98]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \sqrt{\frac{3}{5}} & 0 \\ 0 & \sqrt{\frac{2}{5}} \end{pmatrix} \begin{pmatrix} s1(i) \\ s2(i) \end{pmatrix}$$

Equation (98)

[MATH. 99]

$$\begin{pmatrix} z1(i) \\ z2(i) \end{pmatrix} = \begin{pmatrix} 1 & 0 \\ 0 & y(i) \end{pmatrix} F \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & y(i) \end{pmatrix} \begin{pmatrix} \cos\theta & \sin\theta \\ \sin\theta & -\cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} 1 & 0 \\ 0 & e^{j \times \delta(i)} \end{pmatrix} \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \alpha \times \sqrt{\frac{3}{5}} & 0 \\ 0 & \alpha \times \sqrt{\frac{2}{5}} \end{pmatrix} \begin{pmatrix} s1(i) \\ s2(i) \end{pmatrix}$$

Equation (99)

When the modulation scheme used for mapped signal 201A (s1(i)) is 16 QAM and when the modulation scheme used for mapped signal 201B (s2(i)) is 64 QAM, an example of operations performed when phase changer 205B is provided is given in the description of FIG. 3 in Embodiment 1, but when phase changer 205B does not implement a phase change, or when phase changer 205B is omitted, there is a method that can improve data reception quality. This will be discussed below.

Weighting synthesized signal 204A (Z1(i)) and the signal when a phase change is not implemented are z2(i) (this corresponds to 204B; however, 204B and 206B are the same signal). Here, based on FIG. 32, z2(i), i.e., weighting synthesized signal 204A (Z1(i)) and the signal when a phase change is not implemented, may be expressed by any of Equations (100) through (107). Note that F, u, v, β, θ, and the like are as described in Embodiment 1.

Note that here, the average (transmission) power of mapped signal 201A and the average (transmission) power of mapped signal 201B are the same.

[MATH. 100]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix} \begin{pmatrix} \sqrt{\frac{2}{3}} & 0 \\ 0 & \sqrt{\frac{4}{3}} \end{pmatrix}$$

$$\begin{pmatrix} s1(i) \\ s2(i) \end{pmatrix}$$

Equation (100)

[MATH. 101]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \beta \times \cos\theta & -\beta \times \sin\theta \\ \beta \times \sin\theta & \beta \times \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \beta \times \cos\frac{\pi}{4} & -\beta \times \sin\frac{\pi}{4} \\ \beta \times \sin\frac{\pi}{4} & \beta \times \cos\frac{\pi}{4} \end{pmatrix}$$

$$\begin{pmatrix} \alpha \times \sqrt{\frac{2}{3}} & 0 \\ 0 & \alpha \times \sqrt{\frac{4}{3}} \end{pmatrix} \begin{pmatrix} s1(i) \\ s2(i) \end{pmatrix}$$

Equation (101)

[MATH. 102]

$$\begin{pmatrix} z1(i) \\ z2(i) \end{pmatrix} = F \begin{pmatrix} u & 0 \\ 0 & v \end{pmatrix} \begin{pmatrix} s1(i) \\ s2(i) \end{pmatrix}$$

$$= \begin{pmatrix} \cos\theta & -\sin\theta \\ \sin\theta & \cos\theta \end{pmatrix} \begin{pmatrix} u & 0 \\ 0 & v \end{pmatrix} \begin{pmatrix} s1(i) \\ s2(i) \end{pmatrix}$$

$$= \begin{pmatrix} \cos\frac{\pi}{4} & -\sin\frac{\pi}{4} \\ \sin\frac{\pi}{4} & \cos\frac{\pi}{4} \end{pmatrix} \begin{pmatrix} \sqrt{\frac{2}{3}} & 0 \\ 0 & \sqrt{\frac{4}{3}} \end{pmatrix} \begin{pmatrix} s1(i) \\ s2(i) \end{pmatrix}$$

Equation (102)

-continued

[MATH. 103]

$$\begin{pmatrix} z1(i) \\ z2(i) \end{pmatrix} = F\begin{pmatrix} u & 0 \\ 0 & v \end{pmatrix}\begin{pmatrix} s1(i) \\ s2(i) \end{pmatrix}$$

$$= \begin{pmatrix} \cos\theta & -\sin\theta \\ \sin\theta & \cos\theta \end{pmatrix}\begin{pmatrix} u & 0 \\ 0 & v \end{pmatrix}\begin{pmatrix} s1(i) \\ s2(i) \end{pmatrix}$$

$$= \begin{pmatrix} \cos\frac{\pi}{4} & -\sin\frac{\pi}{4} \\ \sin\frac{\pi}{4} & \cos\frac{\pi}{4} \end{pmatrix}$$

$$\begin{pmatrix} \alpha \times \sqrt{\frac{2}{3}} & 0 \\ 0 & \alpha \times \sqrt{\frac{4}{3}} \end{pmatrix}\begin{pmatrix} s1(i) \\ s2(i) \end{pmatrix}$$

Equation (103)

[MATH. 104]

$$\begin{pmatrix} z1(i) \\ z2(i) \end{pmatrix} = F\begin{pmatrix} u & 0 \\ 0 & v \end{pmatrix}\begin{pmatrix} s1(i) \\ s2(i) \end{pmatrix}$$

$$= \begin{pmatrix} \beta\times\cos\theta & \beta\times\sin\theta \\ \beta\times\sin\theta & -\beta\times\cos\theta \end{pmatrix}\begin{pmatrix} u & 0 \\ 0 & v \end{pmatrix}\begin{pmatrix} s1(i) \\ s2(i) \end{pmatrix}$$

$$= \begin{pmatrix} \beta\times\cos\frac{\pi}{4} & \beta\times\sin\frac{\pi}{4} \\ \beta\times\sin\frac{\pi}{4} & -\beta\times\cos\frac{\pi}{4} \end{pmatrix}\begin{pmatrix} \sqrt{\frac{2}{3}} & 0 \\ 0 & \sqrt{\frac{4}{3}} \end{pmatrix}$$

$$\begin{pmatrix} s1(i) \\ s2(i) \end{pmatrix}$$

Equation (104)

[MATH. 105]

$$\begin{pmatrix} z1(i) \\ z2(i) \end{pmatrix} = F\begin{pmatrix} u & 0 \\ 0 & v \end{pmatrix}\begin{pmatrix} s1(i) \\ s2(i) \end{pmatrix}$$

$$= \begin{pmatrix} \beta\times\cos\theta & \beta\times\sin\theta \\ \beta\times\sin\theta & -\beta\times\cos\theta \end{pmatrix}\begin{pmatrix} u & 0 \\ 0 & v \end{pmatrix}\begin{pmatrix} s1(i) \\ s2(i) \end{pmatrix}$$

$$= \begin{pmatrix} \beta\times\cos\frac{\pi}{4} & \beta\times\sin\frac{\pi}{4} \\ \beta\times\sin\frac{\pi}{4} & -\beta\times\cos\frac{\pi}{4} \end{pmatrix}$$

$$\begin{pmatrix} \alpha\times\sqrt{\frac{2}{3}} & 0 \\ 0 & \alpha\times\sqrt{\frac{4}{3}} \end{pmatrix}\begin{pmatrix} s1(i) \\ s2(i) \end{pmatrix}$$

Equation (105)

[MATH. 106]

$$\begin{pmatrix} z1(i) \\ z2(i) \end{pmatrix} = F\begin{pmatrix} u & 0 \\ 0 & v \end{pmatrix}\begin{pmatrix} s1(i) \\ s2(i) \end{pmatrix}$$

$$= \begin{pmatrix} \cos\theta & \sin\theta \\ \sin\theta & -\cos\theta \end{pmatrix}\begin{pmatrix} u & 0 \\ 0 & v \end{pmatrix}\begin{pmatrix} s1(i) \\ s2(i) \end{pmatrix}$$

$$= \begin{pmatrix} \cos\frac{\pi}{4} & \sin\frac{\pi}{4} \\ \sin\frac{\pi}{4} & -\cos\frac{\pi}{4} \end{pmatrix}\begin{pmatrix} \sqrt{\frac{2}{3}} & 0 \\ 0 & \sqrt{\frac{4}{3}} \end{pmatrix}$$

$$\begin{pmatrix} s1(i) \\ s2(i) \end{pmatrix}$$

Equation (106)

[MATH. 107]

$$\begin{pmatrix} z1(i) \\ z2(i) \end{pmatrix} = F\begin{pmatrix} u & 0 \\ 0 & v \end{pmatrix}\begin{pmatrix} s1(i) \\ s2(i) \end{pmatrix}$$

$$= \begin{pmatrix} \cos\theta & \sin\theta \\ \sin\theta & -\cos\theta \end{pmatrix}\begin{pmatrix} u & 0 \\ 0 & v \end{pmatrix}\begin{pmatrix} s1(i) \\ s2(i) \end{pmatrix}$$

$$= \begin{pmatrix} \cos\frac{\pi}{4} & \sin\frac{\pi}{4} \\ \sin\frac{\pi}{4} & -\cos\frac{\pi}{4} \end{pmatrix}$$

$$\begin{pmatrix} \alpha\times\sqrt{\frac{2}{3}} & 0 \\ 0 & \alpha\times\sqrt{\frac{4}{3}} \end{pmatrix}\begin{pmatrix} s1(i) \\ s2(i) \end{pmatrix}$$

Equation (107)

Note that in Equation (68) through Equation (107), $\alpha$ and $\beta$ may be real numbers and, alternatively, may be imaginary numbers.

In Equation (68) through Equation (107), $\theta$ is set to $\pi/4$ radians (45 degrees). The average (transmission) power of coefficient multiplied signal 302A and the average (transmission) power of coefficient multiplied signal 302B are different, but by setting $\theta$ to $\pi/4$ radians (45 degrees), the average (transmission) power of weighting synthesized signal 204A (z1(i)) and the average (transmission) power of signal 206B (204B) (z2(i)) can be made to be the same, so when the transmission rules stipulate a condition that the average transmission power of each modulated signal transmitted from the antennas be the same, it is necessary to set $\theta$ to $\pi/4$ radians (45 degrees). Note that, here, $\theta$ is set to $\pi/4$ radians (45 degrees), but $\theta$ may be set to any one of: $\pi/4$ radians (45 degrees); $(3\times\pi)/4$ radians (135 degrees); $(5\times\pi)/4$ radians (225 degrees); and $(7\times\pi)/4$ radians (315 degrees).

Moreover, the coefficients u, v are set as illustrated in Equation (68) through Equation (107).

Note that symbols (for example, z1(i), z2(i)) are described as being generated using the methods exemplified in FIG. 1, FIG. 2, FIG. 3, and Equation (1) through Equation (45). In such cases, the generated symbols may be arranged along the time axis. When a multi-carrier scheme such as OFDM (orthogonal frequency division multiplexing) is used, the generated symbols may be arranged along the frequency axis and may be arranged along the time and frequency axes. Moreover, the generated symbols may be interleaved (i.e., rearranged) and arranged along the time axis, along the frequency axis, and along the time and frequency axes. However, z1(i) and z2(i), which are both symbol number i, are transmitted from the transmission device at the same time and using the same frequency (same frequency band).

Moreover, in FIG. 3, phase changer 205A may be provided between weighting synthesizer 203 and inserter 207A. Accordingly, a phase change may be applied to weighting synthesized signal 204A.

Moreover, phase changer 209A may be disposed after inserter 207A. Moreover, phase changer 209B may be omitted.

By implementing the above, since weight synthesis and power change is performed so as to increase capacity, an advantageous effect whereby data reception quality by the reception device, which is the communication partner, can be improved. Note that when the modulation schemes used for s1(i) and s2(i) are changed not in association with a frame or time, more suitable power values u, v are set.

Note that in the above example, when the modulation scheme used for mapped signal 201A (s1(i)) is 16 QAM and the modulation scheme used for mapped signal 201B (s2(i))

is 64 QAM, weighting synthesized signal 204A (z1(i)) and weighting synthesized signal 206B (z2(i)) are described as being expressible by any of Equations (84) through (91) and (100) through (107), but via the encoding method for the error correction code used in the generation of data included in mapped signal 201A (s1(i)) and mapped signal 201B (s2(i)), the values for u and v may be changed in Equations (84) through (91) and (100) through (107). For example, assume that there is a first error correction code and a second error correction code, where the code length (block length) of the first error correction code is A (A is an integer that is greater than or equal to 2), and the code length (block length) of the second error correction code is B (B is an integer that is greater than or equal to 2). Here, A≠B.

Here, when the first error correction code is used, the value of u is ua and the value of v is va in Equations (84) through (91) and (100) through (107), and when the second error correction code is used, the value of u is ub and the value of v is vb in Equations (84) through (91) and (100) through (107). Here, Equation (108) holds true.

[MATH. 108]

$$\frac{u_a}{u_a + v_a} \neq \frac{u_b}{u_b + v_b} \qquad \text{Equation (108)}$$

In another example, assume there is a third error correction code and a fourth error correction code, where the encode rate of the third error correction code is C (C is a real number greater than 0 and less than 1) and the encode rate of the fourth error correction code is D (D is a real number greater than 0 and less than 1). Here, C≠D. Here, when the third error correction code is used, the value of u is uc and the value of v is vc in Equations (84) through (91) and (100) through (107), and when the fourth error correction code is used, the value of u is ud and the value of v is vd in Equations (84) through (91) and (100) through (107). Here, Equation (109) holds true.

[MATH. 109]

$$\frac{u_c}{u_c + v_c} \neq \frac{u_d}{u_d + v_d} \qquad \text{Equation (109)}$$

In yet another example, assume there is a fifth error correction code in which the error correction encoding method is E and a sixth error correction code in which the error correction encoding method is F. Note that the error correction encoding method E and the error correction encoding method F are different methods.

Here, when the fifth error correction code is used, the value of u is ue and the value of v is ve in Equations (84) through (91) and (100) through (107), and when the sixth error correction code is used, the value of u is of and the value of v is of in Equations (84) through (91) and (100) through (107). Here, Equation (110) holds true.

[MATH. 110]

$$\frac{u_e}{u_e + v_e} \neq \frac{u_f}{u_f + v_f} \qquad \text{Equation (110)}$$

Note that in the above example, when the modulation scheme used for mapped signal 201A (s1(i)) is 64 QAM and the modulation scheme used for mapped signal 201B (s2(i)) is 16 QAM, weighting synthesized signal 204A (z1(i)) and weighting synthesized signal 206B (z2(i)) are described as being expressible by any of Equations (92) through (99), but via the encoding method for the error correction code used in the generation of data included in mapped signal 201A (s1(i)) and mapped signal 201B (s2(i)), the values for u and v may be changed in Equations (92) through (99).

For example, assume that there is a first error correction code and a second error correction code, where the code length (block length) of the first error correction code is G (G is an integer that is greater than or equal to 2), and the code length (block length) of the second error correction code is H (H is an integer that is greater than or equal to 2). Here, G≠H.

Here, when the first error correction code is used, the value of u is ug and the value of v is vg in Equations (92) through (99), and when the second error correction code is used, the value of u is uh and the value of v is vh in Equations (92) through (99). Here, Equation (111) holds true.

[MATH. 111]

$$\frac{u_g}{u_g + v_g} \neq \frac{u_h}{u_h + v_h} \qquad \text{Equation (111)}$$

In another example, assume there is a third error correction code and a fourth error correction code, where the encode rate of the third error correction code is I (I is a real number greater than 0 and less than 1) and the encode rate of the fourth error correction code is J (J is a real number greater than 0 and less than 1). Note that I≠J. Here, when the third error correction code is used, the value of u is ui and the value of v is vi in Equations (92) through (99), and when the fourth error correction code is used, the value of u is uj and the value of v is vj in Equations (92) through (99). Here, Equation (112) holds true.

[MATH. 112]

$$\frac{u_i}{u_i + v_i} \neq \frac{u_j}{u_j + v_j} \qquad \text{Equation (112)}$$

In yet another example, assume there is a fifth error correction code in which the error correction encoding method is K and a sixth error correction code in which the error correction encoding method is M. Note that the error correction encoding method K and the error correction encoding method M are different methods.

Here, when the fifth error correction code is used, the value of u is uk and the value of v is vk in Equations (92) through (99), and when the sixth error correction code is used, the value of u is um and the value of v is vm in Equations (92) through (99). Here, Equation (113) holds true.

[MATH. 113]

$$\frac{u_k}{u_k + v_k} \neq \frac{u_m}{u_m + v_m} \quad \text{Equation (113)}$$

Note that in the above example, when the modulation scheme used for mapped signal 201A (s1(i)) is 16 QAM and the modulation scheme used for mapped signal 201B (s2(i)) is 64 QAM, weighting synthesized signal 204A (z1(i) and weighting synthesized signal 206B (z2(i)) are described as being expressible by any of Equations (84) through (91) and (100) through (107), but via the encoding method for the error correction code used in the generation of data included in mapped signal 201A (s1(i)) and mapped signal 201B (s2(i)), the values for u and v may be changed in Equations (84) through (91) and (100) through (107).

For example, as a first case, error correction encoding method N is used in mapped signal 201A (s1(i)), and error correction encoding method P is used in mapped signal 201B (s2(i)). As a second case, error correction encoding method Q is used in mapped signal 201A (s1(i)), and error correction encoding method R is used in mapped signal 201B (s2(i)).

Note that error correction encoding method N and error correction encoding method Q are different methods, and error correction encoding method P and error correction encoding method R are different methods holds true.

Here, in the first case, the value of u is un and the value of v is vn in Equations (84) through (91) and Equations (100) through (107), and in the second case, the value of u is up and the value of v is vp in Equations (84) through (91) and Equations (100) through (107). Here, Equation (114) holds true.

[MATH. 114]

$$\frac{u_n}{u_n + v_n} \neq \frac{u_p}{u_p + v_p} \quad \text{Equation (114)}$$

Note that in the above example, when the modulation scheme used for mapped signal 201A (s1(i)) is 64 QAM and the modulation scheme used for mapped signal 201B (s2(i)) is 16 QAM, weighting synthesized signal 204A (z1(i) and weighting synthesized signal 206B (z2(i)) are described as being expressible by any of Equations (92) through (99), but via the encoding method for the error correction code used in the generation of data included in mapped signal 201A (s1(i)) and mapped signal 201B (s2(i)), the values for u and v may be changed in Equations (92) through (99).

For example, as a third case, error correction encoding method S is used in mapped signal 201A (s1(i)), and error correction encoding method T is used in mapped signal 201B (s2(i)). As a fourth case, error correction encoding method W is used in mapped signal 201A (s1(i)), and error correction encoding method X is used in mapped signal 201B (s2(i)).

Note that error correction encoding method S and error correction encoding method W are different methods, and error correction encoding method T and error correction encoding method X are different methods holds true.

Here, in the first case, the value of u is us and the value of v is vs in Equations (92) through (99), and in the second case, the value of u is uw and the value of v is vw in Equations (92) through (99). Here, Equation (115) holds true.

[MATH. 115]

$$\frac{u_s}{u_s + v_s} \neq \frac{u_w}{u_w + v_w} \quad \text{Equation (115)}$$

Note that in the above description, when the Y-th error correction encoding method and the Z-th error correction encoding method are different, conceivable examples include the error correction encoding method themselves being different, the code lengths (block lengths) being different, and the encode rates being different.

In the above description, examples including the conditions "when the modulation scheme used for mapped signal 201A (s1(i)) is 16 QAM, and the modulation scheme used for mapped signal 201B (s2(i)) is 64 QAM" and "when the modulation scheme used for mapped signal 201A (s1(i)) is 64 QAM, and the modulation scheme used for mapped signal 201B (s2(i)) is 16 QAM", but the sets of modulation schemes used for mapped signal 201A (s1(i)) and mapped signal 201B (s2(i)) are not limited to these examples.

In the above examples, when the modulation scheme used for mapped signal 201A (s1(i)) is 16 QAM, and the modulation scheme used for mapped signal 201B (s2(i)) is non-uniform 64 QAM, weighting synthesized signal 204A (z1(i) and weighting synthesized signal 206B (z2(i)) may be expressed using any of Equations (84) through (91) and (100) through (107).

Then, in the fifth case, a first non-uniform 64 QAM mapping is used, and in the sixth case, a second non-uniform 64 QAM mapping is used. Note that the first non-uniform 64 QAM mapping and the second non-uniform 64 QAM mapping are different.

Here, when the first non-uniform 64 QAM is used, the value of u is u1 and the value of v is v1 in Equations (84) through (91) and (100) through (107), and when the second non-uniform 64 QAM is used, the value of u is u2 and the value of v is v2 in Equations (84) through (91) and (100) through (107). Here, Equation (116) holds true.

[MATH. 116]

$$\frac{u_1}{u_1 + v_1} \neq \frac{u_2}{u_2 + v_2} \quad \text{Equation (116)}$$

Note that in this example, the modulation scheme used for mapped signal 201A (s1(i)) may be a modulation scheme other than 16 QAM.

In another example, when the modulation scheme used for mapped signal 201A (s1(i)) is non-uniform 64 QAM, and the modulation scheme used for mapped signal 201B (s2(i)) is 16 QAM, weighting synthesized signal 204A (z1(i) and weighting synthesized signal 206B (z2(i)) may be expressed using any of Equations (92) through (99).

Then, in the seventh case, a third non-uniform 64 QAM mapping is used, and in the eighth case, a fourth non-uniform 64 QAM mapping is used. Note that the third non-uniform 64 QAM mapping and the fourth non-uniform 64 QAM mapping are different.

Here, when the third non-uniform 64 QAM is used, the value of u is u3 and the value of v is v3 in Equations (92)

through (99), and when the fourth non-uniform 64 QAM is used, the value of u is u4 and the value of v is v4 in Equations (92) through (99). Here, Equation (117) holds true.

[MATH. 117]

$$\frac{u_3}{u_3 + v_3} \neq \frac{u_4}{u_4 + v_4} \quad \text{Equation (117)}$$

Note that in this example, the modulation scheme used for mapped signal 201B (s2(i)) may be a modulation scheme other than 16 QAM.

This makes it possible to achieve an advantageous effect that the reception device can achieve a high data reception quality.

(Other Variations, etc.)

Note that in the present specification, processed signal 106_A illustrated in, for example, FIG. 1 and FIG. 22 may be transmitted from a plurality of antennas, and processed signal 106_B illustrated in, for example, FIG. 1 and FIG. 22 may be transmitted from a plurality of antennas. Note that a configuration in which processed signal 106_A includes any one of, for example, signals 204A, 206A, 208A, 210A, and 2602A is conceivable. Moreover, a configuration in which processed signal 106_B includes any one of, for example, signals 204B, 206B, 208B, 210B, and 2602B is conceivable.

For example, assume there are N transmitting antennas, i.e., transmitting antennas 1 through N are provided. Note that N is an integer that is greater than or equal to 2. Here, the modulated signal transmitted from transmitting antenna k is expressed as ck. Note that k is an integer that is greater than or equal to 1 and less than or equal to N. Moreover, assume that vector C including c1 through cN is expressed as $C = (c1, c2 \ldots cN)^T$. Note that transposed vector A is expressed as $A^T$. Here, when the precoding matrix (weighting matrix) is G, the following equation holds true.

[MATH. 118]

$$C = G \begin{pmatrix} d_a(i) \\ d_b(i) \end{pmatrix} \quad \text{Equation (118)}$$

Note that da(i) is processed signal 106_A, db(i) is processed signal 106_B, and i is a symbol number. Moreover, G is a matrix having N rows and 2 columns, and may be a function of i. Moreover, G may be switched at some given timing (i.e., may be a function of frequency or time).

Moreover, "processed signal 106_A is transmitted from a plurality of transmitting antennas and processed signal 106_B is also transmitted from a plurality of transmitting antennas" and "processed signal 106_A is transmitted from a single transmitting antenna and processed signal 106_B is also transmitted from a single transmitting antenna" may be switched in the transmission device. Regarding the timing of the switching, the switching may be performed per frame, and the switching may be performed in accordance with the decision to transmit a modulated signal (may be any arbitrary timing).

Note that at least one of the FPGA (Field Programmable Gate Array) and CPU (Central Processing Unit) may be configured to download, over a wired or wireless connection, some or all of the software required to implement the communications method described in the present disclosure.

Furthermore, at least one of the FPGA (Field Programmable Gate Array) and CPU (Central Processing Unit) may be configured to download, over a wired or wireless connection, some or all of the software required to perform updates. The downloaded software may be stored in a storage, and based on the stored software, at least one of the FPGA and CPU may be operated to implement the digital signal processing described in the present disclosure.

Here, a device including at least one of the FPGA and CPU may connect to a communications modem over a wired or wireless connect, and the device and communications modem may implement the communications method described in the present disclosure.

For example, a communications device such as the base station, AP, and terminal described in the present specification may include at least one of the FPGA and the CPU, and include an interface for obtaining, from an external source, software for operating at least one of the FPGA and the CPU. The communications device may further include a storage for storing software obtained from the external source, and implement the signal processing described in the present disclosure by operating the FPGA and CPU based on the stored software.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable in radio communications systems using a single-carrier scheme and/or a multi-carrier scheme.

What is claimed is:

1. A transmission method, comprising:
    modulating quadrature phase shift keying (QPSK) points s1(i) by using bits of a first stream and 16 quadrature amplitude modulation (QAM) points s2(i) by using bits of a second stream, where i is an integer greater than or equal to 0;
    converting the QPSK points s1(i) and the 16-QAM points s2(i) to first converted points z1(i) and second converted points z2(i), the first converted points z1(i) and the second converted points z2(i) satisfying Equation (1), wherein the Equation (1) is defined as:

$$\begin{pmatrix} z1(i) \\ z2(i) \end{pmatrix} = \begin{pmatrix} 1 & 0 \\ 0 & y(i) \end{pmatrix} \frac{1}{\sqrt{2}} \begin{pmatrix} 1 & 1 \\ 1 & -1 \end{pmatrix} \begin{pmatrix} \sqrt{2/3} & 0 \\ 0 & \sqrt{4/3} \end{pmatrix} \begin{pmatrix} s1(i) \\ s2(i) \end{pmatrix},$$

where y(i) is a function represented by $e^{j\delta(i)}$, where $\delta(i)$ is a real value incremented by a constant value for every i, a value of y(i) periodically varies with a period of N, where N is 8; and
    transmitting the first converted points z1(i) and the second converted points z2(i) using a plurality of antennas.

2. The transmission method of claim 1, wherein the constant value is $2\pi/N$.

3. A transmission device, comprising:
    a mapper that, in operation, modulates quadrature phase shift keying (QPSK) points s1(i) by using bits of a first stream and 16 quadrature amplitude modulation (QAM) points s2(i) by using bits of a second stream, where i is an integer greater than or equal to 0;

a signal processor that, in operation, converts the QPSK points s1(i) and the 16-QAM points s2(i) to first converted points z1(i) and second converted points z2(i), the first converted points z1(i) and the second converted points z2(i) satisfying Equation (1), wherein the Equation (1) is defined as:

$$\begin{pmatrix} z1(i) \\ z2(i) \end{pmatrix} = \begin{pmatrix} 1 & 0 \\ 0 & y(i) \end{pmatrix} \frac{1}{\sqrt{2}} \begin{pmatrix} 1 & 1 \\ 1 & -1 \end{pmatrix} \begin{pmatrix} \sqrt{2/3} & 0 \\ 0 & \sqrt{4/3} \end{pmatrix} \begin{pmatrix} s1(i) \\ s2(i) \end{pmatrix},$$

where y(i) is a function represented by $e^{j\delta(i)}$, where $\delta(i)$ is a real value incremented by a constant value for every i, a value of y(i) periodically varies with a period of N, where N is 8; and a transmitter that, in operation, transmits the first converted points z1(i) and the second converted points z2(i) using a plurality of antennas.

4. The transmission device of claim 3, wherein the constant value is 2π/N.

5. A reception method, comprising:

obtaining reception signals by receiving first converted signals z1(i) and second converted signals z2(i) transmitted by using plurality of antennas, where i is an integer greater than or equal to 0, wherein the first converted signals z1(i) and the second converted signals z2(i) are generated by converting quadrature phase shift keying (QPSK) points s1(i) and 16 quadrature amplitude modulation (QAM) points s2(i), the QPSK points s1(i) are modulated by using bits of a first stream and the 16-QAM points s2(i) are modulated by using bits of a second stream, the first converted points z1(i) and the second converted points z2(i) satisfy Equation (1), wherein the Equation (1) is defined as:

$$\begin{pmatrix} z1(i) \\ z2(i) \end{pmatrix} = \begin{pmatrix} 1 & 0 \\ 0 & y(i) \end{pmatrix} \frac{1}{\sqrt{2}} \begin{pmatrix} 1 & 1 \\ 1 & -1 \end{pmatrix} \begin{pmatrix} \sqrt{2/3} & 0 \\ 0 & \sqrt{4/3} \end{pmatrix} \begin{pmatrix} s1(i) \\ s2(i) \end{pmatrix},$$

where y(i) is a function represented by $e^{j\delta(i)}$, where $\delta(i)$ is a real value incremented by a constant value for every i, a value of y(i) periodically varies with a period of N, where N is 8; and demodulating the reception signals according to the conversion applied to the QPSK points s1(i) and the 16-QAM points s2(i).

6. The reception method of claim 5, wherein the constant value is 2π/N.

7. A reception device, comprising:

a receiver that, in operation, obtains reception signals by receiving first converted signals z1(i) and second converted signals z2(i) transmitted by using plurality of antennas, where i is an integer greater than or equal to 0, wherein the first converted signals z1(i) and the second converted signals z2(i) are generated by converting quadrature phase shift keying (QPSK) points s1(i) and 16 quadrature amplitude modulation (QAM) points s2(i), the QPSK points s1(i) are modulated by using bits of a first stream and the 16-QAM points s2(i) are modulated by using bits of a second stream, the first converted points z1(i) and the second converted points z2(i) satisfy Equation (1), wherein the Equation (1) is defined as:

$$\begin{pmatrix} z1(i) \\ z2(i) \end{pmatrix} = \begin{pmatrix} 1 & 0 \\ 0 & y(i) \end{pmatrix} \frac{1}{\sqrt{2}} \begin{pmatrix} 1 & 1 \\ 1 & -1 \end{pmatrix} \begin{pmatrix} \sqrt{2/3} & 0 \\ 0 & \sqrt{4/3} \end{pmatrix} \begin{pmatrix} s1(i) \\ s2(i) \end{pmatrix},$$

where y(i) is a function represented by $e^{j\delta(i)}$, where $\delta(i)$ is a real value incremented by a constant value for every i, a value of y(i) periodically varies with a period of N, where N is 8; and a demodulator that, in operation, demodulates the reception signals according to the conversion applied to the QPSK points s1(i) and the 16-QAM points s2(i).

8. The reception device of claim 7, wherein the constant value is 2π/N.

* * * * *